US007397497B2

(12) United States Patent
Murakami et al.

(10) Patent No.: US 7,397,497 B2
(45) Date of Patent: Jul. 8, 2008

(54) DISPLAY DEVICE CAPABLE OF REDUCING BURN-IN ON DISPLAY PANEL

(75) Inventors: Takezo Murakami, Kagoshima Prefecture (JP); Yoshiharu Simizu, Kagoshima Prefecture (JP)

(73) Assignee: Pioneer Plasma Display Corporation, Kagoshima Prefecture (JP)

( * ) Notice: Subject to any disclaimer, the term of this patent is extended or adjusted under 35 U.S.C. 154(b) by 592 days.

(21) Appl. No.: 11/067,603

(22) Filed: Feb. 28, 2005

(65) Prior Publication Data

US 2005/0195280 A1 Sep. 8, 2005

(30) Foreign Application Priority Data

Mar. 1, 2004 (JP) ............................ 2004-056861

(51) Int. Cl.
*H04N 3/20* (2006.01)
*H04N 5/21* (2006.01)

(52) U.S. Cl. ........................ 348/173; 348/607; 348/623

(58) Field of Classification Search ................. 348/173, 348/21, 22, 607, 606, 623–625, 630; 345/617, 345/618; 715/867; *H04N 3/20, 5/21*
See application file for complete search history.

(56) References Cited

U.S. PATENT DOCUMENTS 7,158,169 B1 * 1/2007 Farber et al. ................ 348/173
7,245,316 B2 * 7/2007 Grimes et al. ............... 348/173
7,271,828 B2 * 9/2007 Okano ........................ 348/173

FOREIGN PATENT DOCUMENTS

JP 10-161629 6/1998

* cited by examiner

*Primary Examiner*—Sherrie Hsia
(74) *Attorney, Agent, or Firm*—Drinker Biddle & Reath LLP

(57) ABSTRACT

A display device having a prolonged lifetime by preventing deterioration of image quality by reducing a burn-in is provided. A display device includes a still image region detecting unit for detecting still image data from video data, a detecting unit for detecting, as an edge portion, a pair of pixels having a level difference of image data larger than a set level difference, of a plurality of pair of adjacent pixels for the still image data, and a level adjusting unit for adjusting a level of the image data of a group of pixels including the edge portion and arranged consecutively and outputting the image data after the adjustment to a driving unit. The level adjusting unit adds/subtracts a random noise to/from the image data of the group of pixels.

27 Claims, 26 Drawing Sheets

DISPLAY DEVICE CAPABLE OF REDUCING BURN-IN ON DISPLAY PANEL

BACKGROUND OF THE INVENTION

1. Technical Field

The present invention relates to a display device for displaying videos including both of moving images and still images.

2. Description of the Related Art

There have been proposed methods for controlling display of display devices for clearly displaying moving images without detracting the lifetime of the display devices. An example of such a method is described in Japanese Patent Kokai No. 10-161629 (hereinafter, referred to as patent document 1). The patent document 1 discloses a cathode-ray tube (CRT) as a display device. Hereinafter, the display device disclosed in the patent document 1 is referred to as a CRT display device.

Conventionally, since a CRT display device for computer has very often displayed still images for a long time, long persistence fluorescent material has been used as fluorescent material for the CRT display device. The long persistence fluorescent material has a characteristic that faint fatigue of the fluorescent material does not remain even when the same position on the fluorescent material is irradiated with an electronic beam. In addition, the brightness of images in the CRT display device for computer is set to be low.

On the other hand, since a CRT display device for television has mainly displayed moving images, short persistence fluorescent material has been used as fluorescent material for the CRT display device for television. The short persistence fluorescent material has a characteristic that an effect of an irradiated beam can be suppressed to a minimum. In addition, since the CRT display device for television mainly displays the moving images, the brightness of images is set to be higher than that of the CRT display device for computer.

Recently, as moving images can be displayed on a CRT display device using a computer, a mixture of still images and moving images can be displayed on the CRT display device. However, a burn-in may occur when the mixture of still images and moving images is displayed on the CRT display device. The burn-in is referred to as a phenomenon that a particular portion of the CRT display device on which the still images are displayed (referred to as a still image region) is exhausted and vestiges of the exhaustion remains in the still image region. When the burn-in occurs, the lifetime of the CRT display device becomes shortened.

Accordingly, the patent document 1 discloses a display control method for controlling output of images for a display device for displaying still images and/or moving images (CRT display device). In this display control method, first, it is determined whether or not an image to be displayed has a still image region. Next, if only a moving image region is present in the image with no still image region, the image is instantly displayed in the display device, and, if both of the moving image region and the still image region are present in the image, after randomly adding black dots in the still image region, the image is displayed in the display device. It is described in the patent document 1 that this method can prevent the burn-in in the still image region.

However, The above-mentioned conventional technique has the following problem. When the moving image region and the still image region are present in the image, even if the black dots are randomly added in the still image region, it does not necessarily follow that the black dots are added in a region of the still image region in which the burn-in is apt to occur. On this account, there is little possibility of significant reduction of the burn-in. Accordingly, viewers may see images having quality deteriorated due to the burn-in in the display device.

SUMMARY OF THE INVENTION

In consideration of the above-mentioned problem, it is therefore an object of the present invention to provide a display device, which is capable of reducing a burn-in, thus preventing deterioration of image quality and prolonging the lifetime of the display device.

In order to achieve the above-mentioned object, according to one aspect, the present invention provides a display device for displaying images based on video data inputted from the outside, comprising: a display unit having a plurality of pixels, each being composed of a plurality of sub pixels having different colors or a single monochrome sub pixel, a driving unit for driving the display unit based on the video data, a still image region detecting unit for detecting a still image region from the video data, and a burn-in reduction processing unit for performing a burn-in reduction process for sub pixels located in the still image region.

According to another aspect, the present invention provides a display device for displaying images based on video data inputted from the outside, comprising: a display unit having a plurality of pixels, each being composed of a plurality of sub pixels having different colors or a single monochrome sub pixel, a driving unit for driving the display unit based on the video data, a still letter region detecting unit for detecting a still letter region from the video data, and a burn-in reduction processing unit for performing a burn-in reduction process for sub pixels located in the still letter region.

According to the present invention, by performing the burn-in reduction process for sub pixels located in the still image region, the burn-in can be reduced. Accordingly, deterioration of image quality of the display device can be prevented and the lifetime of the display device can be prolonged.

DESCRIPTION OF PREFERRED EMBODIMENTS

Hereinafter, embodiments of the present invention will be described in detail with reference to the accompanying drawings.

First Embodiment

Figure 1:
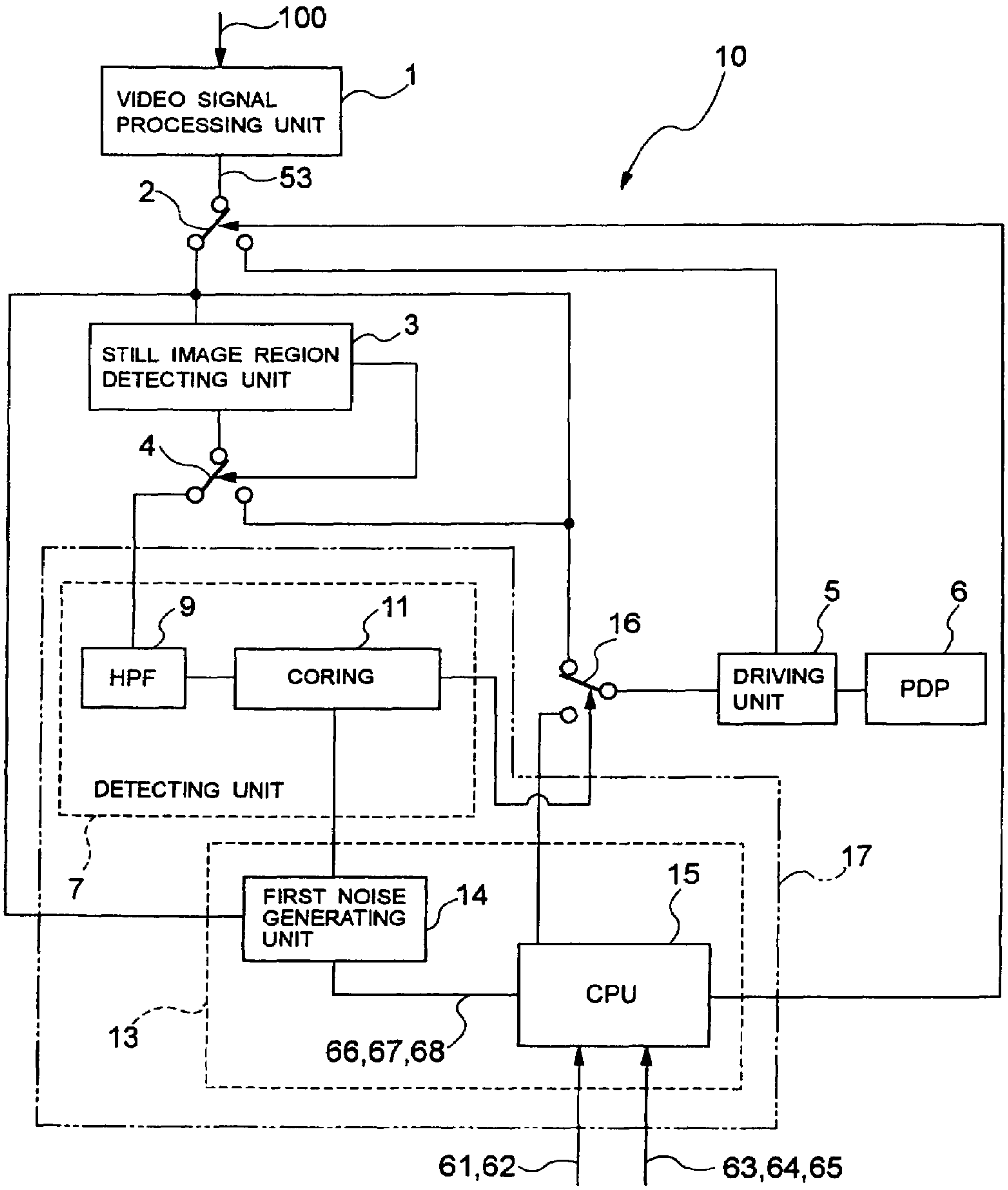
FIG. 1 is a block diagram illustrating a display device according to a first embodiment of the present invention.

First, a first embodiment of the present invention will be described. FIG. 1 is a block diagram illustrating a configuration of a display device according to the first embodiment of the present invention. A display device 10 shown in FIG. 1 is used as a display device for a television or computer (not shown). The television includes a manipulating switch, a remote control terminal, a decoder, and a tuner, (all not shown). The computer includes a manipulating switch (for example, a keyboard, a pointing device) and a computer body (for example, a hard disk, memories, etc), (both not shown).

The display device 10 has a video signal processing unit 1, a switch 2, a still image region detecting unit 3, a switch 4, a driving unit 5, a display device body 6, a switch 16, and a still image level adjusting unit 17. An example of the display device body 6 may include a plasma display, a liquid crystal display (LCD), an electroluminescence (EL) display, a CRT, etc. In this embodiment, the plasma display is employed as the display device body 6. In FIG. 1, a plasma display panel (PDP) is shown as a front side of the display device body 6. The still image level adjusting unit 17 has a central processing unit (CPU) 15. In the display device body 6, a plurality of pixels is arranged in a matrix, for example. In addition, in the case where the display device body 6 is a color display device, each pixel is composed of a plurality of sub pixels having different colors. For example, one pixel is composed of three red (R), green (G), and blue (B) sub pixels. In addition, in the case where the display device body 6 is a monochrome display device, each pixel is composed of a single monochrome sub pixel. The driving unit 5 drives the display device body 6.

The video signal processing unit 1 converts a video signal 100 inputted from the outside, for example, a decoder of a television or a computer body, into video data 53 adapted for the driving unit 5 to drive the display device body 6. In addition, the still image region detecting unit 3 checks whether or not still image data is included in the video data 53 outputted from the video signal processing unit 1. In addition, the still image level adjusting unit 17 detects, as an edge portions, ones of a plurality of adjacent pairs of pixels, having image data level differences exceeding a set level difference, in the still image data included in the video data 53, adjusts an image data level of a group of pixels consecutively arranged including the edge portions, and outputs the image data having the adjusted level to the driving unit 5.

In addition, the display device 10 can be operated in either a normal mode or a level adjustment operation mode. When the display device 10 is operated in the normal mode, the video data 53 outputted from the video signal processing unit 1 is directly transmitted to the driving unit 5, and the driving unit 5 drives the display device body 6 based on the video data 53. On the other hand, when the display device 10 is operated in the level adjustment operation mode, the video data 53 outputted from the video signal processing unit 1 is inputted to the still image region detecting unit 3. In addition, when the still image region detecting unit 3 detects the still image data from the video data 53, the video data 53 is inputted from the video signal processing unit 1 to the still image level adjusting unit 17 via the switch 2, and the still image level adjusting unit 17 adjusts the image data level of the group of pixels including the edge portions and then outputs the video data to the driving unit 5. The driving unit 5 drives the display device body 6 corresponding to the video data 53. In addition, a transmission path of the video signal is controlled by switching over the switches 2, 4 and 16.

The switch 2 is switched over by a signal from the CPU 15 within the still image level adjusting unit 17. The CPU 15 is provided with a level adjustment operation setting signal 61 or a normal operation setting signal 62 by instructions (for example, manipulation of a manipulating switch or a remote control terminal) from a viewer.

When the level adjustment operation setting signal 61 is provided to the CPU 15, the CPU 15 controls the switch 2 in response to the level adjustment operation setting signal 61 such that the video signal processing 1 is connected to the still image region detecting unit 3 via the switch 2 and the video signal processing 1 is connected to the driving unit 5 via the switches 2 and 16. That is, when the level adjustment operation setting signal 61 is inputted to the display device 10, the display device 10 goes in the level adjustment operation mode and the video signal processing unit 1 is connected to the still image region detecting unit 3 by means of the switch 2.

When the normal operation setting signal 62 is provided to the CPU 15, the CPU 15 controls the switch 2 in response to the normal operation setting signal 62 such that the video signal processing 1 is connected to the driving unit 5 via the switch 2. That is, when the normal operation setting signal 62 is inputted to the display device 10, the display device 10 goes in the normal operation mode and the video signal processing unit 1 is connected to the driving unit 5 by means of the switch 2.

The switch 4 is switched over by a signal from the still image region detecting unit 3. The still image region detecting unit 3 is connected to the still image level adjusting unit 17 via the switch 4. When the signal from the still image region detecting unit 3 is provided to the switch 4, the still image region detecting unit 3 is connected to the driving unit 5 via the switches 4 and 16.

The switch 16 is switched over by a signal from the still image level adjusting unit 17. When the signal from the still image level adjusting unit 17 is provided to the switch 16, the still image level adjusting unit 17 is connected to the driving unit 5 via the switch 16.

In the normal operation mode, the video signal processing unit 1 outputs the video data 53 to the driving unit 5. The driving unit 5 drives the display device body 6 to display the video data 53. The viewer can see the video data 53 displayed in the display device body 6.

In the level adjustment operation mode, the video signal processing unit 1 outputs the video data 53 to the still image region detecting unit 3 and outputs the video data 53 to the driving unit 5 via the switch 16. The still image region detecting unit 3 checks whether or not the still image data is included in the video data 53. Here, the term 'image data' is referred to as data corresponding to an image of one screen or a part of the image, and the term 'video data' is referred to as data corresponding to a plurality of screens consecutive in time. That is, the video data is an aggregate of a plurality of image data and represents a moving image.

If the video data 53 does not include the still image data, the signal for connecting the still image region detecting unit 3 to the driving unit 5 is provided to the switch 4. The driving unit 5 drives the display device body 6 to display the video data 53. The viewer can see the video data (moving image data) 53 displayed in the display device body 6.

When the video data 53 includes the still image data, the still image region detecting unit 3 outputs the video data 53 to the still image level adjusting unit 17 via the switch 4. When the still image level adjusting unit 17 outputs the video data 53, it provides the signal for connecting the still image level adjusting unit 17 to the driving unit 5 to the switch 16. The still image level adjusting unit 17 adjusts an image data level of a region including pairs of pixels having a large image data level difference among adjacent pairs of pixels of the still image data included in the video data 53 and outputs the video data 53 to the driving unit 5 via the switch 16, which will be described in detail later. In addition, if the display device body 6 is a color display device and each pixel of the display device body 6 is composed of a plurality of sub pixels having different colors, the still image level adjusting unit 17 calculates a level difference of pixel data between sub pixels having the same color. The driving unit 5 drives the display device body 6 to display the video data 53. The viewer can see the video data 53 (still image data and moving image data) displayed in the display device body 6.

When the video data 53 including the still image data is displayed in the display device body 6, there is a possibility of occurrence of phenomenon that a particular portion of the display device body 6 in which the still image data is displayed (the still image region) is exhausted and vestiges of the exhaustion remains in the still image region. That is, the burn-in may occur. With the display device 10 according to the present invention, when the video data 53 includes the still image data, the burn-in can be reduced by adjusting the level of the still image data. By reducing the burn-in, the lifetime of the display device body 6 (display device 10) can become longer than that of the conventional display device.

The still image level adjusting unit 17 includes a detecting unit 7 and a level adjusting unit 13. The level adjusting unit 13 includes a first noise generating unit 14, which will be described later, and the above-mentioned CPU 15. The detecting unit 7 calculates a level difference C of the image data of adjacent pairs of pixels from the still image data included in the video data 53 and checks whether or not the level difference C exceeds a set level difference. The detecting unit 7 outputs a control signal based on the level difference C to the level adjusting unit 13.

If the level difference C is less than the set level difference, the detecting unit 7 controls the switch 16 such that the video data 53 outputted from the video signal processing unit 1 is outputted to the driving unit 5. On the other hand, if the level difference C exceeds the set level difference, the level adjusting unit 13 adjusts the image data level of pixels of the still image region based on the level difference C and outputs the video data 53 to the driving unit 5 via the switch 16.

If the level difference C exceeds the set level difference, the burn-in may occur. With the display device 10 according to the present embodiment, even if the level difference C exceeds the set level difference, the burn-in can be reduced by adjusting the level of the image data of adjacent pixels of the still image data included in the video data 53.

Figure 2:
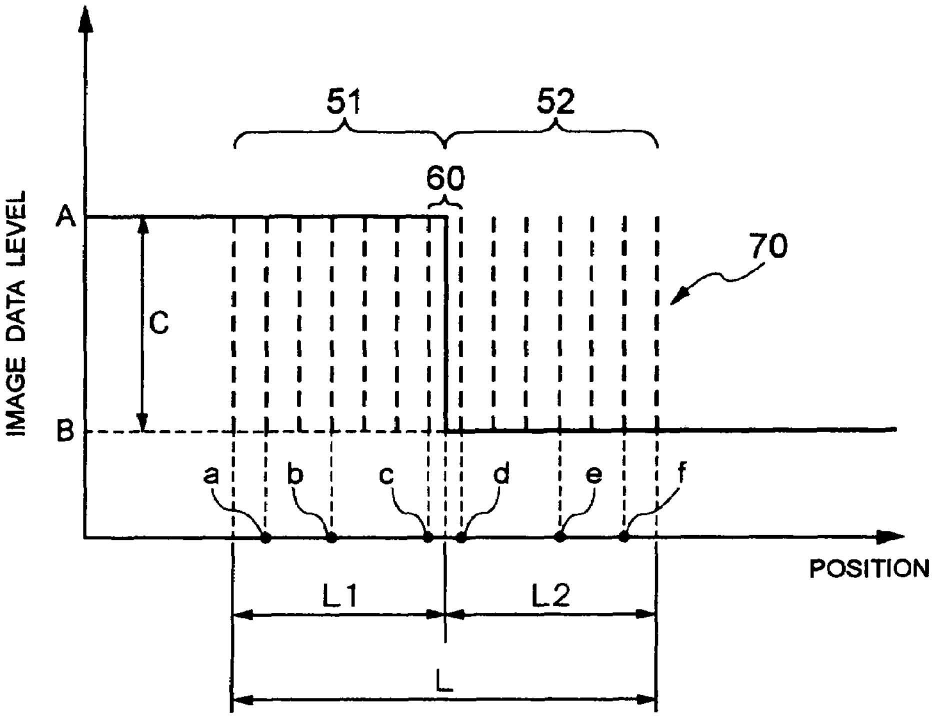
FIG. 2 is a graphic diagram illustrating a spatial distribution of an image data level, with a horizontal axis as a position and a vertical axis as an image data level, in the first embodiment.

FIG. 2 is a graphic diagram illustrating a spatial distribution of the image data level, with a horizontal axis as a position and a vertical axis as the image data level, in this embodiment. The still image level adjusting unit 17 within the display device 10 will be described in detail with reference to FIGS. 1 and 2. The detecting unit 7 of the still image level adjusting unit 17 includes a high pass filter (HPF) 9 and a coring 11. The video data 53 from the still video region detecting unit 3 passes the HPF 9. The HPF 9 calculates the level difference C of adjacent pairs of pixels from the still image data included in the video data 53 and outputs the calculated level difference C, together with information on position of the pairs of pixels, to the coring 11. In this case, when a level value of the image data in a pixel having a large image data level value, i.e., a relatively light pixel, of a pair of adjacent pixels is A and a level value of the image data in a pixel having a small image data level value, i.e., a relatively dark pixel, of a pair of adjacent pixels is B, the level difference C between the pair of pixels is expressed by an equation of $C=A-B$.

In addition, if the display device 10 is a color display device and each pixel of the display device body 6 is composed of three RGB sub pixels, the level difference C between the sub pixels having the same color is obtained. That is, the level difference between the pixel data level of one of the pair of adjacent pixels, for example, a red sub pixel, and the image data level of the other of the pair of adjacent pixels, for example, a red sub pixel, is calculated. Similarly, in other portions of this embodiment and other embodiments, which will be described later, the image data process is performed with a sub pixel as the basic unit, which may be simply referred to as image data of a pixel for the sake of the brevity of description in the following description.

The coring 11 compares the level difference C of the pair of pixels with the set level difference and detects a pair of pixels, having the level difference C exceeding the set level difference, as an edge portion 60. Here, the predetermined number of pixels including a first pixel, having the level value of A, of the pair of pixels composing the edge portion 60 and consecutively arranged in a direction away from a second pixel, having the level value of B, of the pair of pixels composing the edge portion 60 is assumed as a first group of pixels 51, and the predetermined number of pixels including the second pixel and consecutively arranged in a direction away from the first pixel is assumed as a second group of pixels 52. In addition, a control signal based on a result of the detection, that is, the level difference C and position information on the first group of pixels 51 and the second group of pixels 52, is outputted to the level adjusting unit 13.

The level adjusting unit 13 adjusts the image data level of pixels belonging to the first group of pixels 51 and the second group of pixels 52 (hereinafter, sometimes referred generally to as a pixel group) based on the level difference C. Thereafter, the video data 53 after this adjustment is outputted to the driving unit 5 via the switch 16.

The burn-in is observable in and near the edge portion 60 having the pair of adjacent pixels with a boundary between the first group of pixels 51 and the second group of pixels 52 of the still image data included in the video data 53 interposed between the pair of adjacent pixels. With the display device 10 according to the present invention, even if the level difference C exceeds the set level difference, the burn-in can be unobservable by adjusting the level of image data in and near the edge portion 60 having the pair of adjacent pixels with a boundary between the first group of pixels 51 and the second group of pixels 52 of the still image data interposed between the pair of adjacent pixels.

An adjustment signal 63 is provided to the CPU 15 according to instructions (manipulation of the manipulating switch or the remote control terminal) from the viewer. The CPU 15 outputs a control signal 66 to an adjusting portion, which will be described later, of the level adjusting unit 13 in response to the adjustment signal 63. The adjusting portion of the level adjusting unit 13 generates an adjustment value for adjusting the level difference C in response to the control signal 66. Here, the adjustment value is represented by $(\alpha \times C)$, where $\alpha$ is a random coefficient (adjustment coefficient) and is an integer satisfying the conditions of $0 \leqq \alpha \leqq 1$. Based on the adjustment value, $(\alpha \times C)$, the adjusting portion, which will be described later, of the level adjusting unit 13 adjusts the level of image data in and near the edge portion 60 having the pair of adjacent pixels with the boundary between the first group of pixels 51 and the second group of pixels 52 interposed between the pair of adjacent pixels and outputs the video data 53 to the driving unit 5 via the switch 16. Here, in a direction of arrangement of the pair of pixels composing the edge portion 60, the length of the first group of pixels 51 is assumed as L1 and the length of the second group of pixels 52 is assumed as L2. The overall length of the pixel group is L. Accordingly, L=L1+L2.

The adjusting portion of the level adjusting unit 13 includes the first noise generating unit 14. When the level of the pixel group is adjusted, since the level values A and B of original image data are required in addition to the level difference C, the video data 53 from the video signal processing unit 1 is inputted to the first noise generating unit 14. The first noise generating unit 14 generates the adjustment value, $(\alpha \times C)$, by multiplying the random coefficient $\alpha$ by the level difference C in response to the control signal 66 and generates noise 70 having a spatial width L of (L1+L2) and a strength of the adjustment value, $(\alpha \times C)$. The first noise generating unit 14 adds the noise 70 in and near the edge portion 60 having the pair of adjacent pixels with the boundary between the pixel groups, i.e., the first group of pixels 51 and the second group of pixels 52 interposed between the pair of adjacent pixels. At this time, the first noise generating unit 14 adjusts the image data level of the first group of pixels 51 and the image data level of the second group of pixels 52 based on the adjustment value, $(\alpha \times C)$.

Here, as described above, the first level value A representing the image data level of the first group of pixels 51 is set to be larger than the second level value B representing the image data level of the second group of pixels 52. In this case, when the first noise generating unit 14 adjusts the image data level of the first group of pixels 51, the first noise generating unit 14 generates a first adjustment level value, $(A-\alpha \times C)$, by subtracting the adjustment value, $(\alpha \times C)$, from the first level value A representing the image data level of the first group of pixels 51. In addition, when the first noise generating unit 14 adjusts the image data level of the second group of pixels 52, the first noise generating unit 14 generates a second adjustment level value, $(B+\alpha \times C)$, by adding the adjustment value, $(\alpha \times C)$, to the second level value B representing the image data level of the second group of pixels 52. Thus, the first noise generating unit 14 adjusts the image data levels of the first group of pixels 51 and the second group of pixels 52. Accordingly, it can be prevented that the burn-in occur in the pixel group including the edge portion 60.

However, by adjusting the level of the still image data included in the video data 53, there is a possibility that the viewer may perceive deterioration of quality of adjusted still image as compared to the moving images. Accordingly, the spatial width L of (L1+L2) giving the noise is adjustable by the viewer.

One of the adjustment signal 63, a short distance adjustment signal 64, and a long distance adjustment signal 65 is provided to the CPU 15 according to the instructions (manipulation by the manipulating switch or the remote control terminal) from the viewer.

When the adjustment signal 63 is provided to the CPU 15, the CPU 15 outputs the control signal 66 to the first noise generating unit 14 in response to the adjustment signal 63. The first noise generating unit 14 generates the noise 70 having the spatial width L of (L1+L2) and the image data level of the adjustment value, (α×C) in response to the control signal 66.

When the short distance adjustment signal 64 is provided to the CPU 15, the CPU 15 outputs a short distance control signal 67 to the first noise generating unit 14 in response to the short distance adjustment signal 64. The first noise generating unit 14 generates the noise 70 having a first spatial width La of (L1_a_+L2_a_) (for example, La=0.8×L) smaller than the spatial width L of (L1+L2) and the image data level of the adjustment value of (α×C) in response to the short distance control signal 67.

When the long distance adjustment signal 65 is provided to the CPU 15, the CPU 15 outputs a long distance control signal 68 to the first noise generating unit 14 in response to the long distance adjustment signal 65. The first noise generating unit 14 generates the noise 70 having a second spatial width Lb of (L1_b_+L2_b_) (for example, Lb=1.2×L) larger than the spatial width L of (L1+L2) and the image data level of the adjustment value of (α×C) in response to the long distance control signal 68.

In this way, by controlling the width adjusting the image data level, deterioration of quality of images seen by the viewer can be limited to a minimum.

In addition, in the display device 10, for example, in order that the still image region detecting unit 3 detects the still image region, it is required to examine the video data by the certain amount of time and accordingly the still image region detecting unit 3 requires a process time so much. In addition, in order that the detecting unit 7 detects the edge portion, a certain process time is required. Also, in order that the first noise generating unit 14 adds the noise to the image data, a certain process time is required. Accordingly, the image data passing through these units has a delay as compared to the image data bypassing these units. On this account, delay circuits (not shown) for adjusting timing of the image data are arranged in various portions in the display device 10. For example, the delay circuits are arranged between a node between the switch 2 and the still image region detecting unit 3 and the first noise generating unit 14, between the node and the switch 16, etc. Each of the delay circuits is composed of, for example, a buffer memory or a relay.

Now, an operation of the display device 10 according to this embodiment will be described. The display device 10 performs (I) mode setting process, (II) normal operation mode, (III) level adjustment operation mode by the CPU 15, and (IV) level adjustment operation mode.

Figure 3:
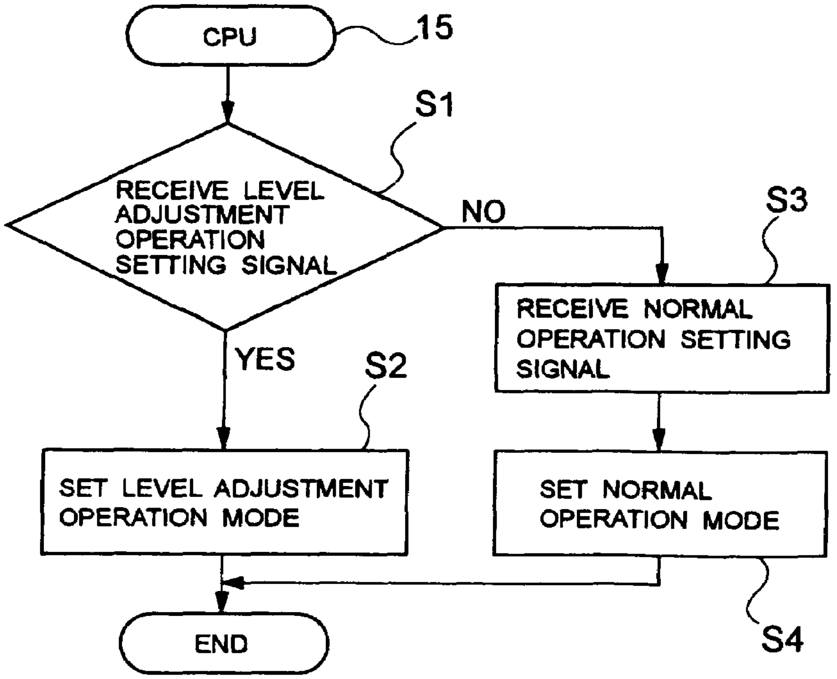
FIG. 3 is a flow chart illustrating (I) mode setting process as an operation of a display device according to the first embodiment.

FIG. 3 is a flow chart illustrating (I) mode setting process as an operation of the display device 10 according to this embodiment.

When the viewer inputs power (power of the display device 10, power of a television connected to the display device 10, and power of a computer connected to the display device 10) to the display device 10 using the manipulating switch or the remote control terminal, the level adjustment operation setting signal 61 is provided from the manipulating switch or the remote control terminal to the CPU 15. In addition, when the viewer provides the level adjustment operation setting signal 61 to the display device 10 performing (II) normal operation mode using the manipulating switch or the remote control terminal, the level adjustment operation setting signal 61 is provided to the CPU 15. The CPU 15 controls the switch 2 such that the video signal processing unit 1 is connected to the still image region detecting unit 3 in response to the level adjustment operation setting signal 61 (YES in Step S1). When the video signal processing unit 1 is connected to the still image region detecting unit 3, the display device 10 performs (IV) level adjustment operation mode (Step S2).

On the other hand, when the viewer provides the normal operation setting signal 62 to the display device 10 performing (IV) level adjustment operation mode using the manipulating switch or the remote control terminal, the CPU 15 controls the switch 2 such that the video signal processing unit 1 is connected to the driving unit 5 in response to the normal operation setting signal 62 (NO in Step S1, and Step S3)). When the video signal processing unit 1 is connected to the driving unit 5, the display device 10 performs (II) normal operation mode (Step S4).

Figure 4:
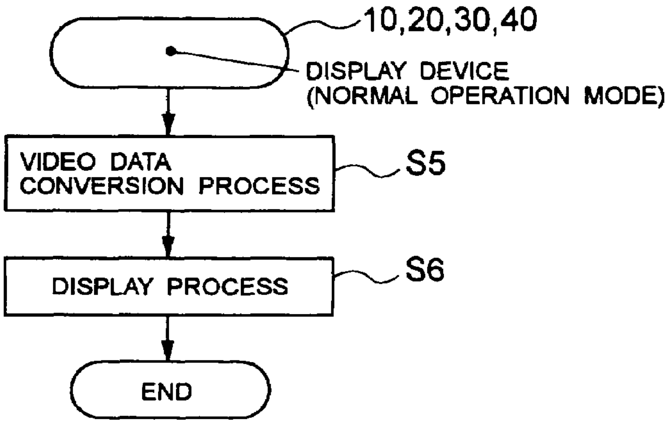
FIG. 4 is a flow chart illustrating (II) normal operation mode as an operation of a display device according to the first embodiment.

FIG. 4 is a flow chart illustrating (II) normal operation mode as an operation of the display device 10 according to the present invention.

The video signal processing unit 1 converts the video signal 100 from the outside (a decoder of the television or the computer) into the video data 53 adapted for the driving unit 5 to drive the display device body 6 (video data conversion process: Step S5). The video data 53 converted in the video signal processing unit 1 is outputted to the driving unit 5. The driving unit 5 drives the display device body 6 to display the video data 53 (display process: Step S6). The video data 53 displayed in the display device body 6 is seen by the viewer.

Figure 5:
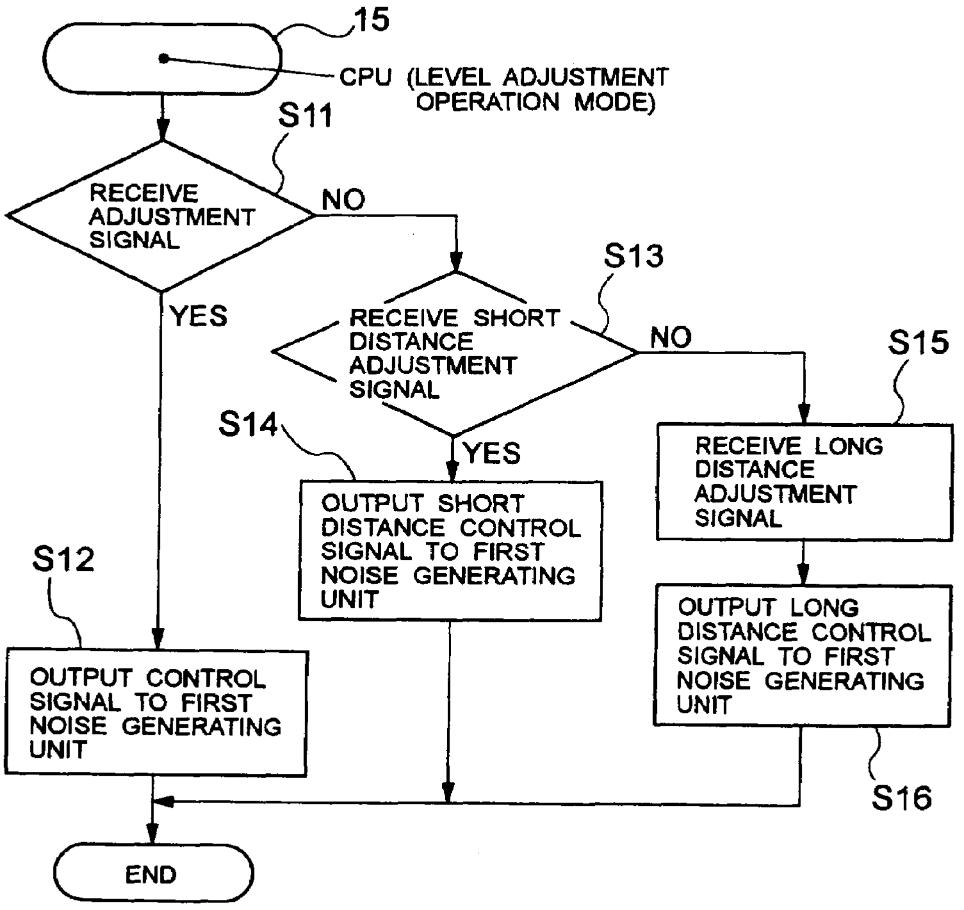
FIG. 5 is a flow chart illustrating (III) level adjustment operation mode by a CPU as an operation of a display device according to the first embodiment.

FIG. 5 is a flow chart illustrating (III) level adjustment operation mode by the CPU 15 as an operation of the display device 10 according to the present invention.

When the viewer provides the adjustment signal 63 to the display device 10 using the manipulating switch or the remote control terminal, the adjustment signal 63 is provided to the CPU 15 (YES in Step S11). The CPU 15 outputs the control signal 66 to the first noise generating unit 14 in response to the adjustment signal 63 (Step S12). The first noise generating unit 14 generates the noise 70 having the width L (L1+L2) and the adjustment value of (α×C) in response to the control signal 66 from the CPU 15.

When the viewer provides the short distance adjustment signal 64 to the display device 10 using the manipulating switch or the remote control terminal, the short distance adjustment signal 64 is provided to the CPU 15 (NO in Step S11, YES in Step S13). The CPU 15 outputs the short distance control signal 67 to the first noise generating unit 14 in response to the short distance adjustment signal 64 (Step S14). The first noise generating unit 14 generates the noise 70 having the first spatial width La of (L1_a_+L2_a_) (La=0.8×L) and the adjustment value of (α×C) in response to the short distance control signal 67 from the CPU 15.

When the viewer provides the long distance adjustment signal 65 to the display device 10 using the manipulating switch or the remote control terminal, the long distance adjustment signal 65 is provided to the CPU 15 (NO in Step S11, NO in Step S13, Step S15). The CPU 15 outputs the long distance control signal 68 to the first noise generating unit 14 in response to the long distance adjustment signal 65 (Step S16). The first noise generating unit 14 generates the noise 70 having the second spatial width Lb of (L1_b_+L2_b_) (Lb=1.2×L) and the adjustment value of (α×C) in response to the long distance control signal 68 from the CPU 15.

Figure 6:
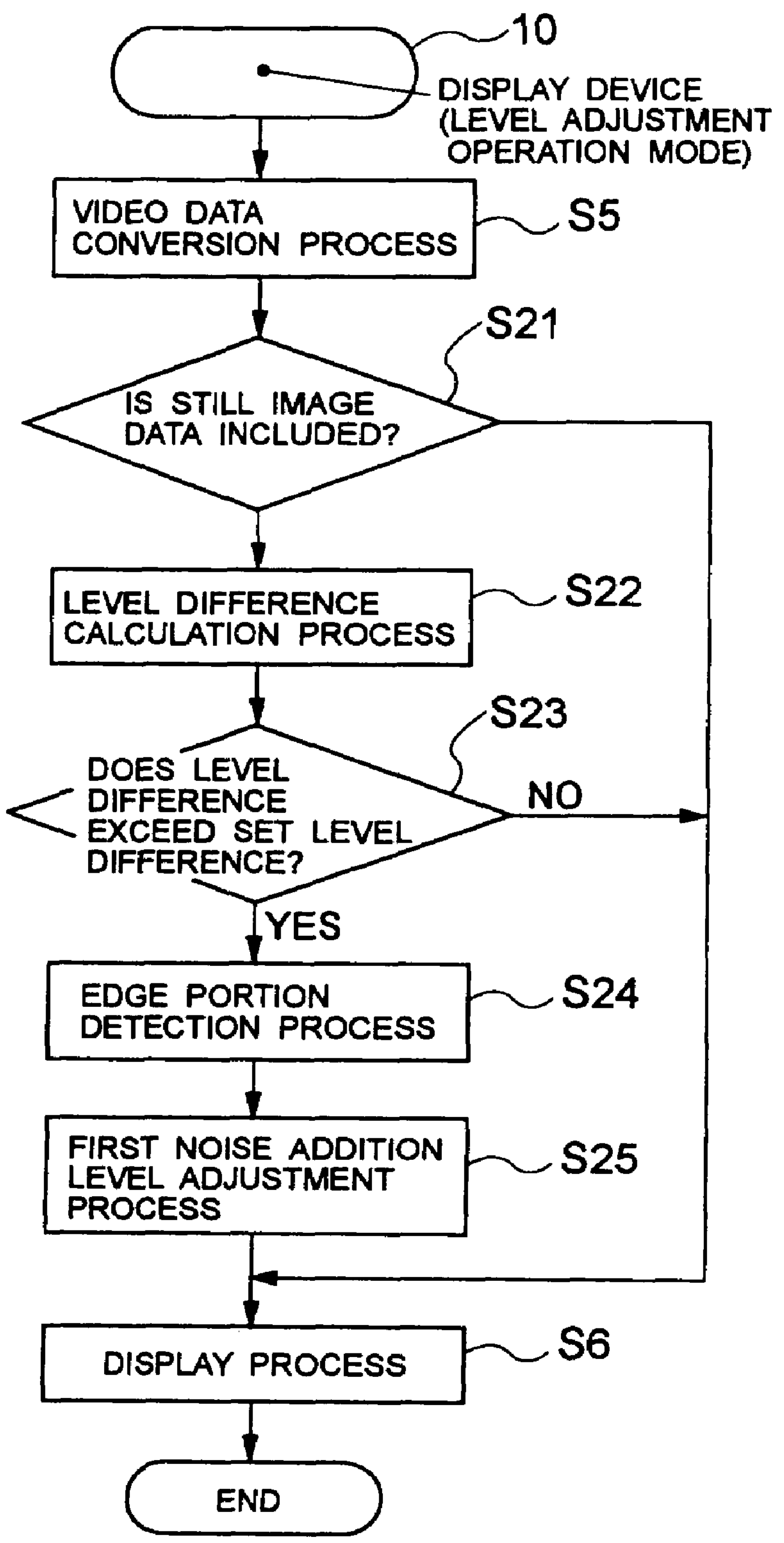
FIG. 6 is a flow chart illustrating (IV) level adjustment operation mode as an operation of a display device according to the first embodiment.

FIG. 6 is a flow chart illustrating (IV) level adjustment operation mode as an operation of the display device 10 according to the present invention.

The video signal processing unit 1 performs the video data conversion process (Step S5). The video data 53 converted in the video signal processing unit 1 is outputted to the still image region detecting unit 3. The still video region detecting unit 3 checks whether or not the still image data is included in the video data 53 (Step S21).

If the still image data is not included in the video data 53, the signal for connecting the still image region detecting unit 3 to the driving unit 5 is provided to the switch 4, and the video data 53 is outputted to the driving unit 5 via the switches 4 and 16 (NO in Step S21). The driving unit 5 performs the display process (Step S6). The video data 53 displayed in the display device body 6 is seen by the viewer.

If the still image data is included in the video data 53, the still image region detecting unit 3 outputs the video data 53 to the detecting unit 7 of the still image level adjusting unit 17 via the switch 4 (YES in Step S21). When the video data 53 is inputted to the detecting unit 7, the detecting unit 7 provides the signal for connecting the still image level adjusting unit 17 to the driving unit 5 to the switch 16. The video data 53 from the still image region detecting unit 3 passes through the HPF 9 within the detecting unit 7. The HPF 9 within the detecting unit 7 calculates the level difference C of the image data of the pair of adjacent pixels in the still image data included in the video data 53 and outputs the calculated level difference C to the coring 11 within the detecting unit 7 (level difference calculation process; Step S22).

If the level difference C in all pairs of pixels in the still image region is less than the set level difference, the coring 11 controls the switch 16 such that the video data 53 outputted from the video signal processing unit 1 is outputted to the driving unit 5 (NO in Step S23). The driving unit 5 drives the display device body 6 to display the video data 53, as the display process (Step S6). The video data 53 displayed in the display device body 6 is seen by the viewer.

If the level difference C in any one pair of pixels in the still image region exceeds the set level difference (YES in Step S23), the coring 11 detects this pair of pixels as the edge portion 60, and outputs the control signal based on the level difference C and the position information on the first group of pixels 51 and the second group of pixels 52 to the first noise generating unit 14 within the level adjusting unit 13 (edge portion detection process; Step S24). After the edge portion detection process (Step S24) is performed, the first noise generating unit 14 performs a first noise addition process (Step S25).

When the control signal 66 is provided from the CPU 15 to the first noise generating unit 14, in the first noise addition process (Step S25), the first noise generating unit 14 generates the noise 70 having the spatial width L of (L1+L2) and the strength of the adjustment value of (α×C) in response to the control signal 66. That is, the first noise generating unit 14 adds the noise 70 to the pixel group (the first group of pixels 51 and the second group of pixels 52) having the width L. At this time, the first noise generating unit 14 generates the first adjustment level value, (A−α×C), by subtracting the adjustment value, (α×C), from the level value A of the first group of pixels 51, and generates the second adjustment level value, (B+α×C), by adding the adjustment value, (α×C), to the level value B of the second group of pixels 52. The first noise generating unit 14 outputs the video data 53 having the adjusted image data level of the first group of pixels 51 and the adjusted image data level of the second group of pixels 52 to the driving unit 5 via the switch 16. The driving unit 5 performs the display process (Step S6). The video data 53 displayed in the display device body 6 is seen by the viewer.

When the short distance control signal 67 is provided from the CPU 15 to the first noise generating unit 14, in the first noise addition process (Step S25), the first noise generating unit 14 generates the noise 70 having the spatial width La of (L1*a*+L2*a*) (La=0.8×L) and the strength of the adjustment value of (α×C) in response to the short distance control signal 67. In this case, the first noise generating unit 14 adds the noise 70 in and near the edge portion 60 having the pair of adjacent pixels with the boundary between the first group of pixels 51 and the second group of pixels 52 interposed between the pair of adjacent pixels. At this time, the first noise generating unit 14 generates the first adjustment level value, (A−α×C), by subtracting the adjustment value, (α×C), from the level value A of the first group of pixels 51, and generates the second adjustment level value, (B+α×C), by adding the adjustment value, (α×C), to the level value B of the second group of pixels 52. The first noise generating unit 14 outputs the video data 53 having the adjusted image data level of the first group of pixels 51 and the adjusted image data level of the second group of pixels 52 to the driving unit 5 via the switch 16. The driving unit 5 performs the display process (Step S6). The video data 53 displayed in the display device body 6 is seen by the viewer.

When the long distance control signal 68 is provided from the CPU 15 to the first noise generating unit 14, in the first noise addition process (Step S25), the first noise generating unit 14 generates the noise 70 having the spatial width Lb of (L1*b*+L2*b*) (Lb=1.2×L) and the strength of the adjustment value of (α×C) in response to the long distance control signal 68. The first noise generating unit 14 adds the noise 70 in and near the edge portion 60 having the pair of adjacent pixels with the boundary between the first group of pixels 51 and the second group of pixels 52 interposed between the pair of adjacent pixels. At this time, the first noise generating unit 14 generates the first adjustment level value, (A−α×C), by subtracting the adjustment value, (α×C), from the level value A of the first group of pixels 51, and generates the second adjustment level value, (B+α×C), by adding the adjustment value, (α×C), to the level value B of the second group of pixels 52. The first noise generating unit 14 outputs the video data 53 having the adjusted image data level of the first group of pixels 51 and the adjusted image data level of the second group of pixels 52 to the driving unit 5 via the switch 16. The driving unit 5 performs the display process (Step S6). The video data 53 displayed in the display device body 6 is seen by the viewer.

As described above, with the display device 10 according to this embodiment, by generating the noise 70 having the spatial width L and the adjustment value (α×C) using the first noise generating unit 14, the image data level of the first group of pixels 51 and the second group of pixels 52 of the still image data included in the video data 53 is adjusted. Accordingly, the burn-in can be reduced (unobservable) and the deterioration of display quality of the display device body 6 can be prevented.

In addition, with the display device 10 according to this embodiment, by reducing the burn-in, the lifetime of the display device body 6 (the display device 10) can be prolonged over the conventional display device.

Second Embodiment

Figure 7:
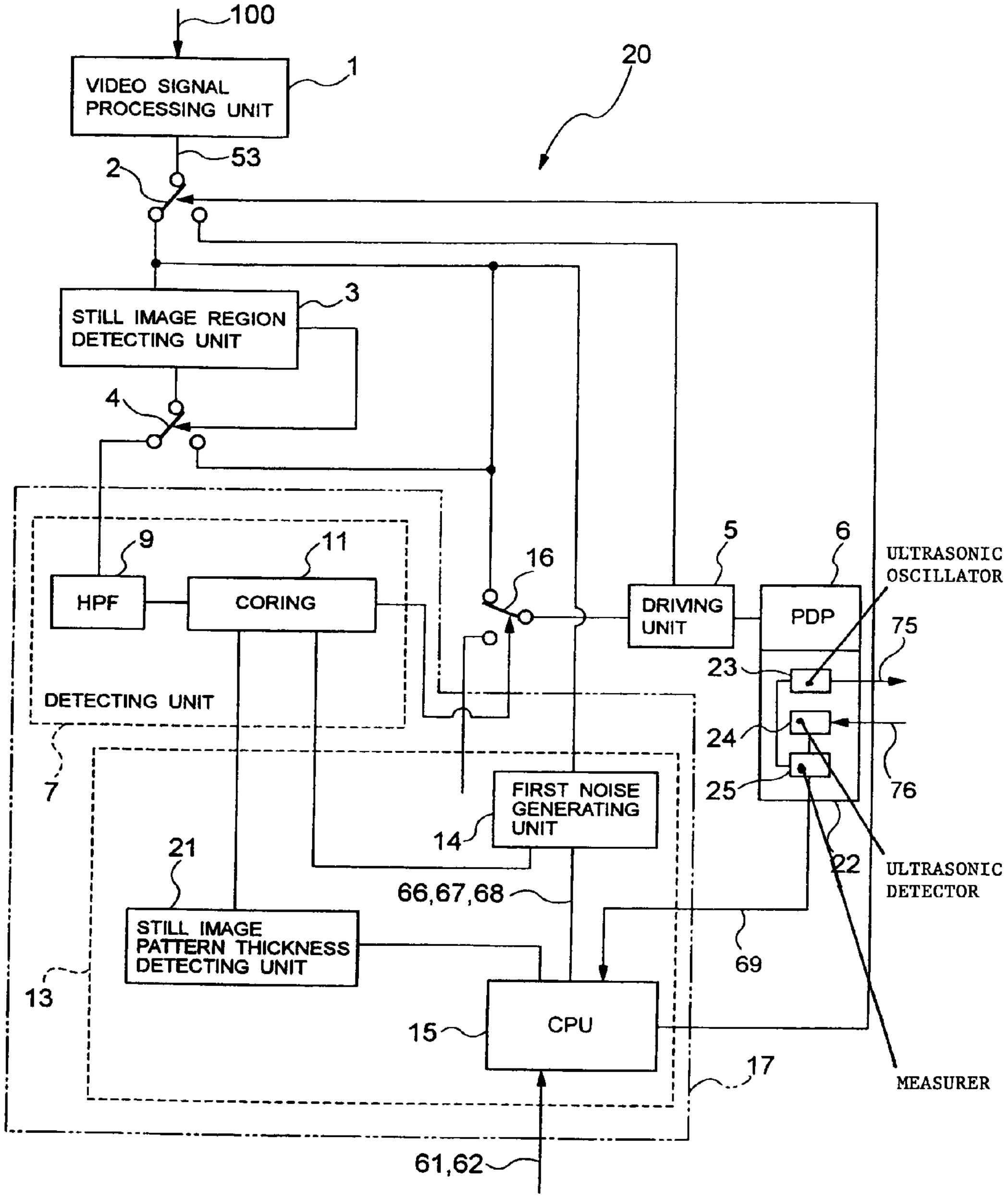
FIG. 7 is a block diagram illustrating a display device according to a second embodiment of the present invention.
Figure 8:
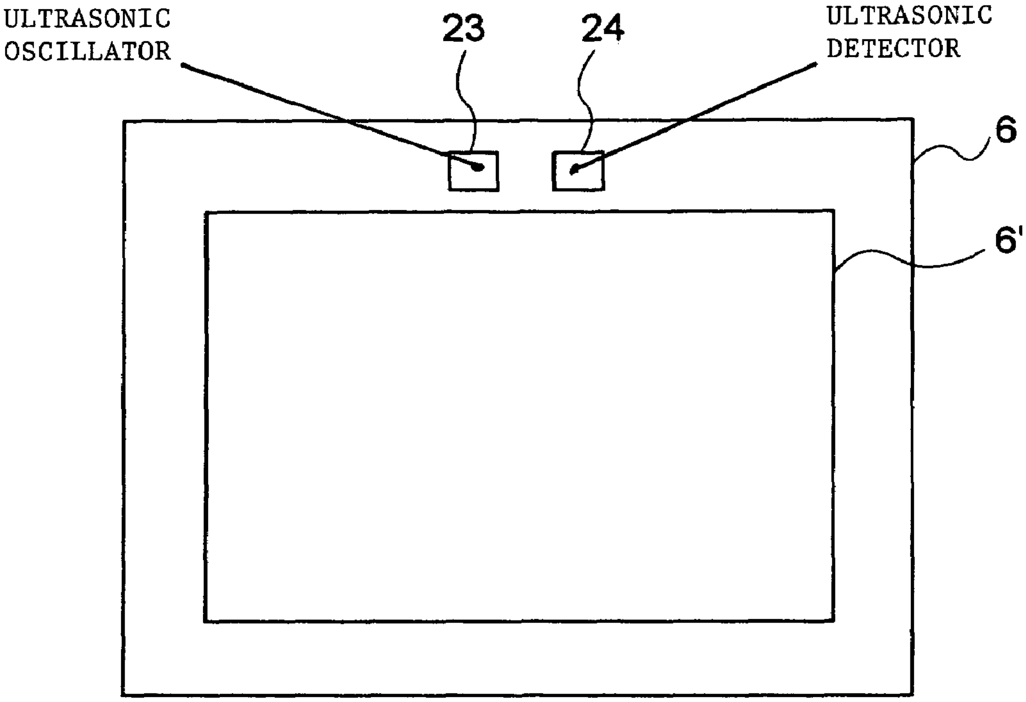
FIG. 8 is a diagram viewed from a front side (viewer side), which illustrates a display device body according to the second embodiment of the present invention.
Figure 9A:
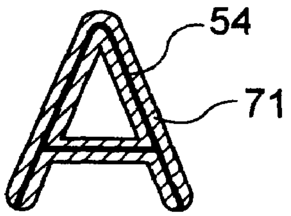
FIGS. 9A and 9B are diagrams illustrating a letter pattern to be displayed in the display device body.
Figure 9B:
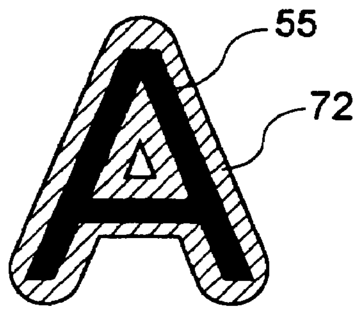

Next, a second embodiment of the present invention will be described. FIG. 7 is a block diagram illustrating a configuration of a display device 20 according to a second embodiment of the present invention. FIG. 8 is a diagram viewed from a front side (viewer side), which illustrates a display device body 6 according to the second embodiment, and FIGS. 9A and 9B are diagrams illustrating a letter pattern to be displayed in the display device body 6. Explanation about the same components as the display device 10 in the display device 20 will be omitted.

The display device 20 further includes a distance measurement unit 22 in addition to components of the display device 10. The distance measurement unit 22 measures a distance 69 between the display device body 6 and the viewer and outputs information on the measured distance to the CPU 15 of the level adjusting unit 13.

The level adjusting unit 13 further includes a still image pattern thickness detecting unit 21 in addition to components of the level adjusting unit 13 of the display device 10. When the level difference C of the image data exceeds the set level difference, the coring 11 outputs the video data 53 to the still image pattern thickness detecting unit 21. The still image pattern thickness detecting unit 21 detects, as a length of a high level region, the number of pixels to which sub pixels having relatively high image data level for each color belong, of pairs of pixels composing the edge portion 60, that is, pixels belonging to the first group of pixels 51, and consecutively arranged in a direction away from pixels to which sub pixels having relatively low image data level belong, that is, pixels belonging to the second group of pixels 52, with the image data level of the sub pixels higher than a predetermined level, and detects, as a length of a low level region, the number of pixels belonging to the second group of pixels 52, of pairs of pixels composing the edge portion 60, and consecutively arranged in a direction away from pixels belonging to the first group of pixels 51, with the image data level of sub pixels lower than the predetermined level. In this way, the still image pattern thickness detecting unit 21 detects an image pattern of each pixel of the still image data included in the video data 53 and outputs an image pattern value indicating the thickness of the image pattern to the CPU 15.

The display device 20 uses, for example, ultrasonic waves in order to measure the distance 69 between the display device body 6 and the viewer. As shown in FIG. 7, the distance measurement 22 includes an ultrasonic oscillator 23, an ultrasonic detector 24 and a measurer 25. The ultrasonic oscillator 23 and the ultrasonic detector 24 are arranged in the front side of the display device body 6 (see FIG. 8). The ultrasonic oscillator 23 emits an ultrasonic wave 75 toward the viewer in the front of the display device body 6. The ultrasonic detector 24 detects a reflected wave 76 indicating the ultrasonic wave 75 reflected by the viewer in the front of the display device body 6. The measurer 25 measures the distance 69 between the display device body 6 and the viewer based on a time taken until the detection of the reflected wave 76 by the ultrasonic detector 24 after the emission of the ultrasonic wave 75 from the ultrasonic oscillator 23, and outputs the measured distance to the CPU 15.

While the viewer can perceive details of a picture displayed on a screen 6' of the display device body 6 as he approaches the display device body 6, he has high visual sensitivity to the noise 70. As a result, in the display device 10, the viewer may perceive deterioration of quality of image in and near the edge portion 60.

Accordingly, in the display device 20, if the distance 69 between the viewer and the display device body 6 is small, the width of the noise 70 becomes narrow {the width L (L1+L2) becomes the first width La (L1*a*+L2*a*)}, and, if the distance 69 between the viewer and the display device body 6 is large, the width of the noise 70 becomes wide {the width L (L1+L2) becomes the second width Lb (L1*b*+L2*b*)}. As a result, in the display device 20, the viewer does not perceive the deterioration of quality of image in and near the edge portion 60.

However, in the display device 10, if the first noise generating unit 14 adds the noise 70 having the same width {the width L (L1+L2) and the adjustment value (α×C)} to and near the edge portion 60, as the thickness of the image pattern of the still image data become small, it may become difficult for the viewer to perceive the image pattern due to the noise 70. Accordingly, if the thickness of the image pattern 54 of the still image data is small, the width of the noise becomes small. In this case, even if the distance 69 between the display device body 6 and the viewer is large, the width of the nose does not become wide, but is maintained at a constant value. If the thickness of the image pattern 54 of the still image data is large, the width of the noise is controlled depending on the distance 69 between the display device body 6 and the viewer.

As shown in FIG. 9A, in the display device 20, if the thickness of the image pattern 54 of the still image data is small, by narrowing the width {the width L (L1+L2)} of the noise 70 and generating noise 71 having the first width La (L1*a*+L2*a*) and the adjustment value (α×C), the viewer does not perceive the deterioration of quality of image in and near the edge portion 60. In this way, in the display device 20, if the thickness of the image pattern 54 of the still image data is small, the width of the noise 71 is determined by the thickness of the image pattern 54 of the still image data.

As shown in FIG. 9B, in the display device 20, if the thickness of the image pattern 55 of the still image data is large, the width {the width L (L1+L2)} of the noise 70 is controlled depending on the distance between the display device body 6 and the viewer.

Now, an operation of the display device 20 according to the present invention will be described. The display device 20 performs (I) mode setting process, (II) normal operation mode, (III-1) level adjustment operation mode by the distance measurement unit 22, (III-2) level adjustment operation mode by the CPU 15, and (IV) level adjustment operation mode. (I) mode setting process of the display device 20 is equal to (II) mode setting process of the display device 10, and (II) normal operation mode of the display device 20 is equal to (II) normal operation mode of the display device 10.

Figure 10:
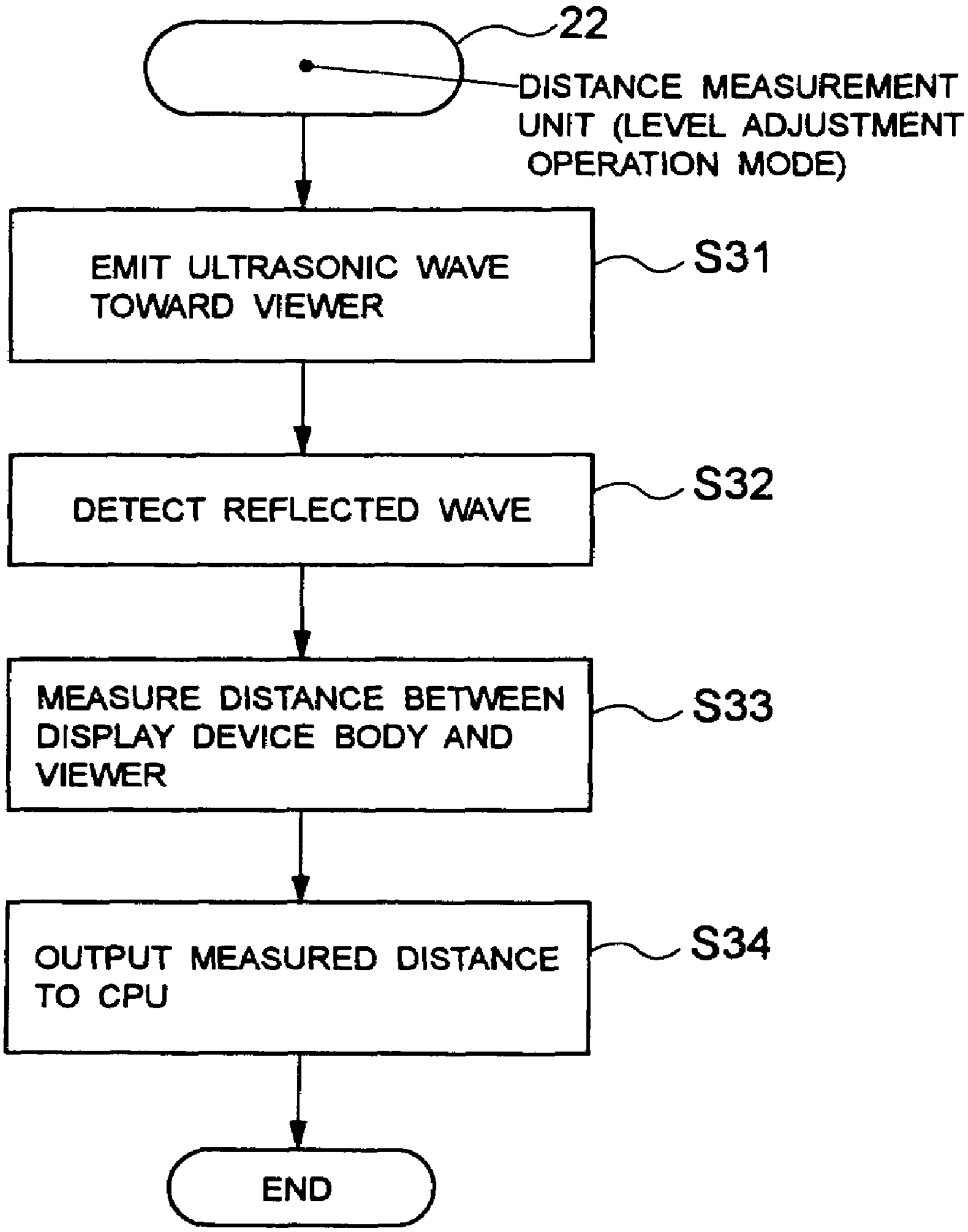
FIG. 10 is a flow chart illustrating (III-1) level adjustment operation mode by a distance measurement unit as an operation of a display device according to the second embodiment.

FIG. 10 is a flow chart illustrating (III-1) level adjustment operation mode by the distance measurement unit 22 as an operation of the display device 20 according to the present invention.

The viewer inputs power (power of the display device 20, power of a television connected to the display device 20, and power of a computer connected to the display device 20) to the display device 20 using the manipulating switch or the remote control terminal. In this case, the ultrasonic oscillator 23 emits the ultrasonic wave 75 toward the viewer in the front of the display device body 6 (Step S31). The ultrasonic wave 75 emitted from the ultrasonic oscillator 23 is reflected by the viewer in the front of the display device body 6. The ultrasonic detector 24 detects the reflected wave 76 reflected by the viewer (Step S32).

The measurer 25 counts a time taken until the detection of the reflected wave 76 by the ultrasonic detector 24 after the emission of the ultrasonic wave 75 from the ultrasonic oscillator 23. The measure 25 measures the distance 69 between the display device body 6 and the viewer based on the counted time (Step S33) and outputs the measured distance 69 as data to the CPU 15 (Step S34).

Figure 11:
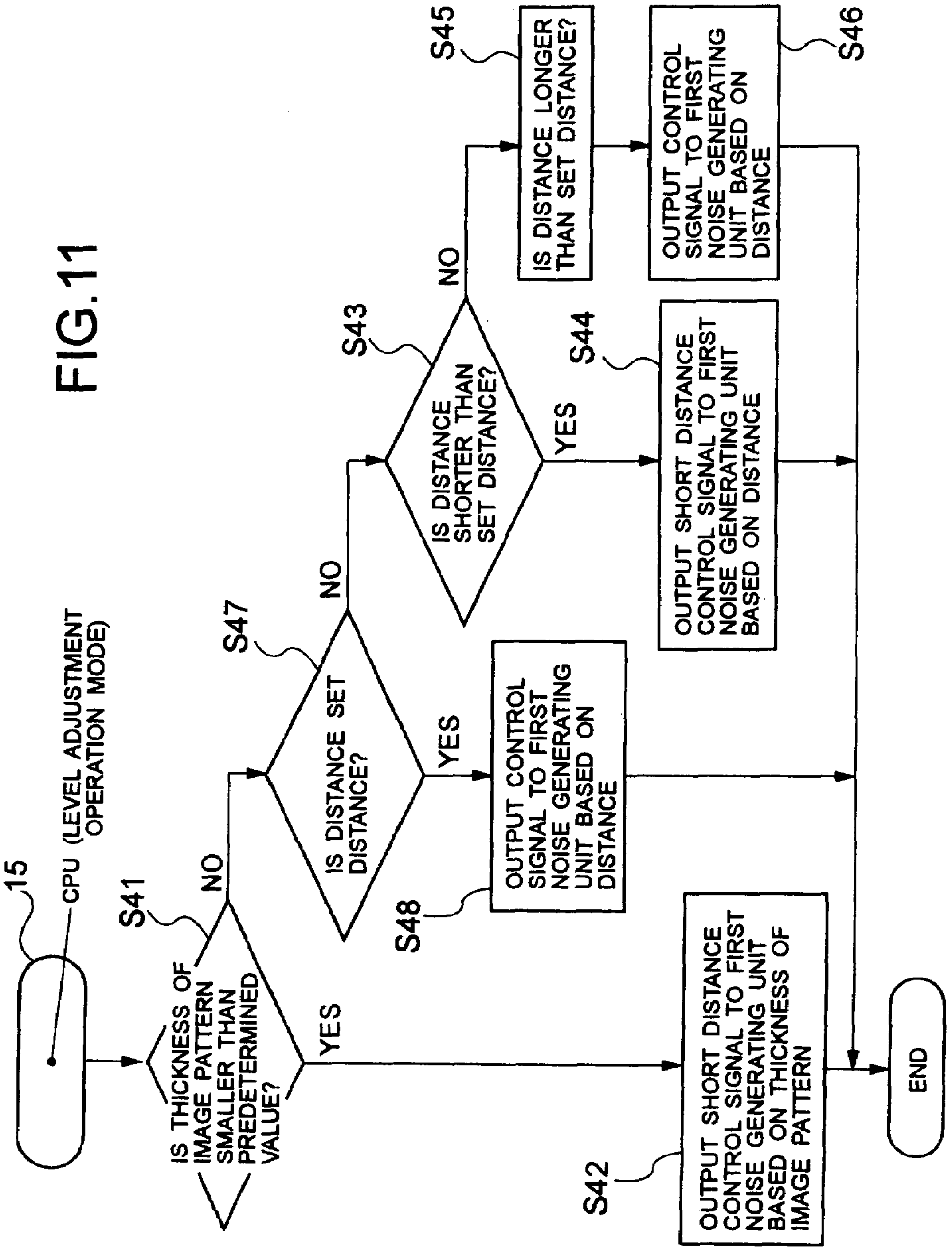
FIG. 11 is a flow chart illustrating (III-2) level adjustment operation mode by a CPU as an operation of a display device according to the second embodiment.

FIG. 11 is a flow chart illustrating (III-2) level adjustment operation mode by the CPU 15 as an operation of the display device 20 according to the present invention. The CPU 15 checks whether or not the thickness of the image pattern (image pattern value) of the still image data is less than a certain value (a predetermined image pattern value) based on the image pattern value from the still image pattern thickness detecting unit 21 (Step S41).

If the thickness of the image pattern of the still image data is less than the certain value (YES in Step S41), the CPU 15 outputs the short distance control signal 67 to the first noise generating unit 14 based on the image pattern value from the still image pattern thickness detecting unit 21 (Step S42). In this case, the first noise generating unit 14 generates the noise 70 having the first width La (L1_a_+L2_a_) and the adjustment value (α×C) in response to the short distance control signal 67 from the CPU 15.

If the thickness of the image pattern of the still image data is more than the certain value (NO in Step S41), the CPU 15 checks whether or not the distance 69 measured by the measurer 25 is within a set distance (Step S47).

As a result, if the distance 69 is the set distance (YES in Step S47), the CPU 15 outputs the control signal 66 to the first noise generating unit 14 based on the distance 69 (Step S48). In this case, the first noise generating unit 14 generates the noise 70 having the width L (L1+L2) and the adjustment value (α×C) in response to the control signal 66 from the CPU 15.

In addition, if the distance 69 is less than the set distance (NO in Step S47, YES in Step S43), the CPU 15 outputs the short distance control signal 67 to the first noise generating unit 14 based on the distance 69 measured by the measurer 25 (Step S44). In this case, the first noise generating unit 14 generates the noise 70 having the first width La (L1_a_+L2_a_) and the adjustment value (α×C) in response to the short distance control signal 67 from the CPU 15.

In addition, if the distance 69 is longer than the set distance (NO in Step S47, NO in Step S43, Step S45), the CPU 15 outputs the long distance control signal 68 to the first noise generating unit 14 based on the distance 69 measured by the measurer 25 (Step S46). The first noise generating unit 14 generates the noise 70 having the second width Lb (L1_b_+L2_b_) and the adjustment value (α×C) in response to the long distance control signal 68 from the CPU 15.

Figure 12:
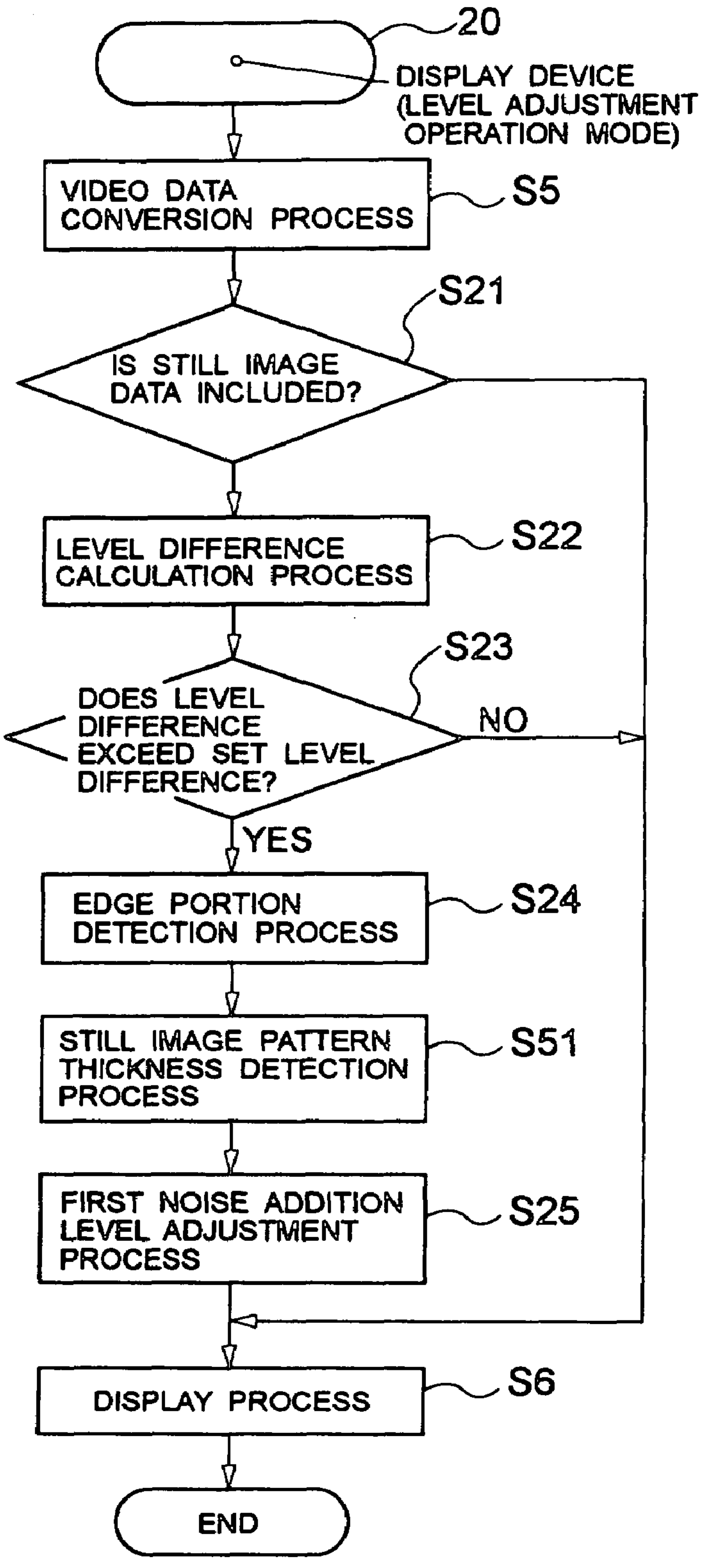
FIG. 12 is a flow chart illustrating (IV) level adjustment operation mode as an operation of a display device according to the second embodiment.

FIG. 12 is a flow chart illustrating (IV) level adjustment operation mode as an operation of the display device 20 according to the present invention.

In (IV) level adjustment operation mode, the display device 20 performs the same steps S5 (video data conversion process), S21 and S22 (level difference calculation process) as the display device 10 does.

If the level difference C of the image data is less than the set level difference, the coring 11 controls the switch 16 such that the video data 53 is outputted to the driving unit 5 (NO in Step S23). The driving unit 5 performs the same display process (Step S6) as the display device 10. The video data 53 displayed in the display device body 6 is seen by the viewer.

If the level difference C of the image data exceeds the set level difference, the coring 11 outputs the control signal based on the level difference C and the position information on the pixel group to the first noise generating unit 14 and outputs the video data 53 to the still image pattern thickness detecting unit 21 (YES in Step S23). The still image pattern thickness detecting unit 21 detects the image pattern of each pixel of the still image data included in the video data 53 and outputs the detected image pattern value to the CPU 15 (still image pattern thickness detection process; Step S51).

After the edge portion detection process (Step S24) and the still image pattern thickness detection process (Step S51) are performed, the first noise generating unit 14 performs the same first noise addition process (Step S25) as the display device 10 does, and the driving unit 5 performs the same display process (Step S6) as the display device 10 does. The video data 53 displayed in the display device body 6 is seen by the viewer.

As apparent from the above description, with the display device 20 according to the present invention, in addition to the effect of the display device 10, the viewer does not perceive the deterioration of quality of image in and near the edge portion 60. When the distance between the display device body 6 and a user (the viewer) is less than the set distance, the visual sensitivity of the viewer becomes high. On this account, in the display device 10 according to the first embodiment, the viewer may perceive the deterioration of image quality of the first group of pixels 51 and the second group of pixels 52 of the still image data included in the video data 53 due to the addition of noise. On the other hand, when the distance between the display device body 6 and the user (the viewer) is more than the set distance, the visual sensitivity of the viewer becomes low. On this account, in the display device 10, it may become difficult for the viewer to perceive the image pattern of the still image data included in the video data 53. With the display device 20 according to the present invention, the width L (L1+L2) is adjusted by the distance between the display device body 6 and the user (the viewer) and the thickness of the image pattern of the still image data. Accordingly, with the display device 20 according to the present invention, the viewer does not perceive the deterioration of image quality in and near the edge portion 60.

Figure 13:
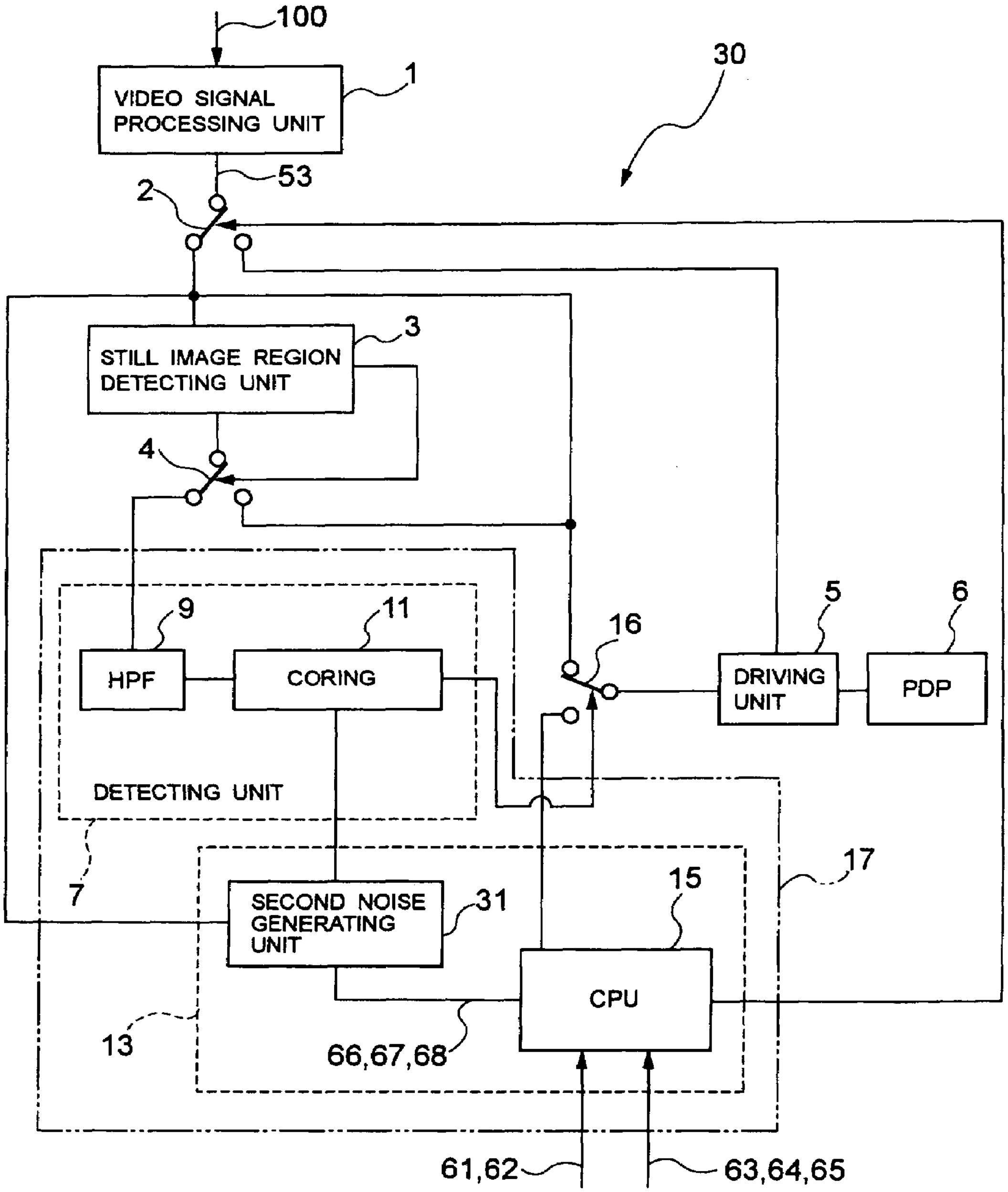
FIG. 13 is a block diagram illustrating a display device according to a third embodiment of the present invention.
Figure 14:
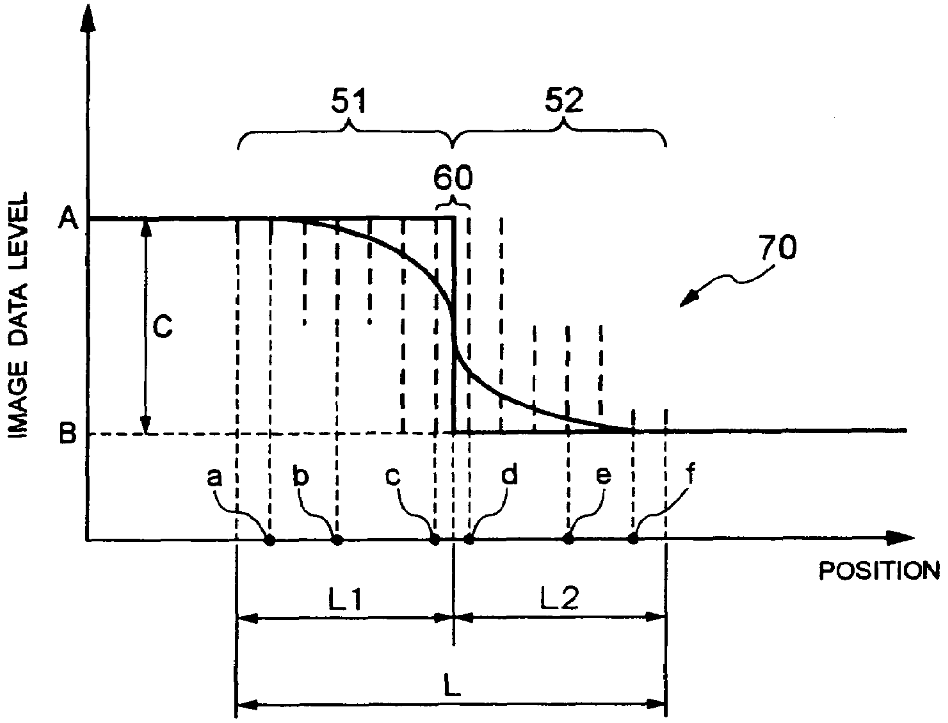
FIG. 14 is a graphic diagram illustrating a spatial distribution of an image data level, with a horizontal axis as a position and a vertical axis as an image data level.
Figure 15:
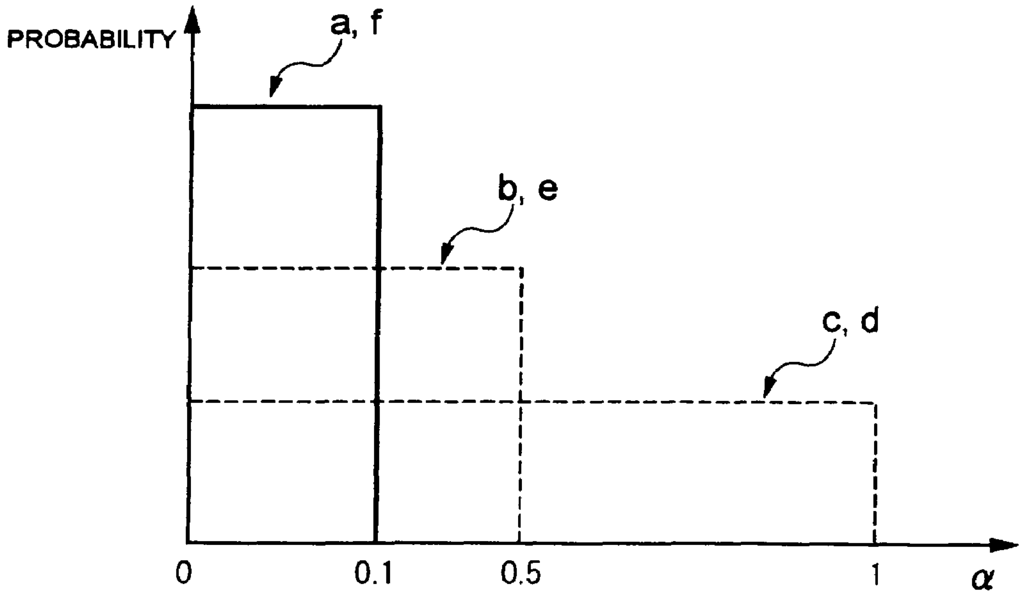
FIG. 15 is a graphic diagram illustrating a probability distribution of a random coefficient $\alpha$, with a horizontal axis as a random coefficient $\alpha$ and a vertical axis as a probability.

Next, a third embodiment of the present invention will be described. FIG. 13 is a block diagram illustrating a configuration of a display device 30 according to a third embodiment of the present invention, FIG. 14 is a graphic diagram illustrating a spatial distribution of an image data level, with a horizontal axis as a position and a vertical axis as an image data level, and FIG. 15 is a graphic diagram illustrating a probability distribution of a random coefficient α, with a horizontal axis as a random coefficient α and a vertical axis as a probability. Explanation about the same components as those of the display device 10 in the display device 30 will be omitted.

A display device 30 will be described with reference to FIGS. 13 to 15. Probability distributions of random coefficients α are equal in the display devices 10 and 20 independent of a position (pixel). In the display device 30, probability distributions for random coefficients α are prepared for respective positions (pixels). For example, as a method using the probability distribution, as shown in FIG. 14, for a position a (position f) within a predetermined width L1 (L2) distant from the edge portion 60, values between 0 to 0.1 as the random coefficient α (see FIG. 15) are set in a noise generating unit 31, which will be described later. For a position b (position e) within the predetermined width L1 (L2) between the edge portion 60 and the position a (position f), values between 0 to 0.5 as the random coefficient α (see FIG. 15) are set in the noise generating unit 31, which will be described. For a position c (position d), which is the edge portion 60, values between 0 to 1 as the random coefficient α (see FIG. 15) are set in the noise generating unit 31, which will be described later.

By using this method, when the random coefficient α for the position a (position f) is within a range of 0 to 0.1, the random coefficient α for the position b (position e) is within a range of 0 to 0.5, and the random coefficient α for the position c (position d) is within a range of 0 to 1, a time-average of the image data level of the predetermined width L shows a smooth variation of position of the image data level in the first group of pixels 51 and the second group of pixels 52, as shown in FIG. 14. As a result, with the display device 30 according to the present invention, the burn-in can be more reliably prevented even when the still image data having the same image pattern is displayed in the display device main body 6 for a long time, as compared to the display devices 10 and 20 according to the first and second embodiments, respectively.

As shown in FIG. 13, the adjusting portion of the level adjusting unit 13 includes a second noise generating unit 31 instead of the first noise generating unit 14 in the display device 10. When the image data level in the first group of pixels 51 and the second group of pixels 52 is adjusted, since the original level values A and B are required in addition to the level difference C, the video data 53 from the video signal processing unit 1 is inputted to the second noise generating unit 31.

The second noise generating unit 31 determines the width L (L1+L2) and the adjustment value, (α×C), in response to the control signal 66. The adjustment value, (α×C), determined by the second noise generating unit 31 includes a first distribution adjustment value, (α1×C), representing the adjustment value, (α×C), at a first position in the spatial width L of (L1+L2) of the first group of pixels 51 and the second group of pixels 52, and a second distribution adjustment value, (α2×C), representing the adjustment value, (α×C), at a second position at which the edge portion 60, having adjacent pixels with the boundary between the first group of pixels 51 and the second group of pixels 52 interposed between the adjacent pixels, is placed. The first position includes the positions a, b, e, and f. When the first position is the position a (position f), the random coefficient α1 is within a range of 0 to 0.1, and, when the first position is the position b (position e), the random coefficient α1 is within a range of 0 to 0.5. The second position is the position c (position d) and the random coefficient α2 is within a range of 0 to 1.

As described above, the first level value A representing the image data level of the first group of pixels 51 is larger than the second level value B representing the image data level of the second group of pixels 52. In this case, when the image data level at the position a of the first group of pixels 51 is adjusted, the second noise generating unit 31 generates a first distribution adjustment level value, (A−α1×C), by subtracting the first distribution adjustment value, (α1×C) (α1=0 to 0.1), from the first level value A representing the image data level of the position a of the first group of pixels 51. When the image data level at the position b of the first group of pixels 51 is adjusted, the second noise generating unit 31 generates the first distribution adjustment level value, (A−α1×C), by subtracting the first distribution adjustment value, (α1×C) (α1=0 to 0.5), from the first level value A representing the image data level of the position b of the first group of pixels 51. When the image data level at the position c at which the edge portion 60 of the first group of pixels 51 is placed is adjusted, the second noise generating unit 31 generates a second distribution adjustment level value, (A−α2×C), by subtracting the second distribution adjustment value, (α2×C) (α2=0 to 1), from the first level value A representing the image data level of the position c of the first group of pixels 51. When the image data level at the position d at which the edge portion 60 of the second group of pixels 52 is placed is adjusted, the second noise generating unit 31 generates a third distribution adjustment level value, (B+α2×C), by adding the second distribution adjustment value, (α2×C) (α2=0 to 1), to the second level value B representing the image data level of the position d of the second group of pixels 52. When the image data level at the position e of the second group of pixels 52 is adjusted, the second noise generating unit 31 generates a fourth distribution adjustment level value, (B+α1×C), by adding the first distribution adjustment value, (α1×C) (α1=0 to 0.5), to the second level value B representing the image data level of the position e of the second group of pixels 52. When the image data level at the position f of the second group of pixels 52 is adjusted, the second noise generating unit 31 generates the fourth distribution adjustment level value, (B+α1×C), by adding the first distribution adjustment value, (α1×C) (α1=0 to 0.1), to the second level value B representing the image data level of the position f of the second group of pixels 52. In this way, the second noise generating unit 31 adjusts the image data level of the first group of pixels 51 and the second group of pixels 52.

Now, an operation of the display device 30 according to the present invention will be described. The display device 30 performs (I) mode setting process, (II) normal operation mode, (III) level adjustment operation mode by the CPU 15, and (IV) level adjustment operation mode. (I) mode setting process of the display device 30 is equal to (I) mode setting process of the display device 10, and (II) normal operation mode of the display device 30 is equal to (II) normal operation mode of the display device 10.

Figure 16:
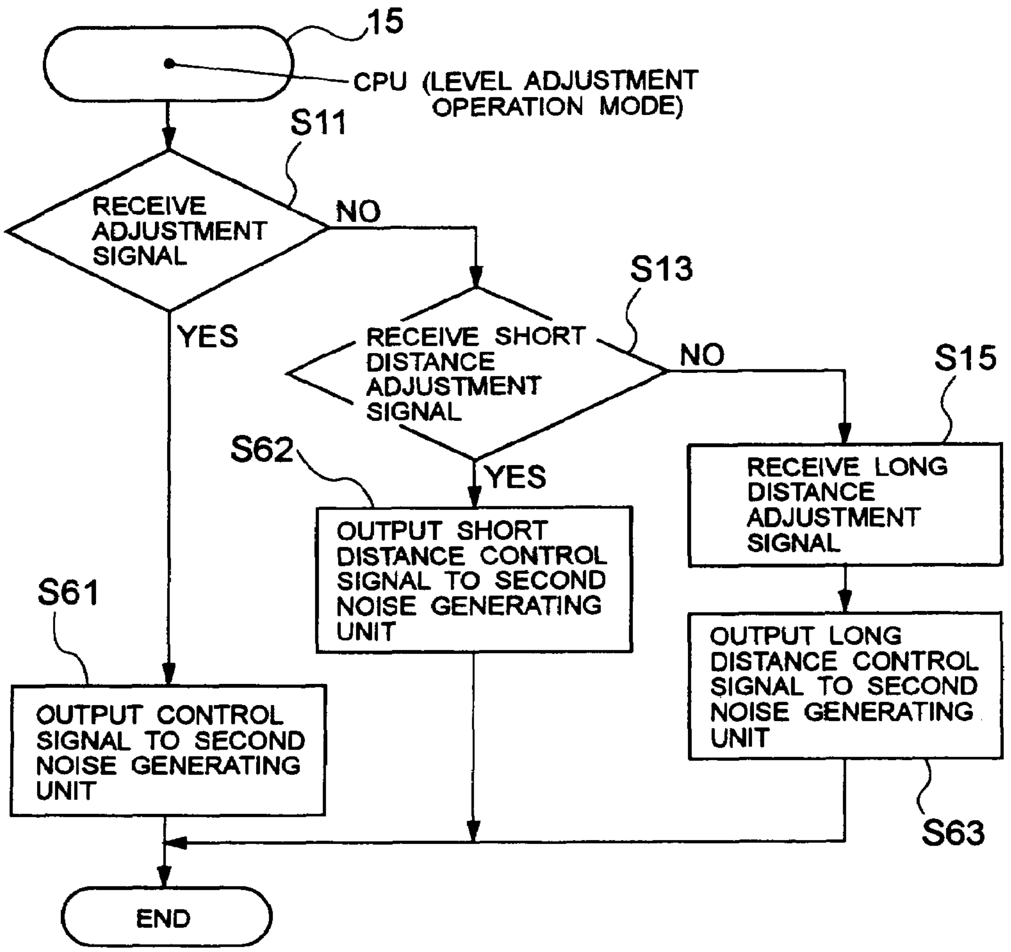
FIG. 16 is a flow chart illustrating (III) level adjustment operation mode by a CPU 15 as an operation of a display device according to the third embodiment.

FIG. 16 is a flow chart illustrating (III) level adjustment operation mode by the CPU 15 as an operation of the display device 30 according to the present invention. The adjustment value, (α×C), and the predetermined width L (L1+L2) are adjustable by the viewer.

When the viewer provides the adjustment signal 63 to the display device 30 using the manipulating switch or the remote control terminal, the adjustment signal 63 is provided to the CPU 15 (YES in Step S11). The CPU 15 outputs the control signal 66 to the second noise generating unit 31 in response to the adjustment signal 63 (Step S61). The second noise generating unit 31 determines the width L (L1+L2) and the adjustment value of (α×C) in response to the control signal 66 from the CPU 15. The second noise generating unit 31 determines the positions a and b and the positions e and f within the first group of pixels 51 having the width of L1 and the second group of pixels 52 having the width of L2, respectively, in response to the control signal 66 from the CPU 15.

When the viewer provides the short distance adjustment signal 64 to the display device 30 using the manipulating switch or the remote control terminal, the short distance adjustment signal 64 is provided to the CPU 15 (NO in Step S11, YES in Step S13). The CPU 15 outputs the short distance control signal 67 to the second noise generating unit 31 in response to the short distance adjustment signal 64 (Step S62). The second noise generating unit 31 determines the first width La (L1*a*+L2*a*) (La=0.8×L) in response to the short distance control signal 67 from the CPU 15. The second noise generating unit 31 determines the positions a and b and the positions e and f within the first group of pixels 51 having the width of L1*a* and the second group of pixels 52 having the width of L2*a*, respectively, in response to the short distance control signal 67 from the CPU 15. At this time, for the positions a to f, the range of the random coefficient α in each pixel is adjusted.

When the viewer provides the long distance adjustment signal 65 to the display device 30 using the manipulating switch or the remote control terminal, the long distance adjustment signal 65 is provided to the CPU 15 (NO in Step S11, NO in Step S13, Step S15). The CPU 15 outputs the long distance control signal 68 to the second noise generating unit 31 in response to the long distance adjustment signal 65 (Step S63). The second noise generating unit 31 determines the second width Lb (L1*b*+L2*b*) (Lb=1.2×L) in response to the long distance control signal 68 from the CPU 15. The second noise generating unit 31 determines the positions a and b and the positions e and f within the first group of pixels 51 having the width of L1*b* and the second group of pixels 52 having the width of L2*b*, respectively, in response to the long distance control signal 68 from the CPU 15. At this time, for the positions a to f, the range of the random coefficient α in each pixel is adjusted.

Figure 17:
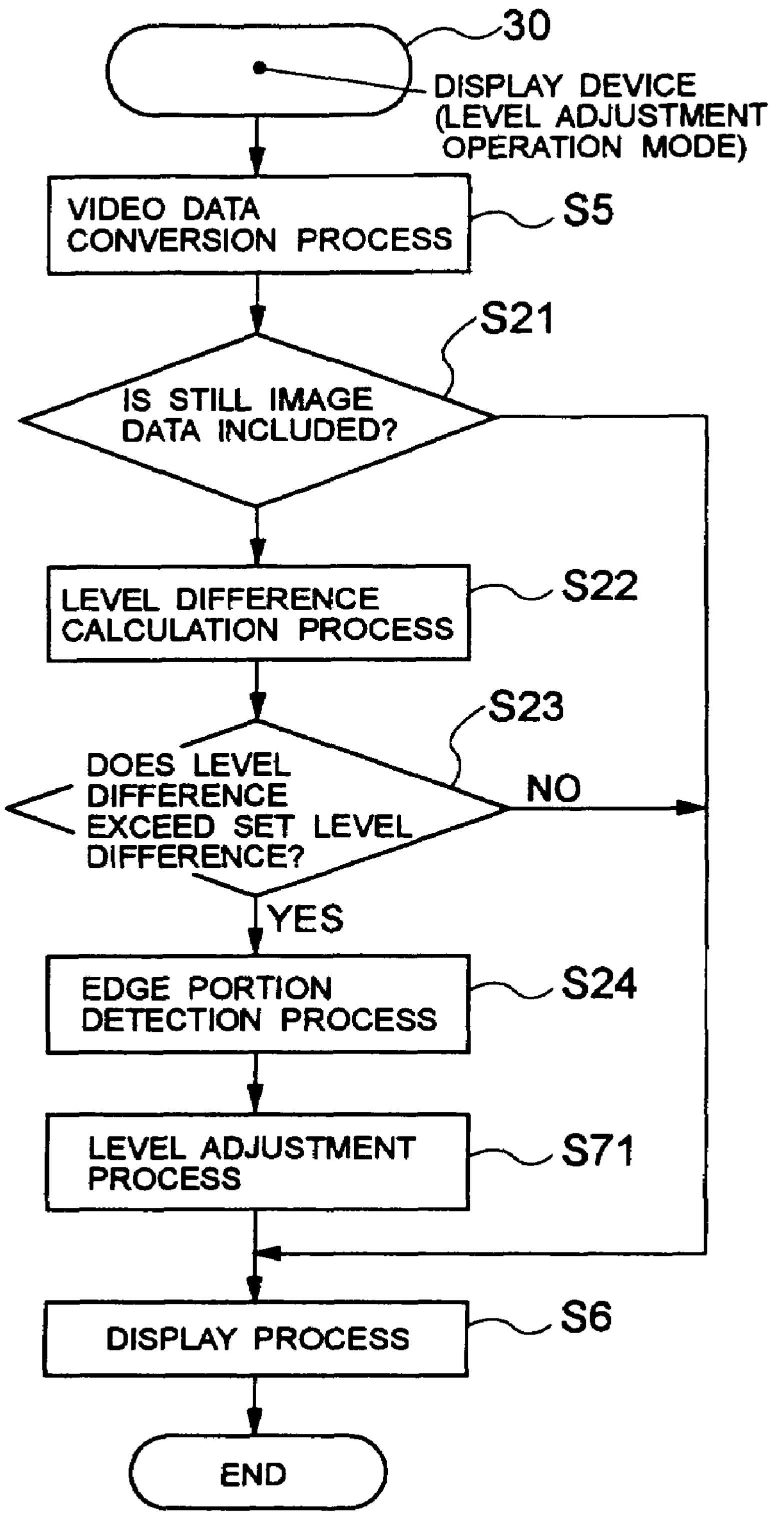
FIG. 17 is a flow chart illustrating (IV) level adjustment operation mode as an operation of a display device according to the third embodiment.

FIG. 17 is a flow chart illustrating (IV) level adjustment operation mode as an operation of the display device 30 according to the present invention. In (IV) level adjustment operation mode, the display device 30 performs the step S5 (video data conversion process), S21, S22 (level difference calculation process), S23, and S24 (edge portion detection process) of (IV) level adjustment operation mode of the display device 10. After the edge portion detection process (Step S24) is performed, the second noise generating unit 31 performs a level adjustment process (Step S71).

In the level adjustment process (Step S71), the second noise generating unit 31 determines the width L (L1+L2) and the adjustment value, (α×C), in response to the control signal 66 from the CPU 15. In this case, the second noise generating unit 31 generates the first distribution adjustment level value, (A−α1×C), by subtracting the first distribution adjustment value, (α1×C) (α1=0 to 0.1), from the first level value A representing the image data level of the position a of the first group of pixels 51, and generates the first distribution adjustment level value, (A−α1×C), by subtracting the first distribution adjustment value, (α1×C) (α1=0 to 0.5), from the first level value A representing the image data level of the position b of the first group of pixels 51. The second noise generating unit 31 generates the second distribution adjustment level value, (A−α2×C), by subtracting the second distribution adjustment value, (α2×C) (α2=0 to 1), from the first level value A representing the image data level of the position c of the first group of pixels 51. The second noise generating unit 31 generates the third distribution adjustment level value, (B+α2×C), by adding the third distribution adjustment value, (α2×C) (α2=0 to 1), to the second level value B representing the image data level of the position d of the second group of pixels 52. The second noise generating unit 31 generates the fourth distribution adjustment level value, (B+α1×C), by adding the first distribution adjustment value, (α1×C) (α1=0 to 0.5), to the second level value B representing the image data level of the position e of the second group of pixels 52, and generates the fourth distribution adjustment level value, (B+α1×C), by adding the first distribution adjustment value, (α1×C) (α1=0 to 0.1), to the second level value B representing the image data level of the position f of the second group of pixels 52. The second noise generating unit 31 outputs the video data 53 having the adjusted image data level of the first group of pixels 51 and the second group of pixels 52 to the driving unit 5 via the switch 16. The driving unit 5 performs the same display process (Step S6) as the display device 10 does. The video data 53 displayed in the display device body 6 is seen by the viewer.

In the level adjustment process (Step S71), the second noise generating unit 31 determines the width La (L1*a*+L2*a*) (La=0.8×L) in response to the short distance control signal 67 from the CPU 15. In this case, the second noise generating unit 31 generates the first distribution adjustment level value, (A−α1×C), by subtracting the first distribution adjustment value, (α1×C) (α1=0 to 0.1), from the first level value A representing the image data level of the position a of the first group of pixels 51, and generates the first distribution adjustment level value, (A−α1×C), by subtracting the first distribution adjustment value, (α1×C) (α1=0 to 0.5), from the first level value A representing the image data level of the position b of the first group of pixels 51. The second noise generating unit 31 generates the second distribution adjustment level value, (A−α2×C), by subtracting the second distribution adjustment value, (α2×C) (α2=0 to 1), from the first level value A representing the image data level of the position c of the first group of pixels 51. The second noise generating unit 31 generates the third distribution adjustment level value, (B+α2×C), by adding the second distribution adjustment value, (α2×C) (α2=0 to 1), to the second level value B representing the image data level of the position d of the first group of pixels 51. The second noise generating unit 31 generates the third distribution adjustment level value, (B+α1×C), by adding the first distribution adjustment value, (α1×C) (α1=0 to 0.5), to the second level value B representing the image data level of the position e of the second group of pixels 52, and generates the third distribution adjustment level value, (B+α1×C), by adding the first distribution adjustment value, (α1×C) (α1=0 to 0.1), to the second level value B representing the image data level of the position f of the second group of pixels 52. The second noise generating unit 31 outputs the video data 53, having the adjusted image data level of the edge portion 60 and the width L1*a* of the first group of pixels 51 and the adjusted image data level of the edge portion 60 and the width L2*a* of the second group of pixels 52, to the driving unit 5 via the switch 16. The driving unit 5 performs the same display process (Step S6) as the display device 10 does. The video data 53 displayed in the display device body 6 is seen by the viewer.

In the level adjustment process (Step S71), the second noise generating unit 31 determines the width Lb (L1*b*+L2*b*) (Lb=1.2×L) in response to the long distance control signal 68 from the CPU 15. The second noise generating unit 31 generates the first distribution adjustment level value, (A−α1×C), by subtracting the first distribution adjustment value, (α1×C) (α1=0 to 0.1), from the first level value A representing the image data level of the position a of the first group of pixels 51, and generates the first distribution adjustment level value, (A−α1×C), by subtracting the first distribution adjustment value, (α1×C) (α1=0 to 0.5), from the first level value A representing the image data level of the position b of the first group of pixels 51. The second noise generating unit 31 generates the second distribution adjustment level value, (A−α2×C), by subtracting the second distribution adjustment value, (α2×C) (α2=0 to 1), from the first level value A representing the image data level of the position c of the first group of pixels 51. The second noise generating unit 31 generates the third distribution adjustment level value, (B+α2×C), by adding the second distribution adjustment value, (α2×C) (α2=0 to 1), to the second level value B representing the image data level of the position d of the first group of pixels 51. The second noise generating unit 31 generates the fourth distribution adjustment level value, (B+α1×C), by adding the first distribution adjustment value, (α1×C) (α1=0 to 0.5), to the second level value B representing the image data level of the position e of the second group of pixels 52, and generates the fourth distribution adjustment level value, (B+α1×C), by adding the first distribution adjustment value, (α1×C) (α1=0 to 0.1), to the second level value B representing the image data level of the position f of the second group of pixels 52. The second noise generating unit 31 outputs the video data 53, having the adjusted image data level of the edge portion 60 and the width L1*b* of the first group of pixels 51 and the adjusted image data level of the edge portion 60 and the width L2*b* of the second group of pixels 52, to the driving unit 5 via the switch 16. The driving unit 5 performs the same display process (Step S6) as the display device 10 does. The video data 53 displayed in the display device body 6 is seen by the viewer.

As described above, with the display device 30 according to this embodiment, by determining the width L (L1+L2) and the adjustment value (α×C) using the second noise generating unit 31, the image data level of the first group of pixels 51 and the second group of pixels 52 of the still image data included in the video data 53 is adjusted. Accordingly, with the display device 30 according to the present invention, the burn-in can be reduced (unobservable) and the deterioration of display quality of the display device body 6 can be prevented.

In addition, with the display device 30 according to this embodiment, by reducing the burn-in, the lifetime of the display device body 6 (the display device 30) can be prolonged over the conventional display device.

Fourth Embodiment

Figure 18:
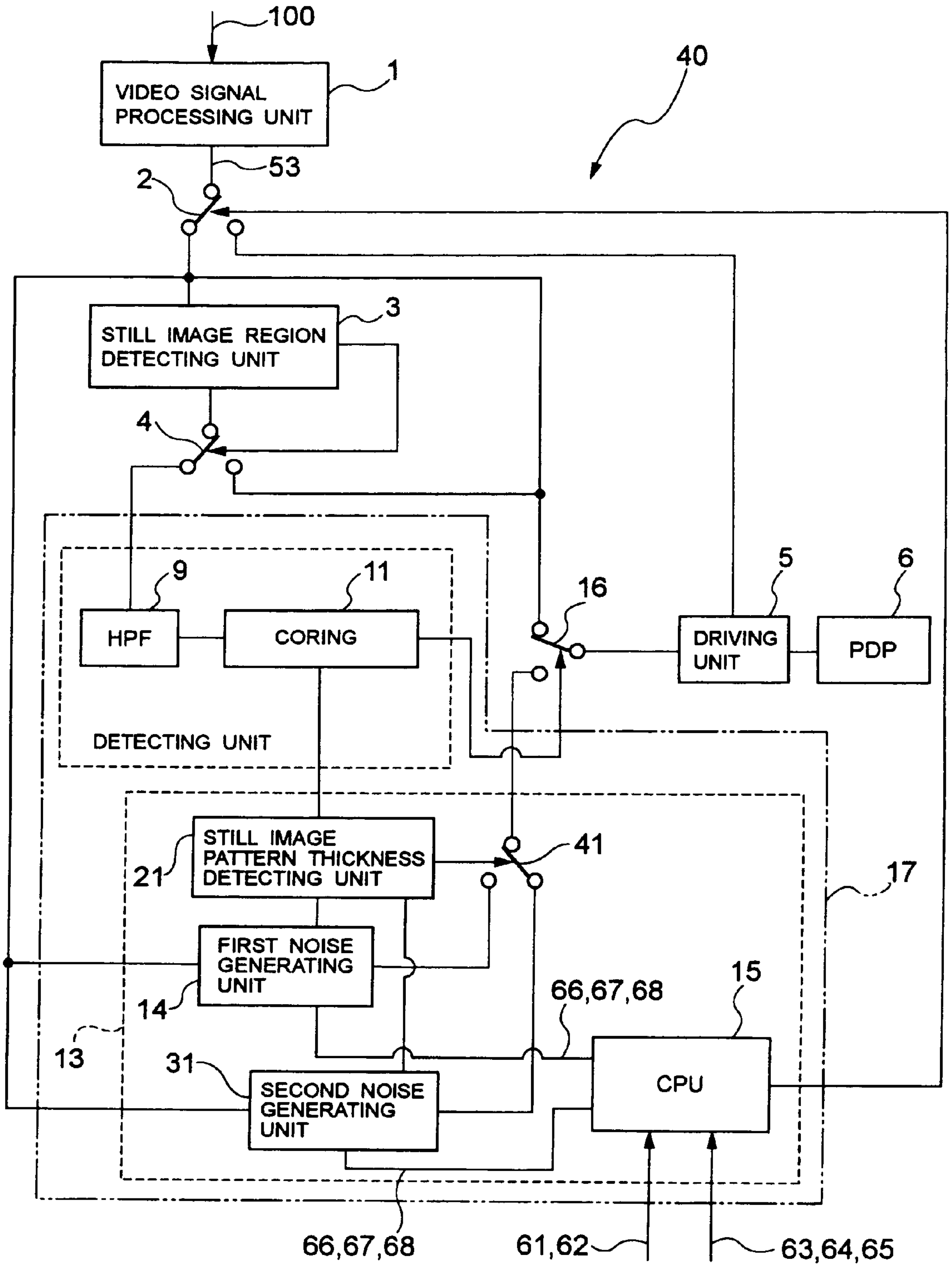
FIG. 18 is a block diagram illustrating a display device according to a fourth embodiment of the present invention.

Next, a fourth embodiment of the present invention will be described. FIG. 18 is a block diagram illustrating a configuration of a display device 40 according to the fourth embodiment of the present invention. Explanation about the same components as those of the display devices 10, 20 and 30 will be omitted in the display device 40.

The level adjusting unit 13 further includes the still image pattern thickness detecting unit 21, the second noise generating unit 31, and a switch 41 in addition to components of the level adjusting unit 13 of the display device 10. The switch 41 is switched over by a signal from the still image pattern thickness detecting unit 21.

The detecting unit 7 detects, as the edge portion 60, adjacent pixels with the boundary between the first group of pixels 51 and the second group of pixels 52 interposed between the adjacent pixels and outputs the video data 53 to the still image pattern thickness detecting unit 21. The still image pattern thickness detecting unit 21 detects the image pattern of pixels of the still image data included in the video data 53 and generates an image pattern value representing the thickness of the image pattern. If the image pattern value is larger than a predetermined image pattern value, the still image pattern thickness detecting unit 21 outputs the video data 53 to the first noise generating unit 14 and controls the switch 41 such that the first noise generating unit 14 is connected to the driving unit 5 via the switch 16. If the image pattern value is smaller than the predetermined image pattern value, the still image pattern thickness detecting unit 21 outputs the video data 53 to the second noise generating unit 31 and controls the switch 41 such that the second noise generating unit 31 is connected to the driving unit 5 via the switch 16.

When the image data level of the first group of pixels 51 and the second group of pixels 52 is adjusted, since the level values A and B of original image data are required in addition to the level difference C, the video data 53 from the video signal processing unit 1 is inputted to the first noise generating unit 14 and the second noise generating unit 31.

In the display device 10 according to the first embodiment, the first noise generating unit 14 adds the noise 70 having the same probability distribution, that is, the noise whose level may be expressed as the adjustment value, (A−α×C), or the adjustment value, (B+α×C), to the edge portion 60 and portions other than the edge portion 60 in the first group of pixels 51 and the second group of pixels 52. However, in this case, as the thickness of the image pattern of the still image data becomes small, it may become difficult for the viewer to perceive the image pattern due to the noise 70.

Accordingly, in the display device 40 according to the this embodiment, if the thickness of the image pattern of the still image data is smaller than a certain value (a predetermined image pattern value), the burn-in is prevented by adjusting the image data level in and near the edge portion 60 using the second noise generating unit 31, without adding the noise in and near the edge portion 60 using the first noise generating unit 14.

Figure 22:
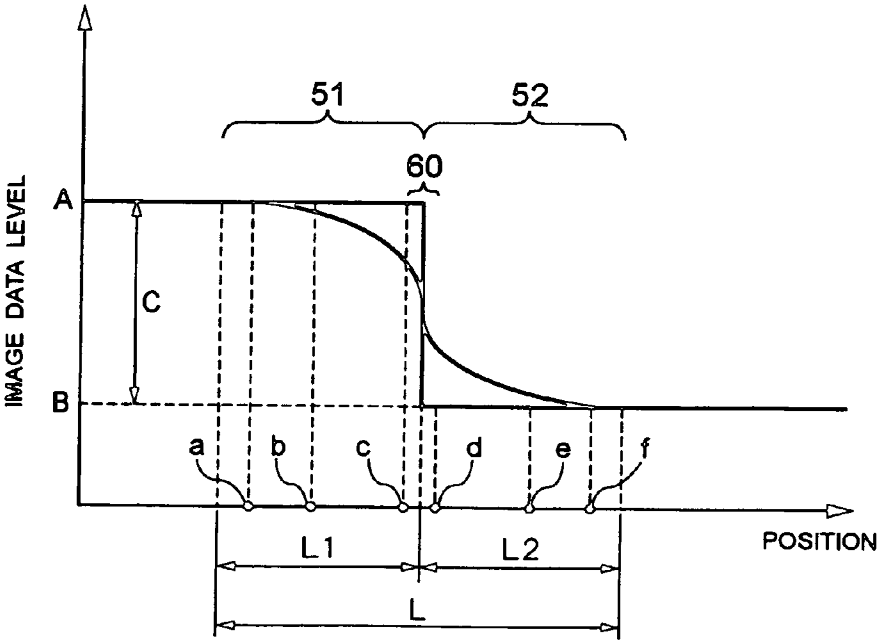
FIG. 22 is a graphic diagram illustrating a spatial distribution of an image data level, with a horizontal axis as a position on a screen and a vertical axis as an image data level.

FIG. 22 is a graphic diagram illustrating a spatial distribution of the image data level, with a horizontal axis as a position on a screen and a vertical axis as the image data level. Now, the second noise generating unit 31 will be described with reference to FIG. 22. The second noise generating unit 31 acts to smooth a sudden positional variation of the image data level of the edge portion 60. More specifically, the level difference C of the edge portion 60 is multiplied by a random coefficient α, a result of the multiplication is subtracted from the first level value A, and a result of the subtraction is added to the second level value B. Here, α is a positive number between 0 and 0.5 and is determined among the positions a, b, c, d, e, and f. For example, when α=0.05 for the position a (position f), α=0.25 for the position b (position e), and α=0.5 for the position c (position d), the positional variation of the image data level of the edge portion 60 is smoothed. Here, α is not randomly varied, but is fixed at a constant value in time.

Now, an operation of the display device 40 according to this embodiment will be described. The display device 40 performs (I) mode setting process, (II) normal operation mode, (III) level adjustment operation mode by the CPU 15, and (IV) level adjustment operation mode. (I) mode setting process of the display device 40 is equal to (I) mode setting process of the display device 10, and (II) normal operation mode of the display device 40 is equal to (II) normal operation mode of the display device 10.

Figure 19:
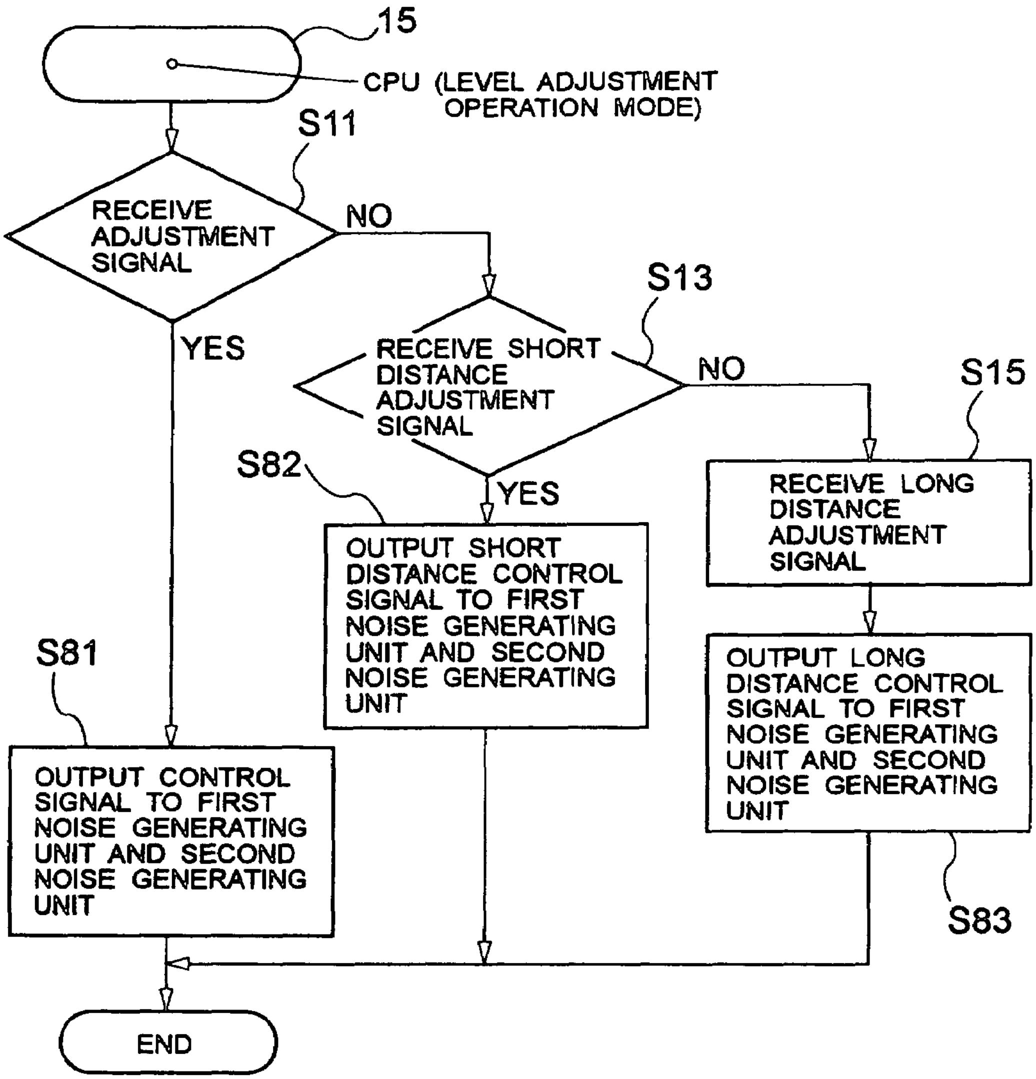
FIG. 19 is a flow chart illustrating (III) level adjustment operation mode by a CPU as an operation of a display device according to the fourth embodiment.

FIG. 19 is a flow chart illustrating (III) level adjustment operation mode by the CPU 15 as an operation of the display device 40 according to this embodiment.

When the viewer provides the adjustment signal 63 to the display device 40 using the manipulating switch or the remote control terminal, the adjustment signal 63 is provided to the CPU 15 (YES in Step S11). The CPU 15 outputs the control signal 66 to the first noise generating unit 14 and the second noise generating unit 31 in response to the adjustment signal 63 (Step S81). The first noise generating unit 14 generates the noise 70 having the width L (L1+L2) and the adjustment value of (α×C) in response to the control signal 66 from the CPU 15. The second noise generating unit 31 determines the width L (L1+L2) and the adjustment value of (α×C) in response to the control signal 66 from the CPU 15. The second noise generating unit 31 determines the positions a, b, d, and e within the width L (L1+L2) in response to the control signal 66 from the CPU 15. Here, α in the second noise generating unit 31 is not randomly varied, but is fixed for a position.

When the viewer provides the short distance adjustment signal 64 to the display device 40 using the manipulating switch or the remote control terminal, the short distance adjustment signal 64 is provided to the CPU 15 (NO in Step S11, YES in Step S13). The CPU 15 outputs the short distance control signal 67 to the first noise generating unit 14 and the second noise generating unit 31 in response to the short distance adjustment signal 64 (Step S82). The first noise generating unit 14 generates the noise 70 having the first width La (L1*a*+L2*a*) (La=0.8×L) and the adjustment value of (α×C) in response to the short distance control signal 67 from the CPU 15. The second noise generating unit 31 determines the first width La (L1*a*+L2*a*) in response to the short distance control signal 67 from the CPU 15. The second noise generating unit 31 determines the positions a, b, e, and f within the first width La (L1*a*+L2*a*) in response to the short distance control signal 67 from the CPU 15.

When the viewer provides the long distance adjustment signal 65 to the display device 40 using the manipulating switch or the remote control terminal, the long distance adjustment signal 65 is provided to the CPU 15 (NO in Step S11, NO in Step S13, Step S15). The CPU 15 outputs the long distance control signal 68 to the first noise generating unit 14 and the second noise generating unit 31 in response to the long distance adjustment signal 65 (Step S83). The first noise generating unit 14 generates the noise 70 having the second width Lb (L1*b*+L2*b*) (Lb=1.2×L) and the adjustment value of (α×C) in response to the long distance control signal 68 from the CPU 15. The second noise generating unit 31 determines the second width Lb (L1*b*+L2*b*) in response to the long distance control signal 68 from the CPU 15. The second noise generating unit 31 determines the positions a, b, e, and f within the second width Lb (L1*b*+L2*b*) in response to the long distance control signal 68 from the CPU 15.

Figure 20:
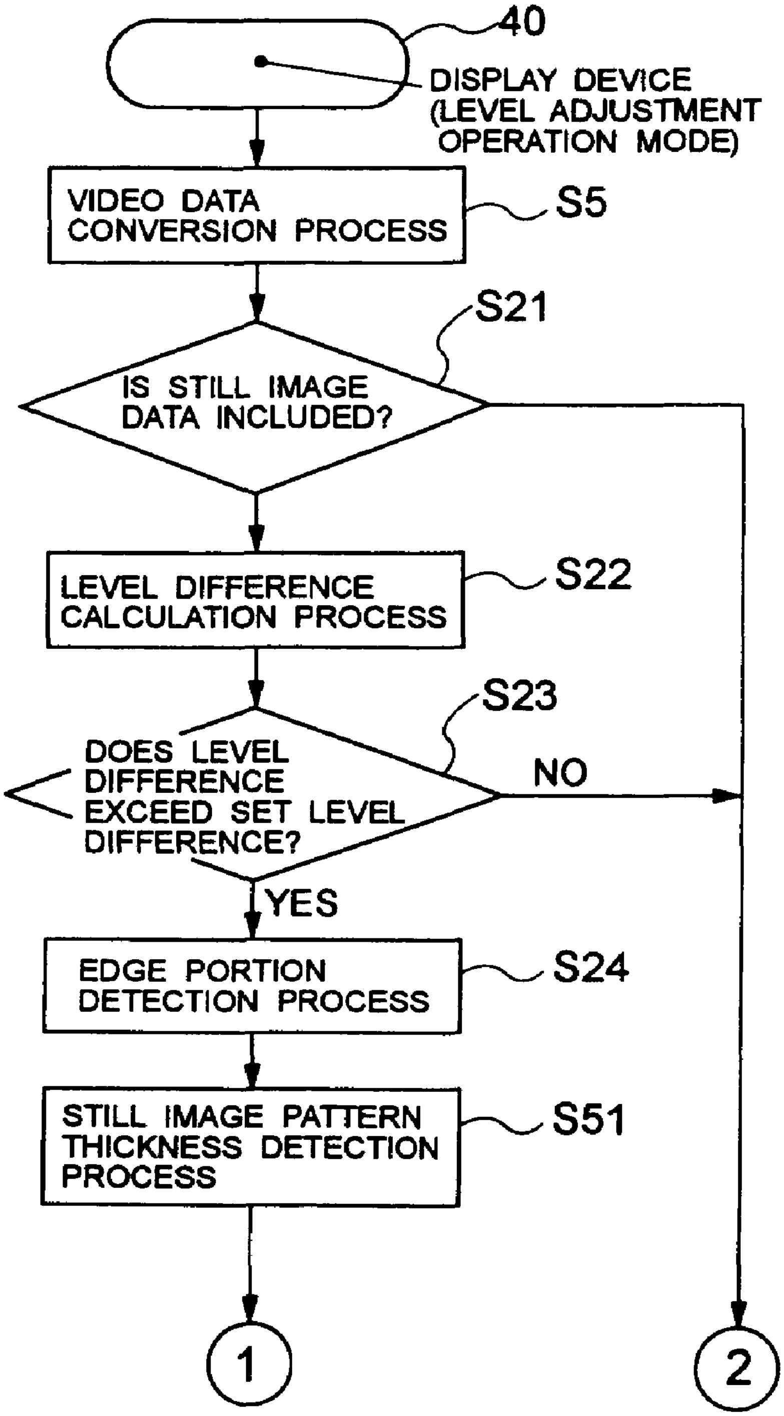
FIG. 20 is a flow chart illustrating (IV) level adjustment operation mode as an operation of a display device according to the fourth embodiment.
Figure 21:
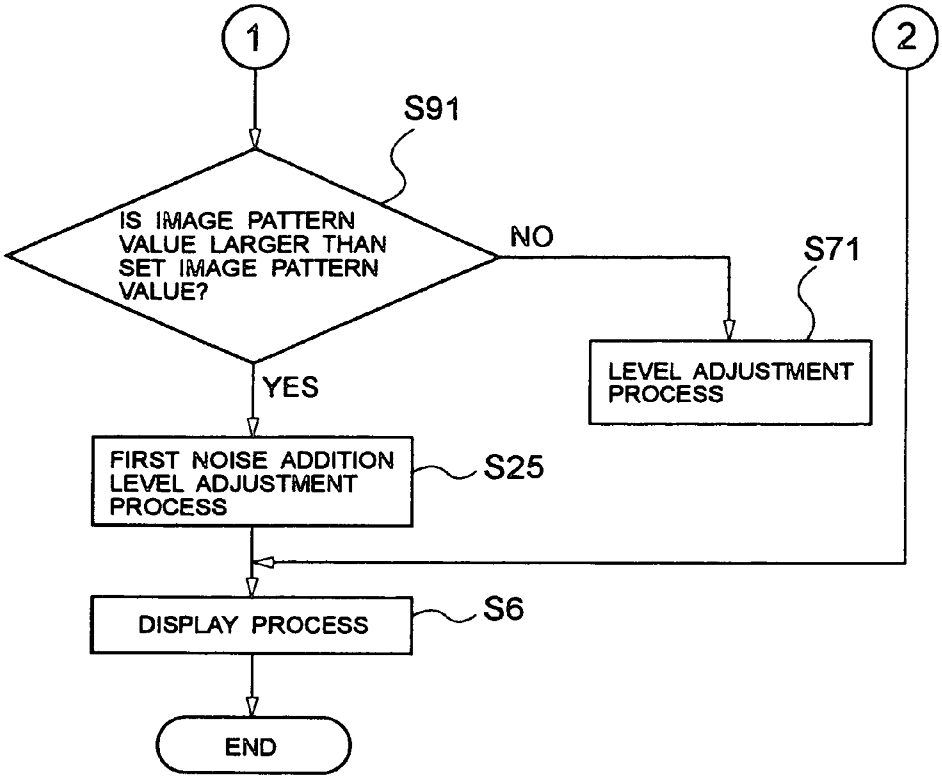
FIG. 21 is a flow chart illustrating (IV) level adjustment operation mode as an operation of a display device according to the fourth embodiment.

FIGS. 20 and 21 are flow charts illustrating (IV) level adjustment operation mode as an operation of the display device 40 according to the present invention. In (IV) level adjustment operation mode, the display device 40 performs the step S5 (video data conversion process), S21, S22 (level difference calculation process), and S23 of (IV) level adjustment operation mode of the display device 10. The detecting unit 7 detects, as the edge portion 60, a pair of pixels having the level difference C exceeding the set level difference and outputs the video data 53 to the still image pattern thickness detecting unit 21 within the level adjustment unit 13 (edge portion detection process; Step S24). The still image pattern thickness detecting unit 21 detects the image pattern of pixels of the still image data included in the video data 53 and generates an image pattern value (still image pattern thickness detection process; Step S51). The still image pattern thickness detecting unit 21 checks whether or not the image pattern value is larger than the predetermined image pattern value (Step S91).

If the image pattern value is larger than the predetermined image pattern value, the still image pattern thickness detecting unit 21 outputs this information to the first noise generating unit 14 and controls the switch 41 such that the first noise generating unit 14 is connected to the driving unit 5 via the switch 16 (YES in Step S91). In this case, the first noise generating unit 14 performs the same first noise addition process as the display device 10 does (Step S25).

If the image pattern value is smaller than the predetermined image pattern value, the still image pattern thickness detecting unit 21 outputs this information to the second noise generating unit 31 and controls the switch 41 such that the second noise generating unit 31 is connected to the driving unit 5 via the switch 16 (NO in Step S91). The second noise generating unit 31 performs the level adjustment process (Step S71).

As described above, the display device 40 according to this embodiment uses the first noise generating unit 14 or the second noise generating unit 31 depending on the thickness of the image pattern of the still image data included in the video data 53. With the display device 40 according to this embodiment, if the image pattern value is larger than the predetermined image pattern value, by generating the noise 70 having the width L (L1+L2) and the adjustment value of (α×C) using the first noise generating unit 14, the image data level of the pixel group, i.e., the first group of pixels 51 and the second group of pixels 52, including the edge portion 60, of the still image data included in the video data 53 is adjusted. In the display device 10, when the first noise generating unit 14 adds the noise 70 having the same width {the width L (L1+L2) and the adjustment value of (α×C)} in and near the edge portion 60, as the thickness of the image pattern of the still image data becomes small, it may become difficult for the viewer to perceive the image pattern due to the noise 70. Accordingly, with the display device 40 according to the present invention, if the image pattern value is smaller than the predetermined image pattern value, by determining the width L (L1+L2) and the adjustment value of (α×C) using the second noise generating unit 31, the image data level in and near the edge portion 60 having the adjacent pixels with the boundary between the first group of pixels 51 and the second group of pixels 52 included in the video data 53 is adjusted. Accordingly, with the display device 40 according to the present invention, the burn-in can be reduced (unobservable) and the deterioration of display quality of the display device body 6 can be prevented.

In addition, with the display device 40 according to the present invention, by reducing the burn-in, the lifetime of the display device body 6 (display device 40) can become longer than that of the conventional display device.

Fifth Embodiment

Figure 23:
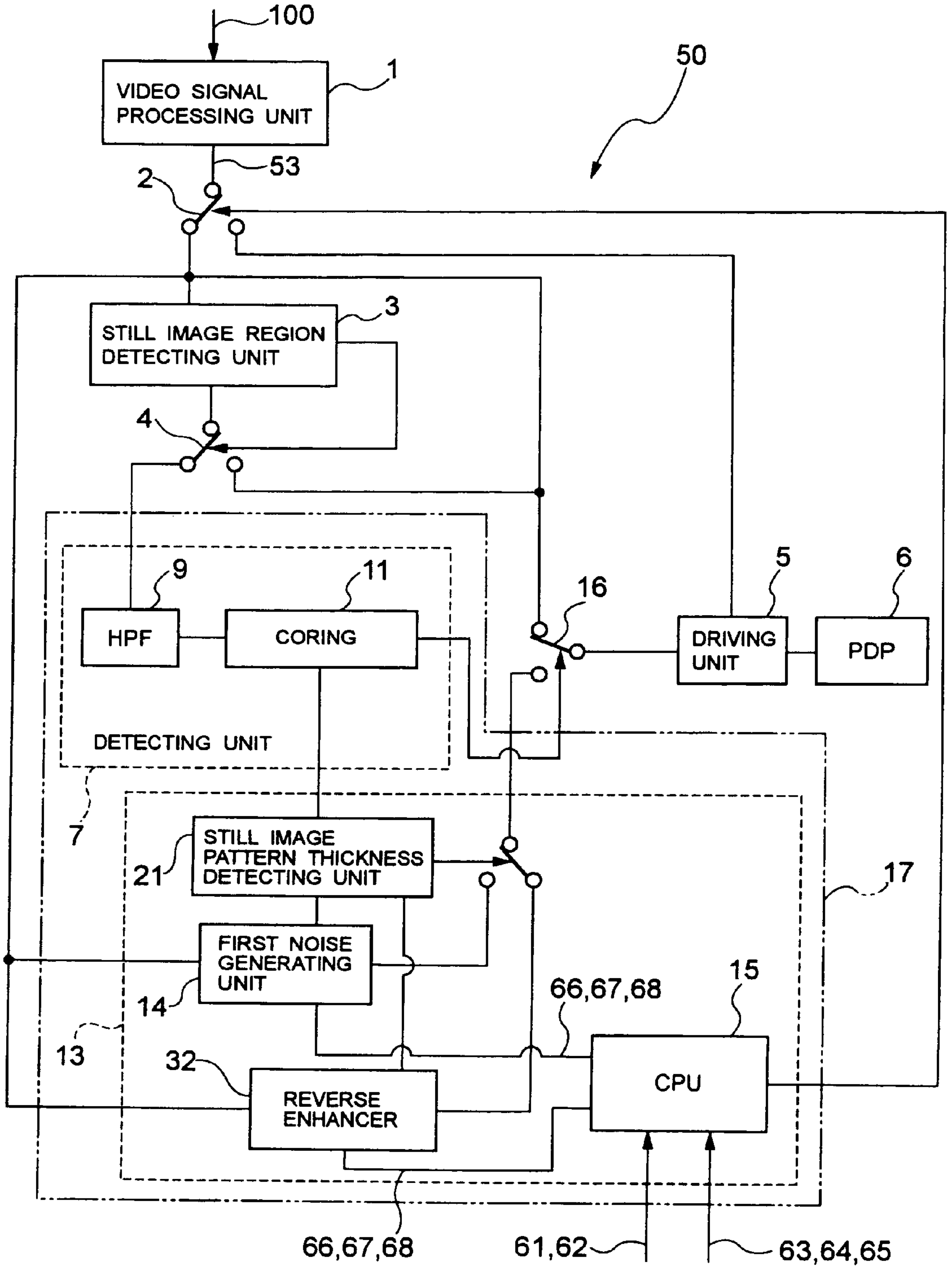
FIG. 23 is a block diagram illustrating a display device according to a fifth embodiment of the present invention.

Next, a fifth embodiment of the present invention will be described. FIG. 23 is a block diagram illustrating a configuration of a display device 50 according to the fifth embodiment of the present invention. Explanation about the same components as the display devices 10, 20, 30 and 40 will be omitted in the display device 50.

As shown in FIG. 23, the level adjusting unit 13 of the display device 50 according to this embodiment further includes the still image pattern thickness detecting unit 21, a reverse enhancer 32, and the switch 41 in addition to components of the level adjusting unit 13 of the display device 10. The switch 41 is switched over by a signal from the still image pattern thickness detecting unit 21.

The detecting unit 7 detects, as the edge portion 60, a pair of pixels having the level difference C of the image data larger than the set level difference, and outputs the video data 53 of the first group of pixels 51 and the second group of pixels 52 to the still image pattern thickness detecting unit 21, with the first group of pixels 51 being composed of the predetermined number of pixels including a pixel at a higher level side (a first pixel) in the pair of pixels and consecutively arranged in a direction away from a pixel at a lower level side (a second pixel) in the pair of pixels, and the second group of pixels 52 being composed of the predetermined number of pixels including the pixel at the lower level side (the second pixel) in the pair of pixels and consecutively arranged in a direction away from the pixel at the higher level side (the first pixel) in the pair of pixels.

The still image pattern thickness detecting unit 21 detects the image pattern of pixels of the still image data included in the video data 53 and generates an image pattern value representing the thickness of the image pattern. If the image pattern value is larger than the predetermined image pattern value, the still image pattern thickness detecting unit 21 outputs this information to the first noise generating unit 14 and controls the switch 41 such that the first noise generating unit 14 is connected to the driving unit 5 via the switch 16. If the image pattern value is smaller than the predetermined image pattern value, the still image pattern thickness detecting unit 21 outputs this information to the reverse enhancer 32 and controls the switch 41 such that the reverse enhancer 32 is connected to the driving unit 5 via the switch 16.

When the image data level of the first group of pixels 51 and the second group of pixels 52 is adjusted, since the level values A and B of original image data are required in addition to the level difference C, the video data 53 from the video signal processing unit 1 is inputted to the first noise generating unit 14 and the reverse enhancer 32.

In the display device 10 according to the first embodiment, the first noise generating unit 14 adds the noise 70 having the same probability distribution, that is, the noise whose level may be expressed as the adjustment value, (A−α×C), or the adjustment value, (B+α×C), to the edge portion 60 and portions other than the edge portion 60 in the first group of pixels 51 and the second group of pixels 52. However, in this case, as the thickness of the image pattern of the still image data becomes small, it may become difficult for the viewer to perceive the image pattern due to the noise 70.

Accordingly, in the display device 50, if the thickness of the image pattern of the still image data is smaller than a certain value (a predetermined image pattern value), the burn-in is prevented by adjusting the image data level of the first group of pixels 51 and the second group of pixels 52 using the reverse enhancer 32, without the noise addition to the first group of pixels 51 and the second group of pixels 52 by the first noise generating unit 14.

Now, a level adjustment process performed by the reverse enhancer 32 will be described. The reverse enhancer 32 acts to smooth a sudden positional variation of the image data level of the edge portion 60. More specifically, the sudden positional variation is smoothed by cutting high frequency components contained in the positional variation of the image data level of the first group of pixels 51 and the second group of pixels 52 using a low pass filter. As the lowest limit of a range of a cut-off frequency becomes low, the variation of the image data level becomes smoother.

Now, an operation of the display device 50 according to this embodiment will be described. The display device 50 performs (I) mode setting process, (II) normal operation mode, (III) level adjustment operation mode by the CPU 15, and (IV) level adjustment operation mode. (I) mode setting process of the display device 50 is equal to (I) mode setting process of the display device 10, and (II) normal operation mode of the display device 50 is equal to (II) normal operation mode of the display device 10.

Figure 24:
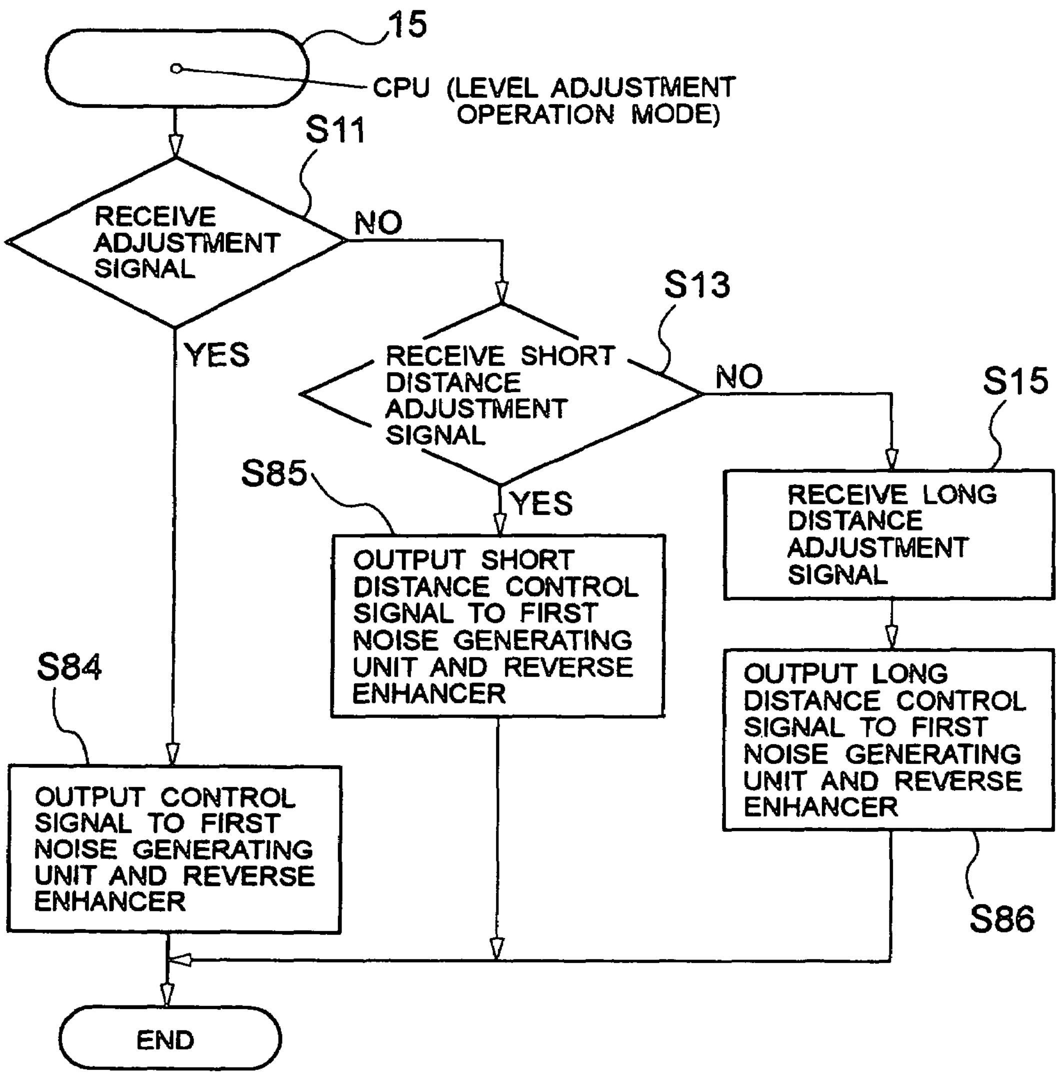
FIG. 24 is a flow chart illustrating (III) level adjustment operation mode by a CPU as an operation of a display device according to the fifth embodiment.

FIG. 24 is a flow chart illustrating (III) level adjustment operation mode by the CPU 15 as an operation of the display device 50 according to the present invention.

When the viewer provides the adjustment signal 63 to the display device 50 using the manipulating switch or the remote control terminal, the adjustment signal 63 is provided to the CPU 15 (YES in Step S11). The CPU 15 outputs the control signal 66 to the first noise generating unit 14 and the reverse enhancer 32 in response to the adjustment signal 63 (Step S84). The first noise generating unit 14 generates the noise 70 having the width L (L1+L2) and the adjustment value of (α×C) in response to the control signal 66 from the CPU 15. The reverse enhancer 32 determines a first cut-off frequency n for cutting off high frequency components of the image data level in and near the edge 60 in response to the control signal 66 from the CPU 15. The first cut-off frequency n is the lowest limit of a cut-off frequency range and the reverse enhancer 32 cuts off frequencies higher than the first cut-off frequency n.

When the viewer provides the short distance adjustment signal 64 to the display device 50 using the manipulating switch or the remote control terminal, the short distance adjustment signal 64 is provided to the CPU 15 (NO in Step S1, YES in Step S13). The CPU 15 outputs the short distance control signal 67 to the first noise generating unit 14 and the reverse enhancer 32 in response to the short distance adjustment signal 64 (Step S85). The first noise generating unit 14 generates the noise 70 having the first width La (L1*a*+L2*a*) (La=0.8×L) and the adjustment value of (α×C) in response to the short distance control signal 67 from the CPU 15. The reverse enhancer 32 determines a second cut-off frequency na (na>n) higher than the first cut-off frequency n in response to the short distance control signal 67 from the CPU 15.

When the viewer provides the long distance adjustment signal 65 to the display device 50 using the manipulating switch or the remote control terminal, the long distance adjustment signal 65 is provided to the CPU 15 (NO in Step S11, NO in Step S13, Step S15). The CPU 15 outputs the long distance control signal 68 to the first noise generating unit 14 and the reverse enhancer 32 in response to the long distance adjustment signal 65 (Step S86). The first noise generating unit 14 generates the noise 70 having the second width Lb (L1*b*+L2*b*) (Lb=1.2×L) and the adjustment value of (α×C) in response to the long distance control signal 68 from the CPU 15. The reverse enhancer 32 determines a third cut-off frequency nb (nb<n) lower than the first cut-off frequency n in response to the long distance control signal 68 from the CPU 15.

Figure 25:
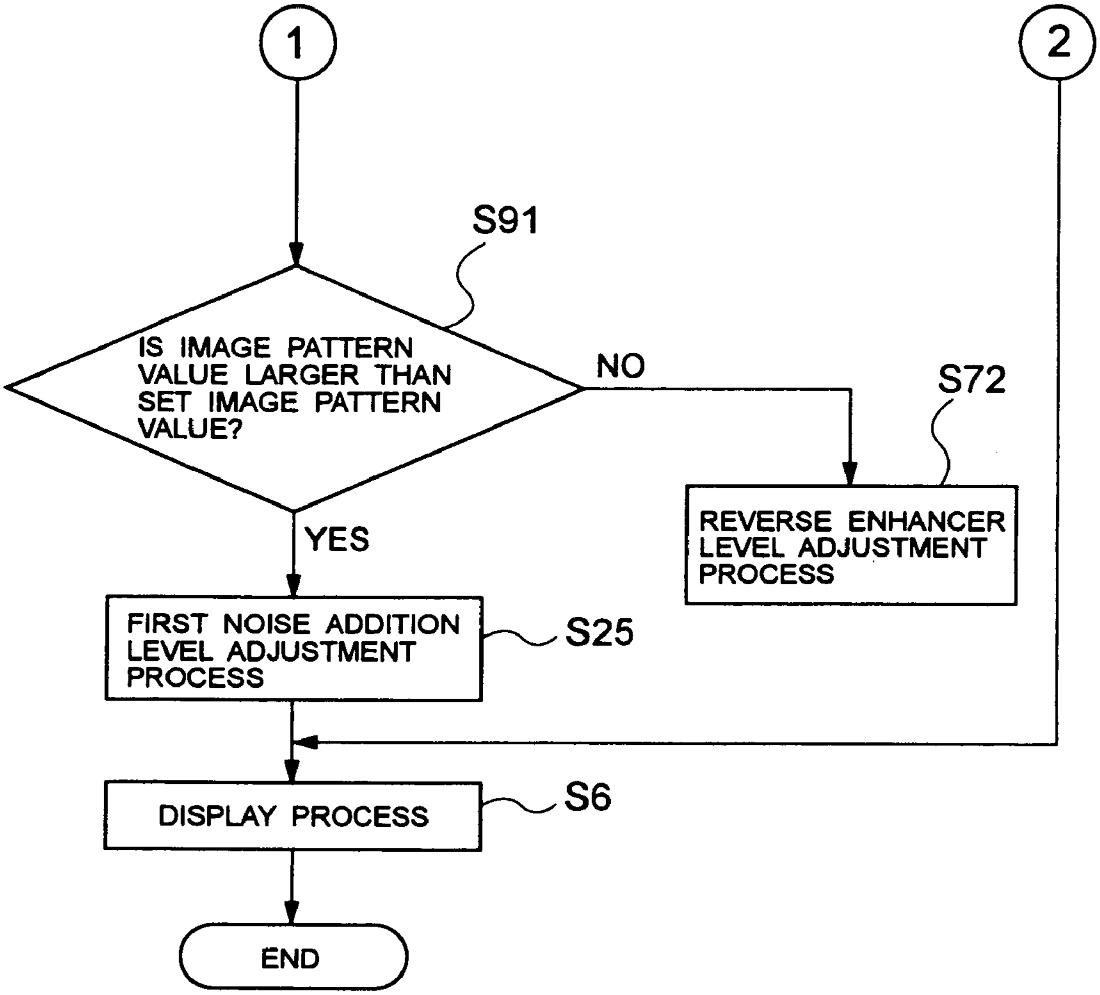
FIG. 25 is a flow chart illustrating (IV) level adjustment operation mode as an operation of a display device according to the fifth embodiment.

FIGS. 20 and 25 are flow charts illustrating (IV) level adjustment operation mode as an operation of the display device 50 according to this embodiment. In (IV) level adjustment operation mode, the display device 50 performs the step S5 (video data conversion process), S21, S22 (level difference calculation process), and S23 of (IV) level adjustment operation mode of the display device 10. The detecting unit 7 detects, as the edge portion 60, adjacent pixels having the level difference C of the image data exceeding the set level difference, with the boundary between the first group of pixels 51 and the second group of pixels 52 interposed between the adjacent pixels, and outputs the video data 53 to the still image pattern thickness detecting unit 21 within the level adjustment unit 13 (edge portion detection process; Step S24). The still image pattern thickness detecting unit 21 detects the image pattern of pixels of the still image data included in the video data 53 and generates an image pattern value (still image pattern thickness detection process; Step S51). The still image pattern thickness detecting unit 21 checks whether or not the image pattern value is larger than the predetermined image pattern value (Step S91).

If the image pattern value is larger than the predetermined image pattern value, the still image pattern thickness detecting unit 21 outputs this information to the first noise generating unit 14 and controls the switch 41 such that the first noise generating unit 14 is connected to the driving unit 5 via the switch 16 (YES in Step S91). In this case, the first noise generating unit 14 performs the same first noise addition process as the display device 10 does (Step S25).

If the image pattern value is smaller than the predetermined image pattern value, the still image pattern thickness detecting unit 21 outputs this information to the reverse enhancer 32 and controls the switch 41 such that the reverse enhancer 32 is connected to the driving unit 5 via the switch 16 (NO in Step S91). The reverse enhancer 32 performs a reverse enhancer level adjustment process (Step S72).

In the reverse enhancer level adjustment process (Step S72), the reverse enhancer 32 determines the first cut-off frequency n in response to the control signal 66 from the CPU 15. In this case, the reverse enhancer 32 outputs the video data 53 having the image data level in and near the edge portion 60 adjusted based on the first cut-off frequency n to the driving unit 5 via the switch 16. The driving unit 5 performs the same display process (Step S6) as the display device 10 does. The video data 53 displayed in the display device body 6 is seen by the viewer.

In the reverse enhancer level adjustment process (Step S72), the reverse enhancer 32 determines the second cut-off frequency na in response to the short distance control signal 67 from the CPU 15. In this case, the reverse enhancer 32 outputs the video data 53 having the image data level in and near the edge portion 60 adjusted based on the second cut-off frequency na to the driving unit 5 via the switch 16. The driving unit 5 performs the same display process (Step S6) as the display device 10 does. The video data 53 displayed in the display device body 6 is seen by the viewer.

In the reverse enhancer level adjustment process (Step S72), the reverse enhancer 32 determines the third cut-off frequency nb in response to the long distance control signal 68 from the CPU 15. In this case, the reverse enhancer 32 outputs the video data 53 having the image data level in and near the edge portion 60 adjusted based on the third cut-off frequency nb to the driving unit 5 via the switch 16. The driving unit 5 performs the same display process (Step S6) as the display device 10 does. The video data 53 displayed in the display device body 6 is seen by the viewer.

As described above, the display device 50 according to this embodiment uses the first noise generating unit 14 or the reverse enhancer 32 depending on the thickness of the image pattern of the still image data included in the video data 53. With the display device 50 according to this embodiment, if the image pattern value is larger than the predetermined image pattern value, by generating the noise 70 having the width L (L1+L2) and the adjustment value of ($\alpha\times$C) using the first noise generating unit 14, the image data level in and near the edge portion 60 having adjacent pixels with the boundary between the first group of pixels 51 and the second group of pixels 52 of the still image data included in the video data 53 interposed between the adjacent pixels is adjusted. In the display device 10, when the first noise generating unit 14 adds the same noise 70 in and near the edge portion 60, as the thickness of the image pattern of the still image data becomes small, it may become difficult for the viewer to perceive the image pattern due to the noise 70. Accordingly, with the display device 50 according to the present invention, if the image pattern value is smaller than the predetermined image pattern value, by determining the cut-off frequency n using the reverse enhancer 32, the image data level in the edge portion 60 of the first group of pixels 51 and the second group of pixels 52 of the still image data included in the video data 53 and near the edge portion 60 having the adjacent pixels with the boundary between the first group of pixels 51 and the second group of pixels 52 interposed between the adjacent pixels is adjusted. Accordingly, with the display device 50 according to this embodiment, the burn-in can be reduced (unobservable), and, even if the width of the image pattern is small, the deterioration of display quality of the display device body 6 can be prevented.

In addition, with the display device 50 according to this embodiment, by reducing the burn-in, the lifetime of the display device body 6 (display device 50) can become longer than that of the conventional display device.

In addition, in the third to fifth embodiments, if the image pattern thickness is larger and the image pattern value is larger than the predetermined image pattern value, a random noise is added to the pixel group including the edge portion, and, if the thickness of the still image pattern is small and the image pattern value is smaller than the predetermined image pattern value, the image data level is varied to be smoothed for the position of the image data so that the viewer does not perceive the deterioration of image quality. For example, in the third embodiment, if the image pattern value is smaller than the predetermined image pattern value, the variation of the image data level is smoothed when the image data level is averaged in time as the random coefficient $\alpha$ is varied depending on the position of the image data. In addition, in the fourth embodiment, by fixing the image data level, the image data level is smoothly varied for the position of the image data. In addition, in the fifth embodiment, by using the low pass filter, the image data level is smoothly varied for the position of the image data. However, the present invention is not limited to this, and the image data level may be smoothly varied for the position of the image data irrespective of the size of the image pattern.

The display devices according to the first to fifth embodiments may be either a monochrome display device or a color display device.

Sixth Embodiment

Figure 26:
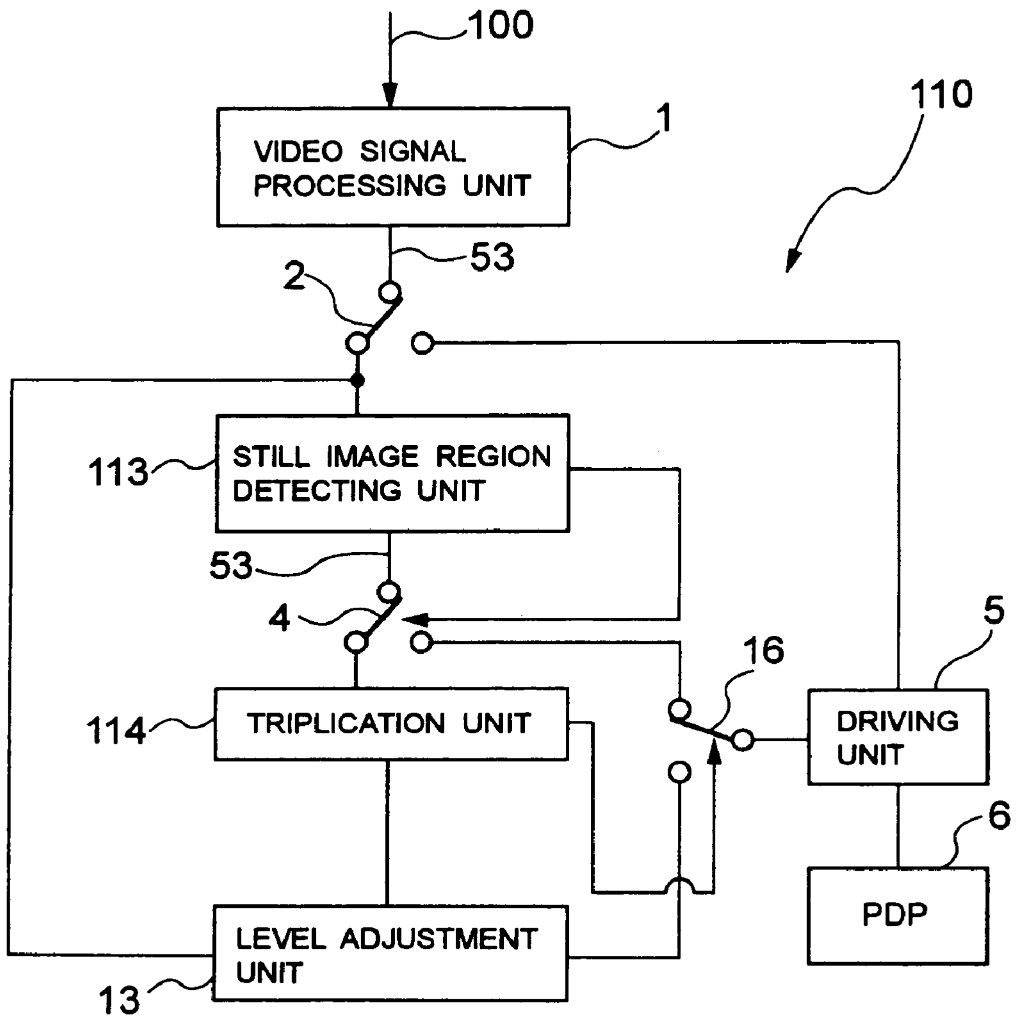
FIG. 26 is a block diagram illustrating a display device according to a sixth embodiment of the present invention.
Figure 27A:
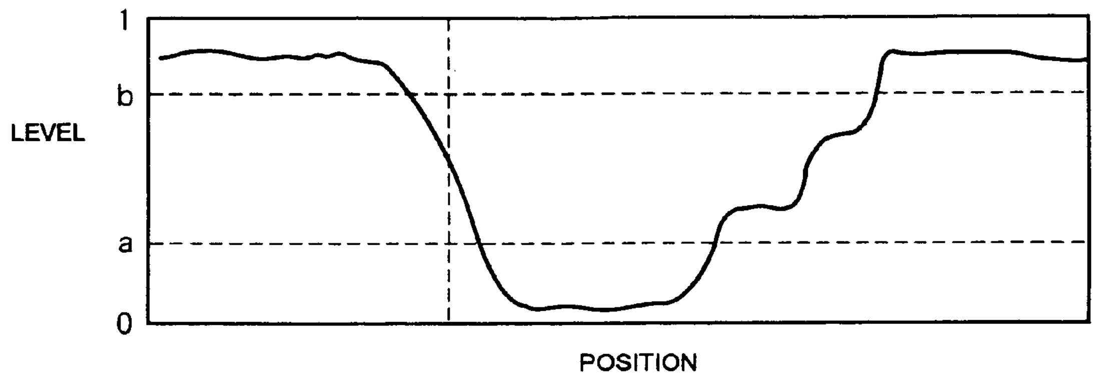
FIGS. 27A to 27C are graphic diagrams illustrating a spatial distribution of an image data level, with a horizontal axis as a position on a screen and a vertical axis as an image data level, FIG. 27A showing image data before a triple-value process, FIG. 27B showing image data after a triple-value process, and FIG. 27C showing image data after level adjustment.
Figure 27B:
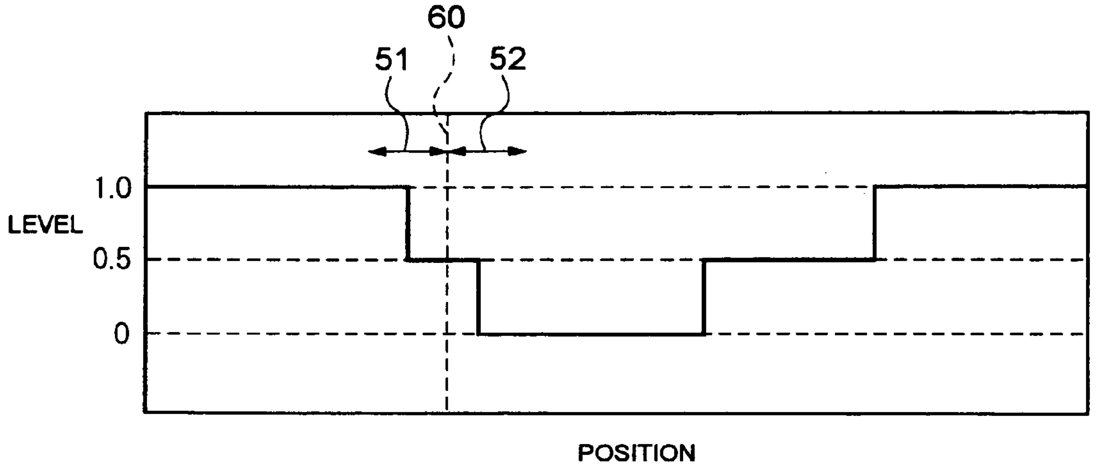
Figure 27C:
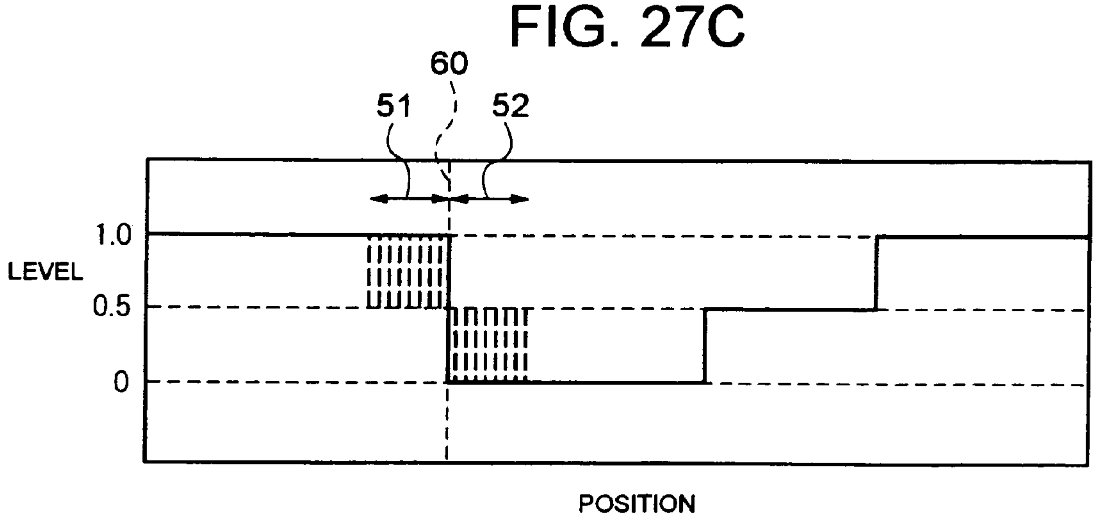

Next, a sixth embodiment of the present invention will be described. FIG. 26 is a block diagram illustrating a configuration of a display device according to the sixth embodiment of the present invention. FIGS. 27A to 27C are graphic diagrams illustrating a spatial distribution of an image data level, with a horizontal axis as a position on a screen and a vertical axis as an image data level, FIG. 27A showing image data before a triple-value process, FIG. 27B showing image data after a triplization process, and FIG. 27C showing image data after level adjustment. The same components as those of the first embodiment in the sixth embodiment are denoted by the same reference numerals, and the detailed explanation thereof will be omitted.

A display device according to this embodiment is a plasma display device used as a display device for computer, for example. As shown in FIG. 26, the display device 110 according to this embodiment includes the video signal processing unit 1, a still letter region detecting unit 113, a triplization unit 114, and the level adjusting unit 13, the driving unit 5, and a plasma display panel (PDP) (display device body) 6. The display device 110 according to this embodiment is different from the display device 10 according tie first embodiment in that the former includes the still letter region detecting unit 113 instead of the still image region detecting unit 3 (see FIG. 1) and the triplization unit 114 instead of the detecting unit 7 (see FIG. 1). This embodiment is characterized in that a level for only a letter region within the still image region is adjusted, unlike the first to fifth embodiments in which the level for the entire still image region is adjusted. This is because the burn-in is apt to occur in the letter region, as compared to regions other than the letter region, that is, regions having no pattern or regions indicating photographs or figures (hereinafter, the regions other than the letter region are generally referred to as an image region), and the adjustment of the image level in the letter region makes the burn-in more difficult to be observable than that in the image region does. In addition, this embodiment is characterized in that the edge portion is detected by performing a triplization process for the image data. Except this configuration, this embodiment has the same configuration as that of the first embodiment.

The video signal processing unit 1 converts an video signal 100 inputted from the outside, for example, a decoder of a television or a computer body, into the video data 53 having a format adapted for the driving unit 5 to drive the PDP 6. In addition, the driving unit 5 drives the PDP 6 to display images on the PDP 6, based on the video data 53. The PDP 6 is a general plasma display panel.

The still letter region detecting unit 113 checks whether or not the still letter region is included in an image representing the video data 53 outputted from the video signal processing unit 1. The still letter region is meant to include the still image region and the letter region. The still letter region detecting unit 113 divides the entire screen into a plurality of blocks and determines whether or not each block is the still image region. Next, for each block determined to be the still image region, the image data is classified into three levels, i.e., a high level, a medium level and a low level. That is, as shown in FIG. 27A, when a normalized image data level x ($0 \leqq x \leqq 1$) is compared with reference values a and b ($0 \leqq a < b \leqq 1$), the image data has the high level if $b < x$, the medium level if $a \leqq x \leqq b$, and the low level if $x < a$. In addition, blocks having a small percentage of the medium level are determined to be the still letter region. In addition, a difference (b−a) between the reference values a and b corresponds to the set level difference in the first to fifth embodiments.

In addition, if the display device 110 is the color display device and the video signal 100 includes, for example, the three R (red), G (green) and B (blue) color image data, the still letter region detecting unit 113 determines whether or not the blocks determined to be the still image region are the letter region for each of the RGB colors. Alternatively, the still letter region detecting unit 113 divides each of the blocks determined to be the still image region into three sub blocks for each color, and determines whether or not these sub blocks are the letter region.

In the letter region, a background color is different from a letter color and, typically, the image data level of the background color is much different from that of the letter color. For example, if a black letter is written on a white paper, the image data level of the background color (white color) is high and the image data level of the letter color (black color) is low. Accordingly, if the image data level in the letter region is classified into the three levels, as mentioned above, the percentage of the medium level becomes small. On the contrary, for the image region, since various kinds of colors and gray scales are generally mixed in the image region, if the image data level in the image region is classified into the three levels, the percentage of the medium level becomes large. On this account, by obtaining the percentage of the medium level, it can be determined whether the blocks are the letter region or the image region.

In addition, although regions indicating color letters may be determined not to be the letter region as the image data level of the background color and/or the letter color in the regions is the medium level, they have no problem since an image data level difference between the background color and the letter color is small, and therefore, the burn-in is difficult to occur. In addition, for the regions indicating photographs or figures, the percentage of the medium level may be small. However, in this case, since the burn-in is apt to occur in the regions, the regions are treated as the letter region. In addition, for the regions having no pattern, when the image data level of the background color is the high level or the low level, since the percentage of the medium level becomes small, the regions are determined to be the letter region. However, since there is no edge portion in these regions, the image data level is not adjusted. Accordingly, there is no problem even if the regions are determined to be the letter region.

The triplication unit 114 receives the video data 53 from the still letter region detecting unit 113 and performs the triplization process for data of the video data 53 corresponding to the still letter region. As shown in FIGS. 27A and 27B, in the triplication process, if the image data level x is the high level, that is, has a range of $b < x \leqq 1$, it is replaced by, for example, 1, if the image data level x is the medium level, that is, has a range of $a \leqq x \leqq b$, it is replaced by, for example, 0.5, if the image data level x is the low level, that is, has a range of $0 \leqq x < a$, it is replaced by, for example, 0, and the level x within a range of 0 to 1 is replaced by, for example, three values, that is, 0, 0.5, and 1.

In addition, the triplization unit 114 detects a portion in which a high level region makes a direct contact with a low level region without interposing a medium level region between the high level region and the low level region, and perceives, as the edge portion 60, a pair of pixels forming a boundary between the high level region and the low level region. In addition, the triplization unit 114 detects a portion in which the high level region, the medium region and the low level region are arranged in the order in one direction, with a width of the medium level region in the one direction less than a predetermined width, and perceives, as the edge portion 60, a pair of pixels located in the center of the medium level region in the one direction. In this way, the triplization unit 114 detects the edge portion 60 in the still letter region. In addition, the level difference C between the pair of pixels forming the edge portion 60 is calculated based on the image data before the triplization process. Here, for the sake of simplification of data process, using the reference values a and b, the level difference C may be obtained according to an equation of $C=b-a$.

In addition, the triplization unit 114 assumes, as the first group of pixels 51, the predetermined number of pixels including a pixel at a higher level side (a first pixel) in the pair of pixels forming the detected edge portion 60 and consecutively arranged in a direction away from a pixel at a lower level side (a second pixel) in the pair of pixels, and, as the second group of pixels 52, the predetermined number of pixels including the pixel at the lower level side (the second pixel) in the pair of pixels and consecutively arranged in a direction away from the pixel at the higher level side (the first pixel) in the pair of pixels. A combination of the first group of pixels 51 and the second group of pixels 52 is called the pixel group. In addition, the triplization unit 114 outputs the control signal based on the position information of the pixel group and the level difference of the edge portion 60 to the level adjusting unit 13.

The level adjusting unit 13 has the same configuration as that of the first embodiment. More specifically, the level adjusting unit 13 has the first noise generating unit 14 and the CPU 15 (see FIG. 1) and directly receives the video data 53 outputted from the video signal processing unit 1. As shown in FIG. 27C, the first noise generating unit 14 adjusts the image data level by adding the noise 70 (see FIG. 2) to the image data of the first group of pixels 51 and the second group of pixels 52, based on the level difference C (see FIG. 2) of the pair of pixels forming the edge portion 60 and the random coefficient α. In other words, the first noise generating unit 14 replaces the image data level of the first group of pixels 51 with $(A-\alpha\times C)$ and replaces the image data level of the second group of pixels 52 with $(B+\alpha\times C)$. At this time, the random coefficient α may have the range of $0 \leqq \alpha \leqq 1$ as in the first embodiment, or may have a range of $0 \leqq \alpha \leqq 0.5$ as shown in FIG. 27C. In addition, in FIG. 27C, to clarify a correspondence with FIG. 27B and simplify the figure, the image data is represented as the data after the triplication process, however, actually, the image data level is adjusted for the image data on which the triplication process is not performed.

In addition, the display device 110 includes the switch 2 for connecting the video signal processing unit 1 to the still letter region detecting unit 113 or the driving unit 5, based on the control signal outputted from the level adjusting unit 13. In addition, the display device 110 includes the switch 4 for connecting the still letter region detecting unit 113 to the triplication unit 114, or the driving unit 5 via the switch 16, based on the control signal outputted from the still letter region detecting unit 113. In addition, the display device 110 includes the switch 16 for connecting the driving unit 5 to the level adjusting unit 13, or the still letter region detecting unit 113 via the switch 4.

Next, the display device according to this embodiment as configured above will be described. The display device 110 can perform the normal mode and the level adjustment operation mode switchably. The viewer can select the mode using the manipulating switch or the remote control terminal.

First, an operation of the display device 110 in the normal mode will be described with reference to FIG. 26. In the normal mode, the switch 2 connects an output of the video signal processing unit 1 to an input of the driving unit 5. In this state, the video signal 100 is inputted from the outside, for example, the decoder of the television or the computer body, to the video signal processing unit 1 of the display device 110. The video signal processing unit 1 converts the video signal 100 into the video data 53 adapted to the driving of the PDP 6 by the driving unit 5 and outputs the video data to the driving unit 5 via the switch 2. The driving unit 5 drives the PDP 6, based on the video data 53, to display images based on the video data 53 on the PDP 6. Accordingly, the viewer can see the images based on the video data 53.

Figure 28:
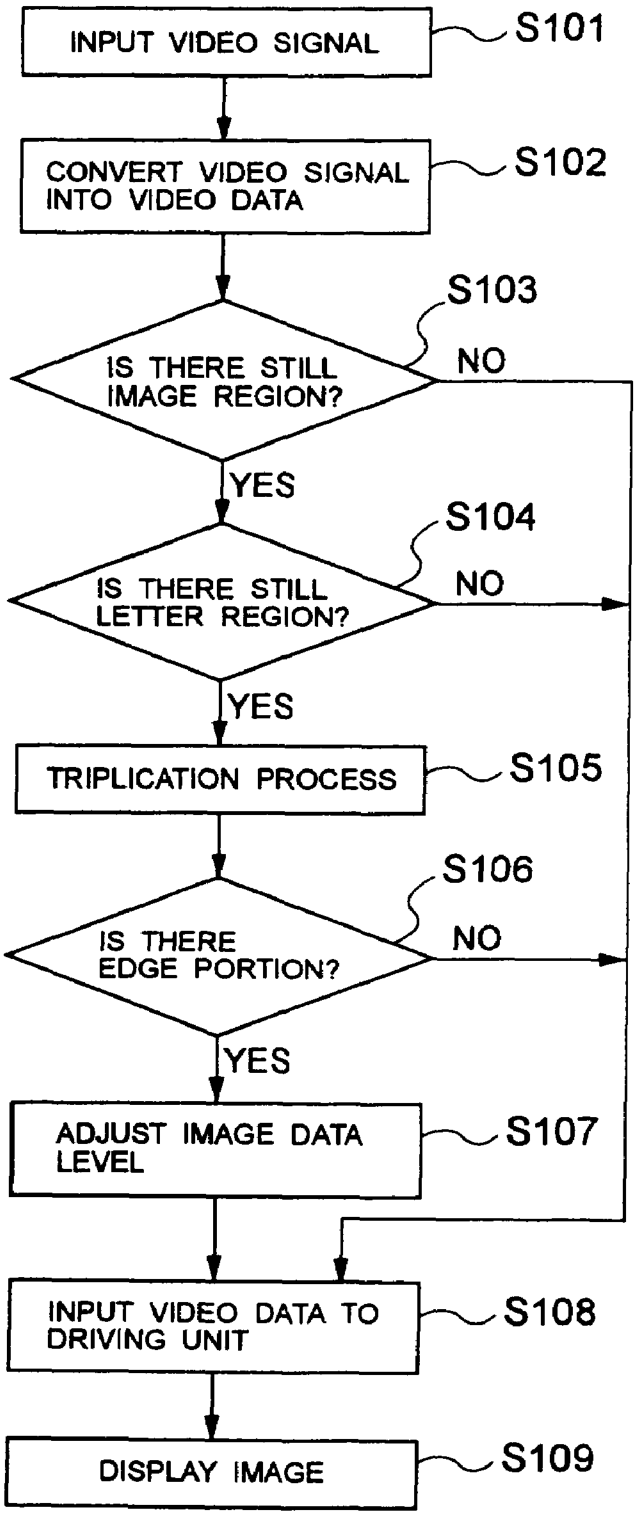
FIG. 28 is a flow chart illustrating a level adjustment operation mode of a display device according to the sixth embodiment.

Next, an operation of the display device 110 in the level adjustment operation mode will be described. FIG. 28 is a flow chart illustrating an operation in the level adjustment operation mode of the display device according to this embodiment. Hereinafter, the operation in the level adjustment operation mode will be described with reference to FIGS. 26, 27A to 27C, and 28. In the level adjustment operation mode, the switch 2 connects the output of the video signal processing unit 1 to an input of the still letter region detecting unit 113. In addition, in an initial state, the switch 16 connects the switch 4 to the driving unit 5.

First, as shown in Step S101 in FIG. 28, the video signal 100 is inputted from the outside, for example, the decoder of the television or the computer body, to the video signal processing unit 1 of the display device 110.

Next, as shown in Step S102 in FIG. 28, the video signal processing unit 1 converts the video signal 100 into the video data 53 adapted to the driving of the PDP 6 by the driving unit 5 and outputs the video data to the still letter region detecting unit 113 via the switch 2.

Next, as shown in Step S103 in FIG. 28, the still letter region detecting unit 113 divides an image by one screen on which the video data 53 is represented into a plurality of blocks and determines whether or not the blocks are the still image region. If no block is the still image region, the process proceeds to Step S108, where the still letter region detecting unit 113 outputs the video data 53 after causing the switch 4 to connect the output of the still letter region detecting unit 113 to the switch 16. Accordingly, the video data 53 outputted from the still letter region detecting unit 113 is inputted to the driving unit 5 via the switches 4 and 16. Then, as shown in Step S109, the driving unit 5 drives the PDP 6, based on the video data 53, to display the images based on the video data 53 on the PDP 6. Accordingly, the viewer can see the images based on the video data 53.

On the other hand, if any of the blocks is the still image region, the process proceeds to Step S104, where the image data for the block is divided into the three levels, i.e., the high level, the medium level and the low level. That is, as shown in FIG. 27A, when the normalized image data level x ($0 \leqq x \leqq 1$) is compared with the reference values a and b ($0 \leqq a < b \leqq 1$), the image data has the high level if $b < x$, the medium level if $a \leqq x \leqq b$, and the low level if $x < a$. Blocks having a small percentage of the medium level are determined to be the still letter region.

In addition, if the video signal 100 includes, for example, the three R (red), G (green) and B (blue) color image data, the still letter region detecting unit 113 determines whether or not the blocks determined to be the still image region are the letter region for each of the RGB colors. Alternatively, the still letter region detecting unit 113 divides each of the blocks determined to be the still image region into three sub blocks for each color, and determines whether or not these sub blocks are the letter region.

In addition, if the still letter region is not detected for all blocks, the process proceeds to Step S108, where the still letter region detecting unit 113 outputs the video data 53 after causing the switch 4 to connect the output of the still letter region detecting unit 113 to the switch 16. Then, as shown in Step S109, the driving unit 5 drives the PDP 6 to display the images, based on the video data 53.

On the other hand, if the still letter region is detected for any of the blocks, the still letter region detecting unit 113 outputs the video data 53 after causing the switch 4 to connect the output of the still letter region detecting unit 113 to the input of the triplization unit 114. Then, the video data 53 is inputted to the triplization unit 114.

Next, as shown in Step S105, the triplization unit 114 performs the triplication process for the data of the inputted video data 53 corresponding to the still letter region. That is, as shown in FIGS. 27A and 27B, if the image data level x included in the video data 53 is the high level, that is, has a range of $b < x \leqq 1$, it is replaced by, for example, 1, if the image data level x is the medium level, that is, has a range of $a \leqq x \leqq b$, it is replaced by, for example, 0.5, and, if the image data level x is the low level, that is, has a range of $0 \leqq x < a$, it is replaced by, for example, 0.

Next, as shown in Step S106, the triplization unit 114 detects the portion in which the high level region makes a direct contact with the low level region without interposing the medium level region between the high level region and the low level region, and perceives, as the edge portion 60, the pair of pixels forming the boundary between the high level region and the low level region. In addition, the triplication unit 114 detects the portion in which the high level region, the medium region and the low level region are arranged in the order in one direction, with the width of the medium level region in the one direction less than the predetermined width, and perceives, as the edge portion 60, the pair of pixels located in the center of the medium level region in the one direction. In this way, the triplization unit 114 detects the edge portion 60 in the still letter region.

In the triplization unit 114, if the edge portion 60 is not detected in the still letter region, the process proceeds to Step S108, where the still letter region detecting unit 113 outputs the video data 53 to the driving unit 5. Then, as shown in Step S109, the driving unit 5 drives the PDP 6 to display the images, based on the video data 53.

On the other hand, when the edge portion 60 is detected in the still letter region, the triplization unit 114 sets, as the first group of pixels 51, the predetermined number of pixels including a pixel at a higher level side (a first pixel) in the pair of pixels forming the detected edge portion 60 and consecutively arranged in a direction away from a pixel at a lower level side (a second pixel) in the pair of pixels, and sets, as the second group of pixels 52, the predetermined number of pixels including the pixel at the lower level side (the second pixel) in the pair of pixels and consecutively arranged in a direction away from the pixel at the higher level side (the first pixel) in the pair of pixels. In addition, the triplization unit 114 outputs the information on position of the pixel group (the first group of pixels 51 and the second group of pixels 52) and the information on the level difference of the edge portion 60 to the level adjusting unit 13.

Next, as shown in Step S107, the first noise generating unit 14 of the level adjusting unit 13 adds the noise 70 (see FIG. 2) to the image data of the first group of pixels 51 and the second group of pixels 52, based on the level difference C (see FIG. 2) of the pair of pixels forming the edge portion 60 and the random coefficient α, as in the first embodiment. In other words, for the video data 53 inputted from the video signal processing unit 1 via the switch 2, that is, the data on which the triplication process is not performed, the first noise generating unit 14 replaces the image data level of the first group of pixels 51 with (A−α×C) and replaces the image data level of the second group of pixels 52 with (B+α×C). At this time, the random coefficient α may have the range of $0 \leqq \alpha \leqq 1$ as in the first embodiment, or may have a range of $0 \leqq \alpha \leqq 0.5$ as shown in FIG. 27C.

In addition, as shown in Step S108, the first noise generating unit 14 outputs the image data corresponding to the pixel group (the first group of pixels 51 and the second group of pixels 52) after the level adjustment to the driving unit 5. In addition, the still letter region detecting unit 113 outputs image data corresponding to pixels other than the pixel group, that is, image data on which the level adjustment process is not performed, to the driving unit 5. At this time, as the CPU 15 (see FIG. 1) switches over the switch 16, the image data corresponding to the pixel group, that is, the image data on which the level adjustment process is performed, is inputted from the first noise generating unit 14 to the driving unit 5, and the image data corresponding to the pixels other than the pixel group, that is, the image data on which the level adjustment process is not performed, is inputted from the still letter region detecting unit 113 to the driving unit 5. Then, as shown in Step S109, the driving unit 5 drives the PDP 6 to display the images, based on the video data. Accordingly, the viewer can see the images based on the video data 53.

Next, the effect of this embodiment will be described. In this embodiment, since the still letter region is detected in the still image region and the image data level for only the still letter region is adjusted, a high speed process can be performed, as compared to the case where the level adjustment process is performed for the entire still image region. In addition, the still letter region has a high contrast between a background portion and a letter portion, and, in the still letter region, the burn-in is apt to occur, as compared to the regions other than the still letter region, that is, the regions having no pattern or the regions representing the photographs or the figures. In addition, although the image level is adjusted in the letter region, the burn-in is difficult to be observable, as compared to the case where the image level is adjusted in the regions representing the photographs and the like. Accordingly, by performing the level adjustment process for only the still letter region, the deterioration of image quality can be suppressed and the burn-in can be efficiently prevented.

In addition, in this embodiment, by performing the triplication process, the edge portion can be efficiently detected. In this embodiment, effects other than the above-mentioned effect are equal to the effects of the first embodiment.

Figure 29A:
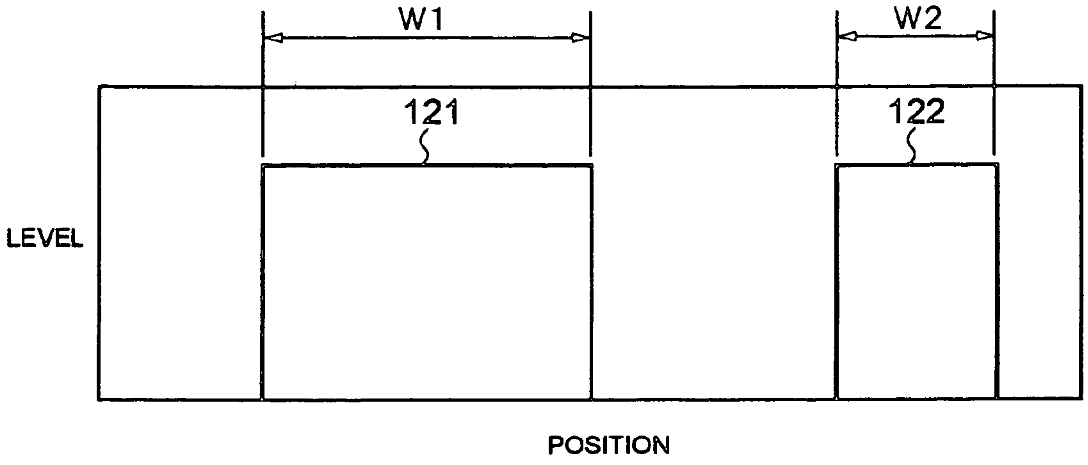
FIGS. 29A to 29C are graphic diagrams illustrating a spatial distribution of an image data level, with a horizontal axis as a position on a screen and a vertical axis as an image data level, FIG. 29A showing image data before level adjustment, FIG. 29B showing image data after level adjustment in a first modification of the sixth embodiment, and FIG. 29C showing image data after level adjustment in a second embodiment of sixth embodiment.
Figure 29B:
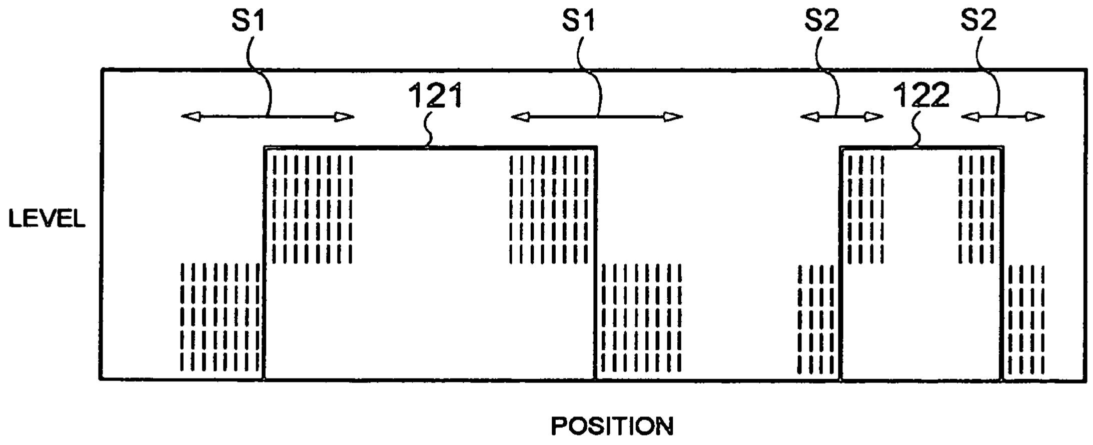
Figure 29C:
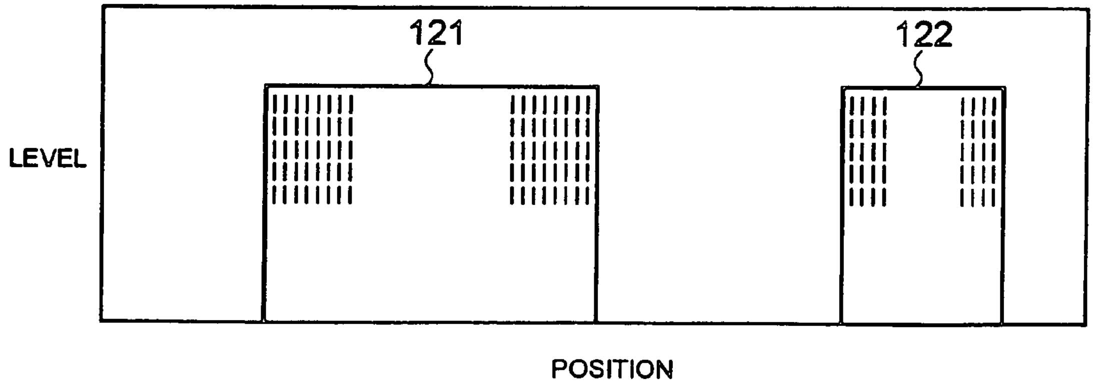

Next, a first modification of the sixth embodiment will be described. FIGS. 29A to 29C are graphic diagrams illustrating a spatial distribution of an image data level, with a horizontal axis as a position and a vertical axis as an image data level, FIG. 29A showing image data before level adjustment, FIG. 29B showing image data after level adjustment in the first modification, and FIG. 29C showing image data after level adjustment in a second modification, which will be described later.

In the sixth embodiment, the width of the pixel group adjusting the image level is fixed irrespective of a distribution of the image data. On the contrary, in this modification, the width of the high level region is detected using the image data after the triplization process, and the width of the pixel group (the first group of pixels 51 and the second group of pixels 52) is adjusted according to the width of the high level region. That is, as shown in FIG. 29A, a width W1 of a high level region 121 is larger than a width W2 of a high level region 122. Accordingly, as shown in FIG. 29B, a width S1 of the pixel group in the high level region 121 becomes larger than a width S2 of the pixel group in the high level region 122. Except the above-mentioned configuration and operation, this modification has the same configuration and operation as those of the sixth embodiment.

This modification has an effect that the level adjustment process is unobservable if the thickness of the still image pattern is small. This effect is equal to the effect in the second embodiment that the width of the pixel group is adjusted based on the thickness of the still image pattern. However, in this modification, since the image data after the triplication process is used, the width of the high level region can be easily detected.

Next, a second modification of the sixth embodiment will be described. In the sixth embodiment and the first modification, the image data level is adjusted for both of the first group of pixels 51 as the high level region and the second group of pixels 52 as the low level region. On the contrary, in the second modification, as shown in FIG. 29C, the image data level is adjusted for only the first group of pixels 51 as the high level region. Except this configuration and operation, this modification has the same configuration and operation as the first modification.

Typically, deterioration of pixels due to deterioration of fluorescent material is more remarkable in the high level region than the low level region. In addition, if the image quality is deteriorated concomitantly to the adjustment of the image data level, the high level region is unobservable. In addition, by adjusting the image data level in only the high level region such that the width of the region adjusting the image data level becomes narrow, the deterioration of the image quality may be unobservable. In this way, in this modification, by adjusting the image data level in only the high level region, the burn-in can be effectively prevented while suppressing the deterioration of image quality concomitant to the adjustment of the image data level.

In addition, in the sixth embodiment and the first and second modifications, the width of the pixel group adjusting the image data level may be adjusted according to the distance between the display device and viewer, as shown in the second embodiment. In addition, in the sixth embodiment and the first and second modifications, although the addition of uniform noise to the pixel group is exemplified as a method for adjusting the image data level, as in the first embodiment, the present invention is not limited to this, and the image data level may be smoothly varied depending on the position of the pixel data, as in the third to fifth embodiments. In other words, as in the third embodiment, the variation of the image data level may be smoothed when the image data level is averaged in time as the random coefficient α is varied depending on the position of the image data. Also, as in the fourth embodiment, by fixing the image data level, the image data level may be smoothly varied for the position of the image data. In addition, as in the fifth embodiment, by using the low pass filter, the image data level may be smoothly varied for the position of the image data.

In addition, as in the third to fifth embodiment, if the thickness of the still image pattern is large and the image pattern value is larger than the predetermined image pattern value, the random noise may be added to the pixel group including the edge portion, and, if the thickness of the still image pattern is small and the image pattern value is smaller than the predetermined image pattern value, the image data level may be varied to be smoothed for the position of the image data. In addition, instead of the PDP, an LCD, an EL, or a CRT may be used as the display device body.

Seventh Embodiment

Figure 30A:
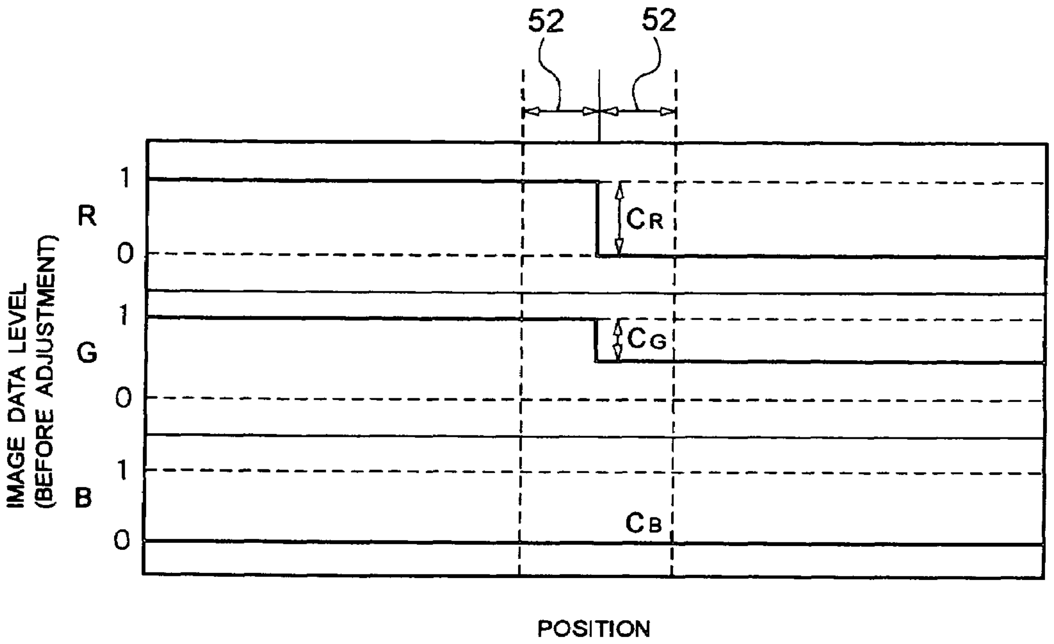
FIGS. 30A and 30B are graphic diagrams illustrating a spatial distribution of an image data level, with a horizontal axis as a position on a screen and a vertical axis as an image data level, in a seventh embodiment of the present invention, FIG. 30A showing image data for respective RGB colors before level adjustment and FIG. 30B showing image data for respective RGB colors after level adjustment.
Figure 30B:
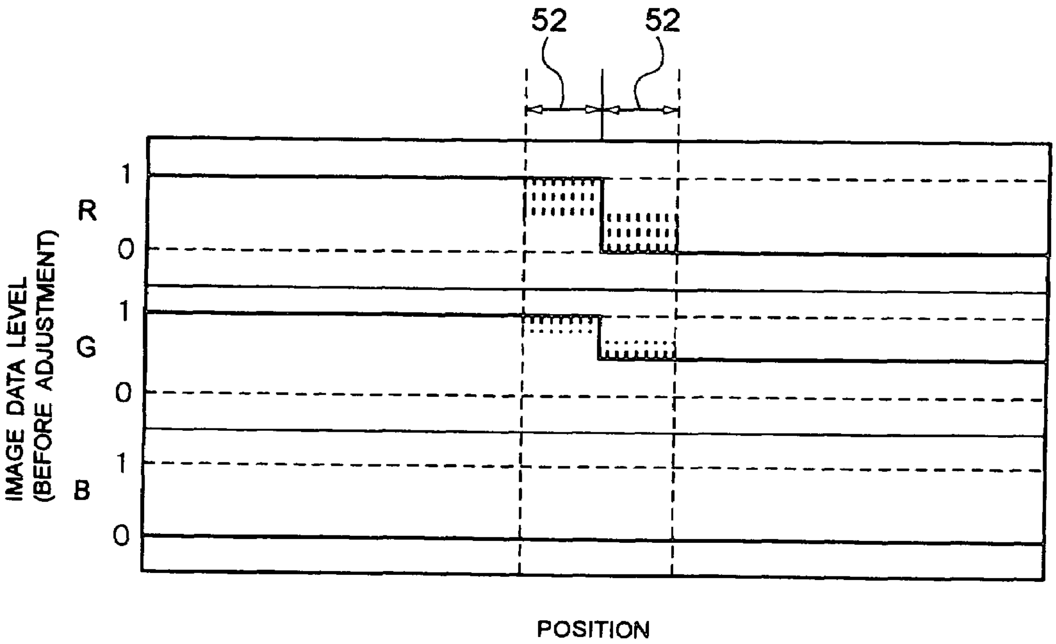

Next, a seventh embodiment of the present invention will be described. FIGS. 30A and 30B are graphic diagrams illustrating a spatial distribution of an image data level, with a horizontal axis as a position and a vertical axis as the image data level, FIG. 30A showing image data for respective RGB colors before the level adjustment and FIG. 30B showing image data for respective RGB colors after the level adjustment. The vertical axis in FIGS. 30A and 30B represents a normalized value of the image data level. This embodiment is provided for the color display device.

As shown in FIG. 30A, for the image data before the level adjustment, a level value of the first group of pixels 51 in a red (R) sub pixel is 1 and a level value of the second group of pixels 52 in the red (R) sub pixel is 0. Also, a level value of the first group of pixels 51 in a green (G) sub pixel is 1 and a level value of the second group of pixels 52 in the green (G) sub pixel is 0.5. In addition, a level value of the first group of pixels 51 in a blue (B) sub pixel is 0 and a level value of the second group of pixels 52 in the blue (B) sub pixel is 0. In addition, the brightness of the image is determined by a combination of level values of sub pixels.

In addition, in this embodiment, the level difference C is independently calculated for the RGB colors. On the other hand, a common value for the RGB sub pixels of each pixel is used as the random coefficient α. That is, in FIG. 30A, a level difference $C_R$ in a red color pixel is 1, a level difference $C_G$ in a green color pixel is 0.5, and a level difference $C_B$ in a blue color pixel is 0. In addition, when a value of the random coefficient α is randomly selected within, for example, a range of $0 \leqq \alpha \leqq 0.5$, the random coefficient α applied to the red sub pixel belonging to any pixel, the random coefficient α applied to the green sub pixel belonging to the pixel, and the random coefficient α applied to the blue sub pixel belonging to the pixel have the same value.

Accordingly, noise 73 as shown in FIG. 30B is added to the image data for each color. In this embodiment, since the common random coefficient α is used for each pixel for each of the RGB colors, a color balance is not significantly upset even in a microscopic scale. Accordingly, a portion whose level is adjusted is unobservable and the deterioration of image quality is insignificant. Except this configuration, operation and effect, this embodiment has the same configuration, operation and effect as those of the sixth embodiment. That is, as shown in the sixth embodiment, the edge portion is detected by detecting the still letter region, adjusting the image data level in only the still letter region and performing the triplization process on the image data level.

In addition, this embodiment may be applied to the display devices according to the first to fifth embodiments. That is, as shown in the second embodiment, the width L of the pixel group adjusting the image data level may be adjusted according to the distance between the display device and viewer. In addition, as shown in the third to fifth embodiments, the image data level may be smoothly varied depending on the position of the pixel data. In addition, as shown in the first modification of the sixth embodiment, the width of the pixel group adjusting the image data level according to the thickness of letter may be adjusted, and, as shown in the second modification of the sixth embodiment, the image data level may be adjusted in only the first group of pixels 51 as the high level region.

Eighth Embodiment

Figure 31A:
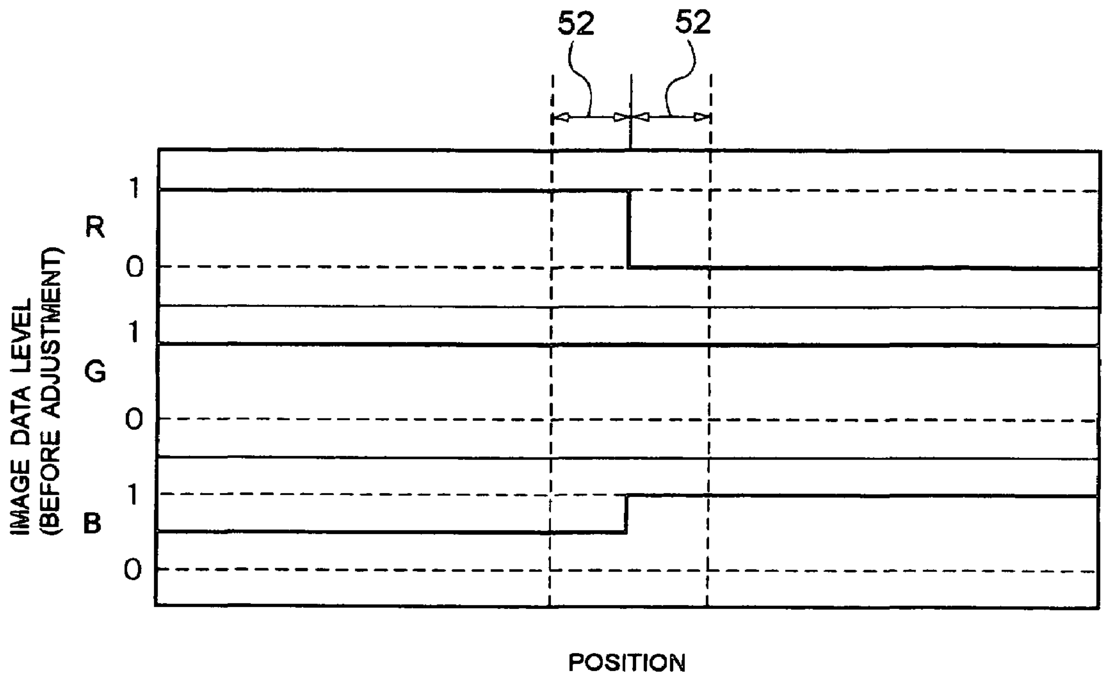
FIGS. 31A and 31B are graphic diagrams illustrating a spatial distribution of an image data level, with a horizontal axis as a position on a screen and a vertical axis as an image data level, in an eighth embodiment of the present invention, FIG. 31A showing image data for respective RGB colors before level adjustment and FIG. 31B showing image data for respective RGB colors after level adjustment.
Figure 31B:
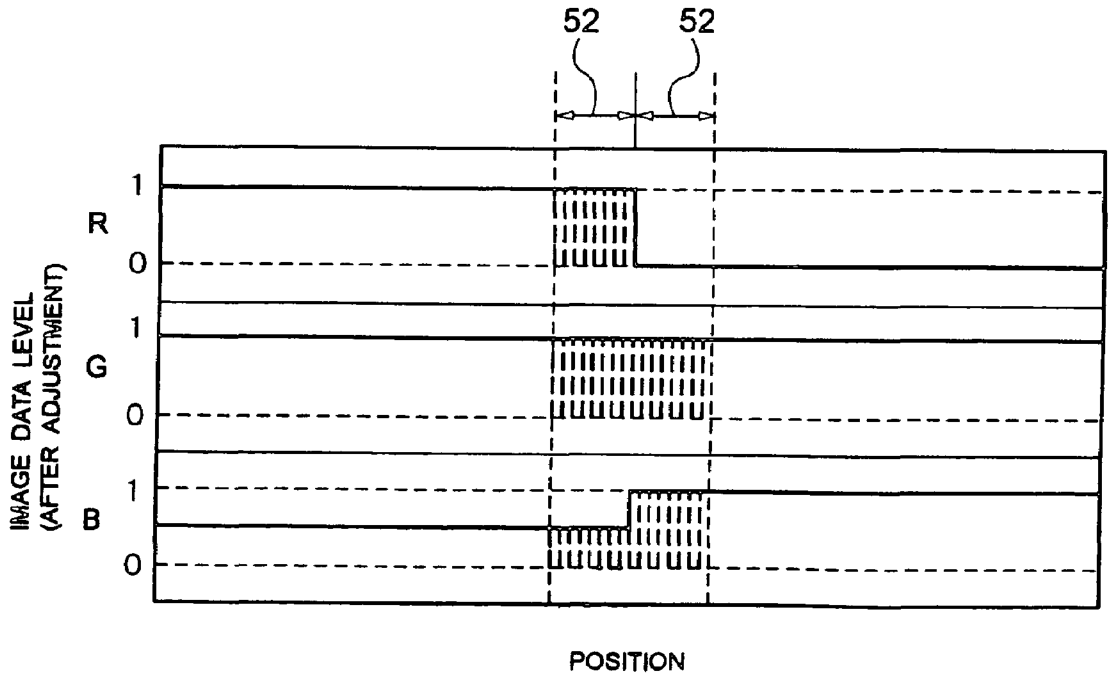

Next, an eighth embodiment of the present invention will be described. FIGS. 31A and 31B are graphic diagrams illustrating a spatial distribution of an image data level, with a horizontal axis as a position and a vertical axis as the image data level, FIG. 31A showing image data for respective RGB colors before the level adjustment and FIG. 31B showing image data for respective RGB colors after the level adjustment. The vertical axis in FIGS. 31A and 31B represents a normalized value of the image data level. This embodiment is an example of the color display device.

As shown in FIG. 31A, for the image data before the level adjustment, a level value of the first group of pixels 51 in a red (R) sub pixel is 1 and a level value of the second group of pixels 52 in the red (R) sub pixel is 0. Also, a level value of the first group of pixels 51 in a green (G) sub pixel is 1 and a level value of the second group of pixels 52 in the green (G) sub pixel is 1. In addition, a level value of the first group of pixels 51 in a blue (B) sub pixel is 0.5 and a level value of the second group of pixels 52 in the blue (B) sub pixel is 1.

In addition, in this embodiment, the value of the image data level for each of the RGB colors is multiplied by the common random coefficient α for each pixel. When a value of the random coefficient α is randomly used within, for example, a range of $0 \leqq \alpha \leqq 1$, the random coefficient α applied to the red sub pixel belonging to any pixel, the random coefficient α applied to the green sub pixel belonging to the pixel, and the random coefficient α applied to the blue sub pixel belonging to the pixel have the same value. That is, when the level value of the first group of pixels 51 before the level adjustment is A and the level value of the second group of pixels 52 before the level adjustment is B, the level value of the first group of pixels 51 after the level adjustment is (α×A) and the level value of the second group of pixels 52 after the level adjustment is (α×B). In this way, this embodiment is different from the seventh embodiment in that the addition and subtraction based on the level difference C of the image data are not performed for the level value (A or B) of the image data. As a result, the image data level after the level adjustment is as shown in FIG. 31B.

For example, when the image data level of each sub pixel before the level adjustment has values as shown in FIG. 31A, if α=0.1 for any pixel, the level $A_R$ of the red sub pixel of the first group of pixels 51 is: $A_R = \alpha \times A = 0.1 \times 1 = 0.1$, the level $A_G$ of the green sub pixel of the first group of pixels 51 is: $A_G = \alpha \times A = 0.1 \times 1 = 0.1$, the level $A_B$ of the blue sub pixel of the first group of pixels 51 is: $A_B = \alpha \times A = 0.1 \times 0.5 = 0.05$, and accordingly, a ratio of the levels for RGB is: $A_R$:$A_G$:$A_B$=1:1:0.5 and a ratio before the level adjustment is maintained. In addition, the level $B_R$ of the red sub pixel of the second group of pixels 52 is: $B_R$=α×B=0.1×0=0, the level $B_G$ of the green sub pixel of the second group of pixels 52 is: $B_G$=α×B=0.1×1=0.1, the level $B_B$ of the blue sub pixel of the second group of pixels 52 is: $B_B$=α×B=0.1×1=0.1, and accordingly, a ratio of the levels for RGB is: $B_R$:$B_G$:$B_B$=0:1:1 and a ratio before the level adjustment is maintained.

In addition, if α=0.5, the level $A_R$ of the red sub pixel of the first group of pixels 51 is: $A_R$=α×A=0.5×1=0.5, the level $A_G$ of the green sub pixel of the first group of pixels 51 is: $A_G$=α×A=0.5×1=0.5, the level $A_B$ of the blue sub pixel of the first group of pixels 51 is: $A_B$=α×A=0.5×0.5=0.25, and accordingly, a ratio of the levels for RGB is: $A_R$:$A_G$:$A_B$=1:1:0.5 and a ratio before the level adjustment is maintained. In addition, the level $B_R$ of the red sub pixel of the second group of pixels 52 is: $B_R$=α×B=0.5×0=0, the level $B_G$ of the green sub pixel of the second group of pixels 52 is: $B_G$=α×B=0.5×1=0.5, the level $B_B$ of the blue sub pixel of the second group of pixels 52 is: $B_B$=α×B=0.5×1=0.5, and accordingly, a ratio of the levels for RGB is: $B_R$:$B_G$:$B_B$=0:1:1 and a ratio before the level adjustment is maintained.

In this way, in this embodiment, since a color balance before and after the level adjustment is approximately maintained, a color balance of the pixel group after the level adjustment is little different from a color balance in both regions of the pixel group, that is, the regions on which the level adjustment is not performed. In addition, since the common random coefficient α is used for each pixel for each of the RGB colors, a color balance is not significantly upset even in a microscopic scale. Accordingly, a portion whose level is adjusted is unobservable and the deterioration of image quality is insignificant. Except this configuration, operation and effect, this embodiment has the same configuration, operation and effect as those of the sixth embodiment. That is, as shown in the sixth embodiment, the edge portion is detected by detecting the still letter region, adjusting the image data level in only the still letter region and performing the triplization process on the image data level.

In addition, this embodiment may be applied to the display devices according to the first to fifth embodiments. For example, as shown in the second embodiment, the width L of the pixel group adjusting the image data level may be adjusted according to the distance between the display device and viewer. In addition, as shown in the first modification of the sixth embodiment, the width of the pixel group adjusting the image data level may be adjusted according to the width of the high level region, and, as shown in the second modification of the sixth embodiment, the image data level may be adjusted in only the first group of pixels 51 as the high level region.

In addition, in the above-described embodiments, the level adjustment of the image data is preferably performed in both of the horizontal direction and the vertical direction, however, may be performed in only the horizontal direction. By performing the level adjustment in only the horizontal direction, the image data is easily processed. In addition, in the above-described embodiments, the width L of the pixel group adjusting the image data level and the adjustment coefficient α may be adjusted according to the level difference C of the pair of pixels forming the edge portion. For example, as the level difference C becomes large, the width L of the pixel group may become large. At this time, a value or a range of the adjustment coefficient α may be varied step by step or continuously such that the level value of the image data is smoothly varied for the position of the image data in the pixel group.

The present invention is applicable to various display devices including PDPs, LCDs, Els, and CRTs, and is particularly adaptable for display devices, such as computers for displaying a mixture of still images and moving images very frequently.

This application is based on Japanese Patent Application No. 2004-056861 which is herein incorporated by reference.

What is claimed is:

1. A display device for displaying images based on video data inputted from the outside, comprising:

a display unit having a plurality of pixels, each being composed of a plurality of sub pixels having different colors or a single monochrome sub pixel;

a driving unit for driving the display unit based on the video data;

a still image region detecting unit for detecting a still image region from the video data; and a burn-in reduction processing unit for performing a burn-in reduction process for sub pixels located in the still image region.

2. The display device according to claim 1, wherein the burn-in reduction processing unit includes a first edge portion detecting unit for detecting, as a first edge portion, a pair of pixels having a difference in image data level between a sub pixel having a first color or the single monochrome sub pixel of one pixel of the pair of pixels and a sub pixel having the first color or the single monochrome sub pixel of the other pixel of the pair of pixels, the difference being larger than a predetermined value, among pairs of adjacent pixels in the still image region, and a level adjusting unit for adjusting the image data level of the first edge portion and outputting the adjusted image data level to the driving unit.

3. The display device according to claim 2, wherein the first edge portion detecting unit detects a first group of pixels composed of a plurality of pixels, including a pixel to which a first sub pixel having a relatively high image data level belongs, and consecutively arranged in a direction away from a pixel to which a second sub pixel having a relatively low image data level belongs, and a second group of pixels composed of a plurality of pixels, including the pixel to which the second sub pixel belongs, and consecutively arranged in a direction away from the pixel to which the first sub pixel belongs, from the pair of pixels forming the first edge portion, and the level adjusting unit adjusts the image data level corresponding to the first group of pixels and the second group of pixels.

4. The display device according to claim 3, further comprising:

a distance measurement unit for measuring a distance between the display unit and a viewer, wherein a distance in a direction from the first pixel to the second pixel in the first group of pixels and the second group of pixels becomes long as the distance measured by the distance measurement unit becomes long.

5. The display device according to claim 4, wherein the distance measurement unit includes an ultrasonic oscillating unit for oscillating ultrasonic waves, an ultrasonic detector for detecting the ultrasonic waves reflected by the viewer, and a distance measurer for measuring the distance between the display unit and the viewer from a difference between time when the ultrasonic oscillator oscillates the ultrasonic waves and time when the ultrasonic detector receives the ultrasonic waves.

6. The display device according to claim 2, wherein the first edge portion detecting unit detects a first group of pixels composed of a plurality of pixels, including a pixel to which a first sub pixel having a relatively high image data level belongs, and consecutively arranged in a direction away from a pixel to which a second sub pixel having a relatively low image data level belongs, and a second group of pixels composed of a plurality of pixels, including the pixel to which the second sub pixel belongs, and consecutively arranged in a direction away from the pixel to which the first sub pixel belongs, from the pair of pixels forming the first edge portion, and the level adjusting unit adjusts the image data level corresponding to the first group of pixels.

7. The display device according to claim 6, further comprising:

a first pattern thickness detecting unit for detecting, as a length of a high level region, the number of pixels, including the pixel to which the first sub pixel belongs, and consecutively arranged in the direction away from the pixel to which the second sub pixel belongs, the image data level of the sub pixel having the first color being higher than a predetermined level, wherein the first edge portion detecting unit increases the number of pixels of the first group of pixels and the second group of pixels as the length of the high level region becomes large.

8. The display device according to claim 6, further comprising:

a second pattern thickness detecting unit for detecting, as a length of a low level region, the number of pixels, including the pixel to which the second sub pixel belongs, and consecutively arranged in the direction away from the pixel to which the first sub pixel belongs, the image data level of the sub pixel having the first color being lower than the predetermined level, wherein the first edge portion detecting unit increases the number of pixels of the first group of pixels and the second group of pixels as the length of the low level region becomes large.

9. The display device according to claim 6, wherein the first edge portion detecting unit increases the number of pixels of the first group of pixels and the second group of pixels as a difference in image data level between the first sub pixel and the second sub pixel becomes large.

10. A display device for displaying images based on video data inputted from the outside, comprising:

a display unit having a plurality of pixels, each being composed of a plurality of sub pixels having different colors or a single monochrome sub pixel;

a driving unit for driving the display unit based on the video data;

a still letter region detecting unit for detecting a still letter region from the video data; and a burn-in reduction processing unit for performing a burn-in reduction process for sub pixels located in the still letter region.

11. The display device according to claim 10, wherein the still letter region detecting unit divides the plurality of pixels forming the display unit in a plurality of blocks, compares image data corresponding to sub pixels in each block with a first reference value and a second reference value lower than the first reference value, and determines, as the still letter region, blocks having a percentage of sub pixels whose image data level is a medium level larger than the second reference value and smaller than the first reference value, the percentage of sub pixels being smaller than a predetermined value.

12. The display device according to claim 11, wherein the burn-in reduction processing unit includes an edge portion detecting unit for detecting, as an edge portion, a pair of pixels composed of a high level pixel to which a sub pixel having a first color or the single monochrome sub pixel whose image data level is larger than the first reference value belongs and a low level pixel to which a sub pixel having the first color or the single monochrome sub pixel whose image data level is smaller than the second reference value belongs, when the high level pixel contacts with the low level pixel, and detecting, as the edge portion, a pair of pixels located in the center in a direction from the high level pixel to the low level pixel among medium level pixels, when the medium level pixels, fewer than a predetermined number, to which a sub pixel having the first color whose image data level is the medium level belongs, are included between the high level pixel and the low level pixel, and a level adjusting unit for adjusting the image data level outputted from the edge portion detecting unit and outputting the adjusted image data level to the driving unit.

13. The display device according to claim 12, wherein the edge portion detecting unit detects a first group of pixels composed of a plurality of pixels, including a pixel to which a first sub pixel having a relatively high image data level belongs, and consecutively arranged in a direction away from a pixel to which a second sub pixel having a relatively low image data level belongs, and a second group of pixels composed of a plurality of pixels, including the pixel to which the second sub pixel belongs, and consecutively arranged in a direction away from the pixel to which the first sub pixel belongs, from the pair of pixels forming the edge portion, and the level adjusting unit adjusts the image data level corresponding to the first group of pixels and the second group of pixels.

14. The display device according to claim 12, wherein the edge portion detecting unit detects a first group of pixels composed of a plurality of pixels, including a pixel to which a first sub pixel having a relatively high image data level belongs, and consecutively arranged in a direction away from a pixel to which a second sub pixel having a relatively low image data level belongs, and a second group of pixels composed of a plurality of pixels, including the pixel to which the second sub pixel belongs, and consecutively arranged in a direction away from the pixel to which the first sub pixel belongs, from the pair of pixels forming the edge portion, and the level adjusting unit adjusts the image data level corresponding to the first group of pixels.

15. The display device according to claim 14, further comprising:

a first pattern thickness detecting unit for detecting, as a length of a high level region, the number of pixels, including the pixel to which the first sub pixel belongs, and consecutively arranged in the direction away from the pixel to which the second sub pixel belongs, the image data level of the sub pixel having the first color being higher than a predetermined level, wherein the edge portion detecting unit increases the number of pixels of the first group of pixels and the second group of pixels as the length of the high level region becomes large.

16. The display device according to claim 14, further comprising:

a second pattern thickness detecting unit for detecting, as a length of a low level region, the number of pixels, including the pixel to which the second sub pixel belongs, and consecutively arranged in the direction away from the pixel to which the first sub pixel belongs, the image data level of the sub pixel having the first color being lower than the predetermined level, wherein the edge portion detecting unit increases the number of pixels of the first group of pixels and the second group of pixels as the length of the low level region becomes large.

17. The display device according to claim 14, wherein the edge portion detecting unit increases the number of pixels of the first group of pixels and the second group of pixels as a difference in image data level between the first sub pixel and the second sub pixel becomes large.

18. The display device according to claim 14, further comprising:

a distance measurement unit for measuring a distance between the display unit and a viewer, wherein a distance in a direction from the first pixel to the second pixel in the first group of pixels and the second group of pixels becomes long as the distance measured by the distance measurement unit becomes long.

19. The display device according to claim 18, wherein the distance measurement unit includes an ultrasonic oscillating unit for oscillating ultrasonic waves, an ultrasonic detector for detecting the ultrasonic waves reflected by the viewer, and a distance measurer for measuring the distance between the display unit and the viewer from a difference between time when the ultrasonic oscillator oscillates the ultrasonic waves and time when the ultrasonic detector receives the ultrasonic waves.

20. The display device according to claim 14, wherein, when the image data level of the first sub pixel is A, the image data level of the second sub pixel is B, a level difference in image data between the first sub pixel and the second sub pixel is C ($C=A-B$), and a random coefficient assuming a random value within a range of 0 to 1 is $\alpha$, the level adjustment unit replaces the image data level of the sub pixel having the first color of the first group of pixels with ($A-\alpha\times C$) and replaces the image data level of the sub pixel having the first color of the second group of pixels with ($B+\alpha\times C$).

21. The display device according to claim 20, wherein the level adjusting unit sets a value of the random coefficient to become a small value as for pixels closer to a pair of pixels to which the first sub pixel and the second sub pixel belong, of pixels belonging to the first group of pixels and the second group of pixels.

22. The display device according to claim 20, wherein, for display of a color image, the bum-in reduction processing unit calculates the level difference separately for each color.

23. The display device according to claim 22, wherein the level adjustment unit uses the random coefficient having a common value for each pixel for each color.

24. The display device according to claim 14, wherein the level adjustment unit adjusts the image data level of the sub pixel having the first color belonging to the first group of pixels and the second group of pixels to become low consecutively along a direction from a pixel to which the first sub pixel belongs to a pixel to which the second sub pixel belongs.

25. The display device according to claim 14, wherein the level adjustment unit adjusts the image data level of the sub pixel having the first color belonging to the first group of pixels and the second group of pixels, based on a function of the image data level of the sub pixel and a position in a direction from a pixel to which the first sub pixel belongs to a pixel to which the second sub pixel belongs, the function being obtained by a low pass filter.

26. The display device according to claim 14, wherein, for display of a color image, when the image data level of the first sub pixel is A, the image data level of the second sub pixel is B, and a random coefficient assuming a random value within a range of 0 to 1 is $\alpha$, the level adjustment unit replaces the level of the image data having the first color of the first group of pixels with ($\alpha\times A$) and replaces the level of the image data having the first color of the second group of pixels with ($\alpha\times B$).

27. The display device according to claim 26, wherein the level adjustment unit uses the random coefficient having a common value for each pixel for each color.

* * * * *